(12) United States Patent  (10) Patent No.: US 7,566,362 B2
Mori et al.  (45) Date of Patent: Jul. 28, 2009

(54) INK, INK JET RECORDING METHOD, INK CARTRIDGE, RECORDING UNIT AND INK JET RECORDING APPARATUS

(75) Inventors: Otome Mori, Yokohama (JP); Kuniaki Fujimoto, Chofu (JP); Yojiro Kojima, Tokyo (JP); Jun Yoshizawa, Tokyo (JP); Daiji Okamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/173,422

(22) Filed: Jul. 15, 2008

(65) Prior Publication Data

US 2009/0047430 A1  Feb. 19, 2009

(30) Foreign Application Priority Data

Aug. 10, 2007  (JP) ............................. 2007-210095
Jul. 4, 2008  (JP) ............................. 2008-175247

(51) Int. Cl.
*C09D 11/02*  (2006.01)
*B41J 2/01*  (2006.01)
(52) U.S. Cl. .................. 106/31.48; 106/31.47; 347/100
(58) Field of Classification Search ............. 106/31.48, 106/31.47; 347/100
See application file for complete search history.

(56) References Cited

U.S. PATENT DOCUMENTS 4,202,870 A  5/1980  Weber et al. ................. 423/630

(Continued)

FOREIGN PATENT DOCUMENTS

EP  0 418 792 A1  3/1991

(Continued)

OTHER PUBLICATIONS

Nov. 7, 2008 European Search Report in European Patent Appln. No. 08160972.9.

*Primary Examiner*—Helene Klemanski
(74) *Attorney, Agent, or Firm*—Fitzpatrick, Cella, Harper & Scinto

(57) ABSTRACT

An ink containing at least two coloring materials of a first coloring material and a second coloring material, wherein the first coloring material is a compound represented by the general formula (I), and the second coloring material is a compound represented by the general formula (II):

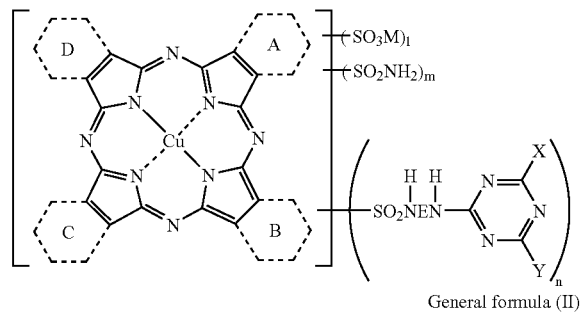

General formula (I)

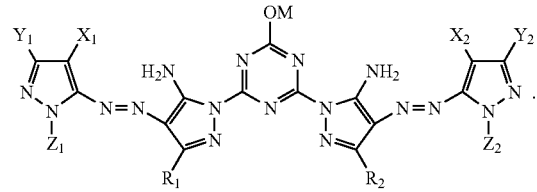

General formula (II)

13 Claims, 7 Drawing Sheets

U.S. PATENT DOCUMENTS

| | | | |
|---|---|---|---|
| 4,242,271 A | 12/1980 | Weber et al. | 260/448 AD |
| 4,391,960 A | 7/1983 | Kleine et al. | 526/74 |
| 4,723,129 A | 2/1988 | Endo et al. | 346/1.1 |
| 4,740,796 A | 4/1988 | Endo et al. | 346/1.1 |
| 4,973,519 A | 11/1990 | Tortorici et al. | 428/411.1 |
| 5,599,386 A | 2/1997 | Sano et al. | 106/22 R |
| 6,302,949 B1 | 10/2001 | Peter | 106/31.52 |
| 6,755,903 B2 | 6/2004 | Yamada et al. | 106/31.45 |
| 7,033,423 B2 | 4/2006 | Rolly | 106/31.13 |
| 7,087,107 B2 | 8/2006 | Tateishi et al. | 106/31.49 |
| 7,144,452 B2 | 12/2006 | Takayama et al. | 106/31.52 |
| 7,160,372 B2 | 1/2007 | Yoshizawa et al. | 106/31.47 |
| 7,198,664 B2 | 4/2007 | Mafune et al. | 106/31.28 |
| 7,198,665 B2 | 4/2007 | Nakamura et al. | 106/31.52 |
| 7,201,791 B2 | 4/2007 | Okamura et al. | 106/31.47 |
| 7,211,134 B2 | 5/2007 | Tateishi et al. | 106/31.49 |
| 7,226,498 B2 | 6/2007 | Yamashita et al. | 106/31.5 |
| 7,241,332 B2 | 7/2007 | Yoshizawa et al. | 106/31.47 |
| 7,247,194 B2 | 7/2007 | Okamura et al. | 106/31.47 |
| 7,247,196 B2 | 7/2007 | Sato et al. | 106/31.52 |
| 7,270,701 B2 | 9/2007 | Jinnou et al. | 106/31.47 |
| 7,270,703 B2 | 9/2007 | Tateishi et al. | 106/31.49 |
| 7,285,159 B2 | 10/2007 | Aikawa et al. | 106/31.47 |
| 7,294,184 B2 | 11/2007 | Fujimoto et al. | 106/31.47 |
| 7,297,196 B2 | 11/2007 | Matsumoto et al. | 106/31.47 |
| 7,297,197 B2 | 11/2007 | Jinnou et al. | 106/31.47 |
| 7,504,488 B2 * | 3/2009 | Toyoda et al. | 106/31.48 |
| 2006/0009357 A1 | 1/2006 | Fujiwara et al. | 503/227 |
| 2006/0103705 A1 | 5/2006 | Yoshizawa et al. | 347/100 |
| 2006/0125896 A1 | 6/2006 | Aikawa et al. | 347/100 |
| 2006/0162616 A1 | 7/2006 | Chino et al. | 106/31.51 |
| 2007/0257975 A1 | 11/2007 | Yoneda et al. | 347/100 |
| 2007/0277701 A1 | 12/2007 | Toyoda et al. | 106/31.48 |
| 2008/0018722 A1 | 1/2008 | Mafune et al. | 347/100 |
| 2008/0145562 A1 * | 6/2008 | Kitamura et al. | 106/31.48 |
| 2008/0151028 A1 * | 6/2008 | Yamakami et al. | 106/31.48 |
| 2008/0257209 A1 * | 10/2008 | Kitamura et al. | 106/31.48 |
| 2008/0274285 A1 * | 11/2008 | Okamura et al. | 106/31.48 |
| 2008/0274286 A1 * | 11/2008 | Yamashita et al. | 106/31.47 |
| 2009/0011130 A1 * | 1/2009 | Mafune et al. | 106/31.48 |

FOREIGN PATENT DOCUMENTS

| | | |
|---|---|---|
| EP | 1 767 595 A1 | 3/2007 |
| JP | 57-44605 | 3/1982 |
| JP | 8-73791 | 3/1996 |
| JP | 2803134 | 7/1998 |
| JP | 2881847 | 2/1999 |
| JP | 2002-80765 | 3/2002 |
| JP | 2002-249677 | 9/2002 |
| JP | 2002-275386 | 9/2002 |
| JP | 2002-294097 | 10/2002 |
| JP | 2002-302623 | 10/2002 |
| JP | 2002-327132 | 11/2002 |
| JP | 2003-3099 | 1/2003 |
| JP | 2003-34758 | 2/2003 |
| JP | 2003-213168 | 7/2003 |
| JP | 2005-139427 | 6/2005 |
| JP | 2006-45535 | 2/2006 |
| JP | 2006-143989 | 6/2006 |
| JP | 3851569 | 9/2006 |
| JP | 2006-526062 | 11/2006 |
| WO | WO 2004/099328 A2 | 11/2004 |
| WO | WO 2004/104108 | 12/2004 |
| WO | WO 2006/001274 | 1/2006 |

* cited by examiner

INK, INK JET RECORDING METHOD, INK CARTRIDGE, RECORDING UNIT AND INK JET RECORDING APPARATUS

BACKGROUND OF THE INVENTION

1. Field of the Invention

The present invention relates to an ink, an ink jet recording method, an ink cartridge, a recording unit and an ink jet recording apparatus.

2. Description of the Related Art

An ink jet recording method is a recording method that minute droplets of an ink are applied to a recording medium such as plain paper or glossy medium, thereby forming an image, and is rapidly spread because of lowered price of an apparatus itself and improvement of recording speed. With the rapid spread of digital cameras in addition to the progress of the formation of high-quality images by the ink jet recording method, the ink jet recording method becomes general as an output method of images comparable with a silver halide photograph.

In recent years, there has been a demand for outputting a recorded article having image quality comparable with that of a silver halide photograph, in particular, a recorded article with reduced feeling of grain, excellent gradation property, which has image quality better than ever, with the spread of ink jet recording apparatus.

In order to solve such a problem, it is conducted to use a gray ink having a neutral color tone in addition to conventional respective inks of cyan, magenta and yellow. It is known that the use of the gray ink in addition to the conventional inks improves, for example, a feeling of grain in a shadow portion such as a flesh color or background portion, or gradation property upon gradation from a highlight to a shadow to obtain a recorded article having higher image quality. Incidentally, the meaning that an ink has a neutral color tone will be described subsequently.

A gray ink is generally prepared by conducting toning with coloring materials of cyan, magenta and yellow. It has been proposed to improve image quality by using the gray ink prepared by using such coloring material in combination. For example, it has been proposed to provide a light gray ink, a medium gray ink and a dark gray ink as toned gray inks to conduct gradation recording by combination of these inks (see Japanese Unexamined Patent Publication No. 2006-526062). This publication also discloses that a black coloring material is mixed with a proper coloring material to provide an gray ink.

On the other hand, the gray ink by the combination of cyan, magenta and yellow involves a problem that the image-storing ability of the resulting recorded article is low compared with the silver halide photograph. Specifically, when the recorded article formed with the gray ink is exposed to light, humidity or an environmental gas present in the air for a long period of time, a problem that a coloring material on the recorded article is deteriorated, and so change of color tone of the image or color fading is easy to occur arises. A large number of proposals has heretofore been made for improving the ozone fastness and light fastness of the image in particular in this image-storing ability.

The color fading of the image is mainly caused by the cyan ink particularly low in the ozone fastness among the respective inks of cyan, yellow and magenta. Therefore, a large number of proposals has been made for improving the ozone fastness of the cyan ink (see Japanese Patent Application Laid-Open Nos. 2002-249677, 2002-275386, 2002-294097, 2002-302623, 2002-327132, 2003-003099 and 2003-213168). In addition, a proposal has been made on the improvement in the ozone fastness of an image by introducing a nitrogen-containing aromatic heterocyclic ring into the skeleton of a phthalocyanine coloring material commonly used as a coloring material of the cyan ink (see Japanese Patent Application Laid-Open No. 2003-34758). It is described that this phthalocyanine coloring material may have $(SO_3D)_m$ or $(SO_2NHR)_n$ (m=1 to 4, n=0 to 3) as a substituent, and $SO_2NHR$ is $SO_2NH_2$ or a sulfonamide residue capable of forming a complex with a copper ion. Incidentally, D is a monovalent alkali metal, ammonium or organic ammonium.

Japanese Patent Application Laid-Open No. 2003-034758 describes that $SO_2NH_2$ is favorable as $SO_2NHR$. However, three Examples among five Examples in Japanese Patent Application Laid-Open No. 2003-034758 are examples where the phthalocyanine coloring material has no $SO_2NHR$, i.e., n is 0. The results of a color fading test with ozone gas when phthalocyanine coloring materials having $SO_2NH_2$ as $SO_2NHR$ and substituted by a sulfonamide residue were respectively used are described. However, it is disclosed that the results of the color fading test when these phthalocyanine coloring materials were used are poorer than the case of n=0 though Japanese Patent Application Laid-Open No. 2003-034758 describes that $SO_2NH_2$ is favorable as $SO_2NHR$ as described above.

The performance required of a recorded article obtained by the ink jet recording method for the ozone fastness is increased year by year, and so the coloring material heretofore used in the cyan ink does not come to provide an image having ozone resistance on the level satisfying the above requirement. For example, in the inventions described in Japanese Patent Application Laid-Open Nos. 2002-249677, 2002-275386, 2002-294097, 2002-302623, 2002-327132, 2003-003099, 2003-213168 and 2003-034758, it is attempted to improve the ozone fastness of the image by introducing various substituents into the coloring material. However, there is a limit to improve the ozone fastness of the image by only the properties of such a coloring material.

SUMMARY OF THE INVENTION

As described above, a gray ink having performance required of the gray ink and being capable of providing an image having ozone fastness and light fastness on a high level has not been present to date. It is accordingly a first object of the present invention to provide a gray ink having performance required of the gray ink and being capable of providing an image having ozone fastness and light fastness on a high level.

A recorded article formed with the gray ink making combined use of the cyan, magenta and yellow coloring materials involves a problem that a color difference becomes great according to a light source (reflected light), i.e., metamerism is poor. Incidentally, the metamerism means a phenomenon that colors different in spectral distribution look the same color under certain observation conditions. However, in the present invention, the metamerism means a phenomenon that the color of a recorded article looks different according to a light source (reflected light, not transmitted light). When the metamerism of the recorded article is poor, such a recorded article involves a problem that the color thereof looks different under sunlight and fluorescent lamps. Accordingly, it is a second problem of the present invention to provide a gray ink capable of solving or reducing the problem of metamerism.

The present inventors have carried out an investigation as to images obtained with toned gray inks making combined use of various cyan dyes, magenta dyes and yellow dyes. As a result, the following fact has been found. A phthalocyanine dye widely used as a cyan dye applied to ink jet inks on a recording medium is generally liable to be present in the vicinity of the surface of the recording medium. Therefore, it has been found that the phthalocyanine dye is easy to be damaged by oxide gases such as ozone gas in the air and has a tendency to be more deteriorated compared with dyes of other color tones. The present inventors have carried out a further investigation based on such finding and found the following fact. Specifically, it has been found that when an image obtained with a gray ink toned by a cyan dye, a magenta dye and a yellow dye is exposed to ozone gas, a cyan component is markedly deteriorated compared with other components.

Thus, the present inventors have sought cyan, magenta and yellow dyes as main elements capable of inhibiting the deterioration of a cyan component and achieving ozone fastness on a high level when used in the formation of an image. As a result, it has been found that a specific cyan dye and a specific yellow dye are used in combination, whereby the behavior of the cyan dye in a recording medium is markedly changed compared with conventional cyan dyes. It has been further found that the combined use of such specific dyes permits inhibiting the deterioration of a cyan component and thereby achieving the ozone fastness of the resulting image on a high level. Accordingly, it is a third object of the present invention to analyze the behavior of a cyan dye in a recording medium, thereby providing an ink making combined use of the specific cyan dye and specific yellow dye and providing an image capable of achieving the ozone fastness on a high level.

The present inventors have further found that a gray ink providing an image excellent in ozone fastness and color tone is obtained by using a specific magenta dye in combination with the specific cyan dye and yellow dye. It has also been found that a specific dye is used in combination with the above-described dyes, thereby obtaining a gray ink, which provides an image excellent in ozone fastness and light fastness, having a color tone favorable as a gray ink and also excellent in metamerism.

As apparent from the recognition of the above problems, it is an object of the present invention to provide respective inventions solving the above respective problems. Specifically, the object is to provide an ink providing an image excellent in ozone fastness and having a neutral gray color tone. Another object of the present invention is to provide an ink providing an image excellent in light fastness. A further object of the present invention is to provide an ink providing an image excellent in metamerism. A still further object of the present invention is to provide an ink jet recording method, an ink cartridge, a recording unit and an ink jet recording apparatus using any one of the above-described inks.

Methods for solving the above respective problems correspond to the respective objects. More specifically, an ink according to the present invention is an ink comprising at least two coloring materials of a first coloring material and a second coloring material, wherein the first coloring magerial is a compound represented by the following general formula (I), and the second coloring material is a compound represented by the following general formula (II):

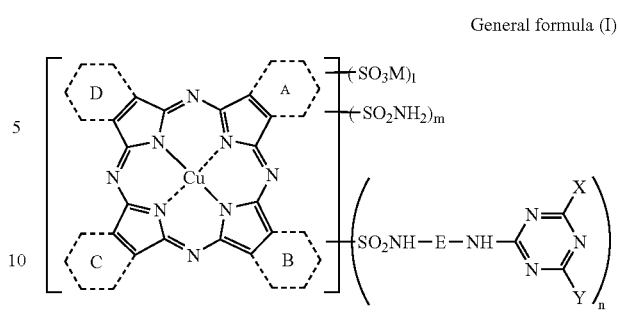

General formula (I)

wherein A, B, C and D are, independently of one another, an aromatic six-membered ring, M is a hydrogen atom, alkali metal, ammonium or organic ammonium, E is an alkylene group, X is a sulfo-substituted anilino group, carboxyl-substituted anilino group or phosphono-substituted anilino group, with the proviso that such a substituted anilino group may further have 1 to 4 substituents selected from the group consisting of sulfonic, carboxyl, phosphono, sulfamoyl, carbamoyl, hydroxyl, alkoxy, amino, alkylamino, dialkylamino, arylamino, diarylamino, acetylamino, ureido, alkyl, nitro, cyano, alkylsulfonyl and alkylthio groups and halogen atoms, Y is a hydroxyl group or amino group, and l, m and n have the following relationship: $0 \leq l \leq 2$, $0 \leq m \leq 3$, $0.1 \leq n \leq 3$ and l+m+n=1 to 4; and

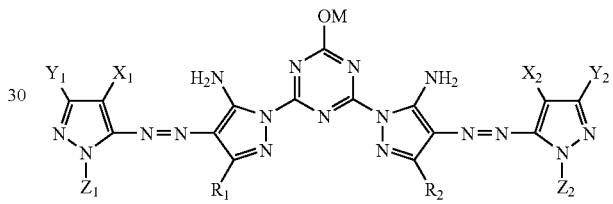

General formula (II)

wherein $R_1$, $R_2$, $Y_1$ and $Y_2$ are, independently of one another, a monovalent group, $X_1$ and $X_2$ are, independently of each other, an electron attractive group having a Hammett's σp value of 0.20 or more, $Z_1$ and $Z_2$ are, independently of each other, a hydrogen atom, substituted or unsubstituted alkyl group, substituted or unsubstituted alkenyl group, substituted or unsubstituted alkynyl group, substituted or unsubstituted aralkyl group, substituted or unsubstituted aryl group, or substituted or unsubstituted heterocyclic group, and M is a hydrogen atom, alkali metal, ammonium or organic ammonium.

An ink according to another embodiment of the present invention further comprises, as a third coloring material, at least one compound selected from the group consisting of a compound represented by the following general formula (III), a compound represented by the following general formula (IV) and a compound represented by the following general formula (V):

General formula (III)

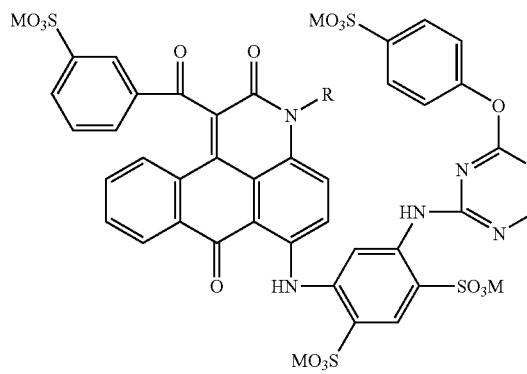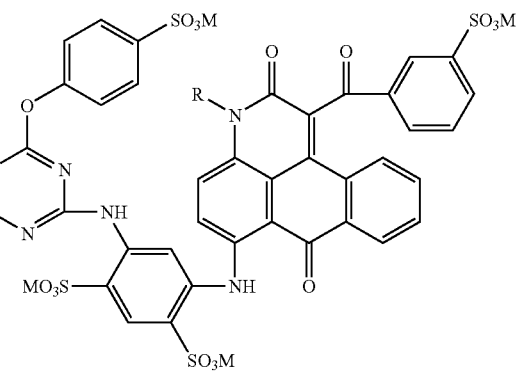

wherein R are, independently of each other, a hydrogen atom, alkyl group, hydroxyalkyl group, cyclohexyl group monoalkylaminoalkyl group or dialkylaminoalkyl group, M's are, independently of one another, a hydrogen atom, alkali metal, ammonium or organic ammonium, and X is a linking group;

General formula (IV)

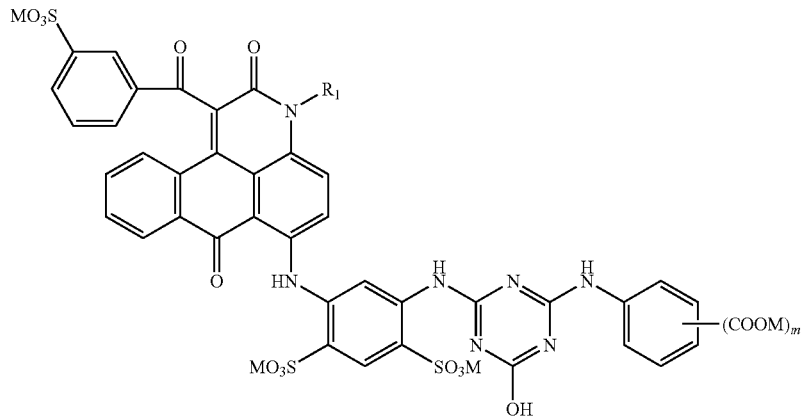

wherein $R_1$ is a hydrogen atom or alkyl group, m is an integer of 1 to 3, and M's are, independently of one another, a hydrogen atom, alkali metal, ammonium or organic ammonium; and General formula (V)

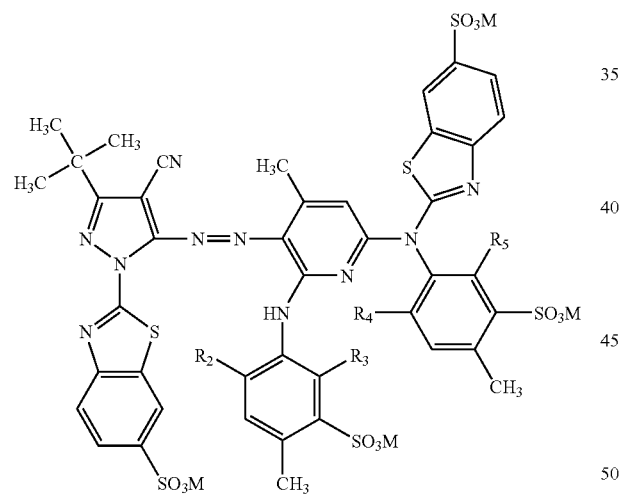

wherein $R_2$, $R_3$, $R_4$ and $R_5$ are, independently of one another, an alkyl group, and M's are, independently of one another, a hydrogen atom, alkali metal, ammonium or organic ammonium.

An ink according to a further embodiment of the present invention further comprises, as a fourth coloring material, at least one compound selected from the group consisting of a compound represented by the following general formula (VI) and a compound represented by the following general formula (VII):

General formula (VI)

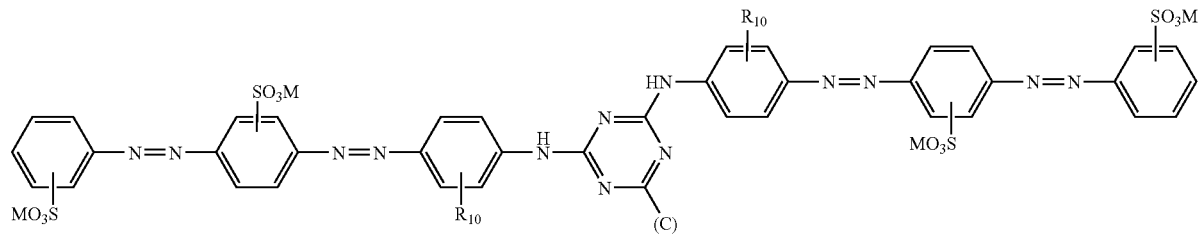

wherein $R_{10}$ are, independently of each other, a hydrogen atom, hydroxyl group, carboxyl group, an alkyl group having 1 to 4 carbon atoms, which may be substituted by a hydroxyl group or an alkoxy group having 1 to 4 carbon atoms, an alkoxy group having 1 to 4 carbon atoms, which may be substituted by a hydroxyl group or an alkoxy group having 1 to 4 carbon atoms, an alkylamino group having 1 to 4 carbon atoms, which may be substituted by a hydroxyl group or an alkoxy group having 1 to 4 carbon atoms, a carboxy-(C1-C5)alkylamino group, a bis[carboxy-(C1-C5)alkyl]amino group, an alkanoylamino group having 1 to 4 carbon atoms, which may be substituted by a hydroxyl group or an alkoxy group having 1 to 4 carbon atoms, a phenylamino group, which may be substituted by a carboxyl, sulfonic or amino group, a sulfonic group, a halogen atom, or a ureido group, [C] is an aliphatic amine residue having a carboxyl or sulfonic group, and M's are, independently of one another, a hydrogen atom, alkali metal, ammonium or organic ammonium; and General formula (VII)

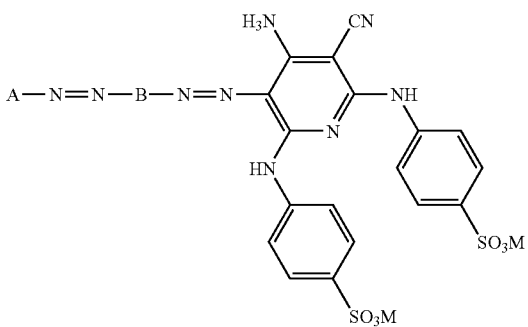

wherein A is an aromatic or heterocyclic group which may be substituted, B is any one of groups represented by the following general formulae (1) to (5), and M's are, independently of each other, a hydrogen atom, alkali metal, ammonium or organic ammonium, General formula (1)

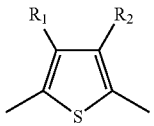

General formula (2)

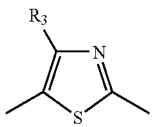

General formula (3)

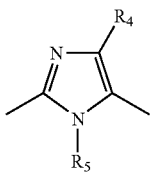

General formula (4)

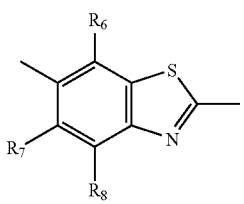

-continued

General formula (5)

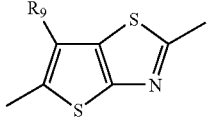

wherein $R_1$ to $R_9$ are, independently of one another, a hydrogen atom, halogen atom, aliphatic group, aromatic group, heterocyclic group, carboxyl group, carbamoyl group, alkoxycarbonyl group, aryloxycarbonyl group, heterocyclic oxycarbonyl group, acyl group, hydroxyl group, alkoxy group, aryloxy group, heterocyclic oxy group, silyloxy group, acyloxy group, carbamoyloxy group, alkoxycarbonyloxy group, aryloxycarbonyloxy group, amino group, acylamino group, ureido group, sulfamoylamino group, alkoxycarbonylamino group, aryloxycarbonylamino group, alkyl- or arylsulfonylamino group, heterocyclic sulfonylamino group, cyano group, nitro group, alkyl- or arylthio group, heterocyclic thio group, alkyl- or arylsulfonyl group, heterocyclic sulfonyl group, alkyl- or arylsulfinyl group, heterocyclic sulfinyl group, sulfamoyl group, or sulfonic group, with the proviso that each group may be further substituted.

An ink jet recording method according to a still further embodiment of the present invention comprises ejecting an ink by an ink jet system to conduct recording on a recording medium, wherein the ink is any one ink of the above-described inks.

An ink cartridge according to a yet still further embodiment of the present invention comprises an ink storage portion for storing an ink, wherein the ink is any one ink of the above-described inks.

A recording unit according to a yet still further embodiment of the present invention comprises an ink storage portion for storing an ink and a recording head for ejecting the ink, wherein the ink is any one ink of the above-described inks.

An ink jet recording apparatus according to a yet still further embodiment of the present invention comprises an ink storage portion for storing an ink and a recording head for ejecting the ink, wherein the ink is any one ink of the above-described inks.

According to the present invention for solving the first problem, there can be provided an ink having performance required of a gray ink and being capable of providing an image having ozone fastness and light fastness on a high level. According to the present invention for solving the second problem, there can be provided an ink capable of solving or reducing the problem of metamerism. According to the present invention for solving the third problem, there can be provided an ink making combined use of a specific cyan dye and a specific yellow dye and capable of forming an excellent image while inhibiting association or aggregation of the cyan dye, in particular, of a phthalocyanine dye.

According to another embodiment of the present invention in particular, there is provided an ink capable of providing an image excellent in ozone fastness and light fastness and having a neutral gray color tone. According to another embodiment of the present invention, there are provided an ink jet recording method, an ink cartridge, a recording unit and an ink jet recording apparatus, which can provide the above-described excellent image.

Further features of the present invention will become apparent from the following description of exemplary embodiments with reference to the attached drawings.

DESCRIPTION OF THE EMBODIMENTS

Figure 1:
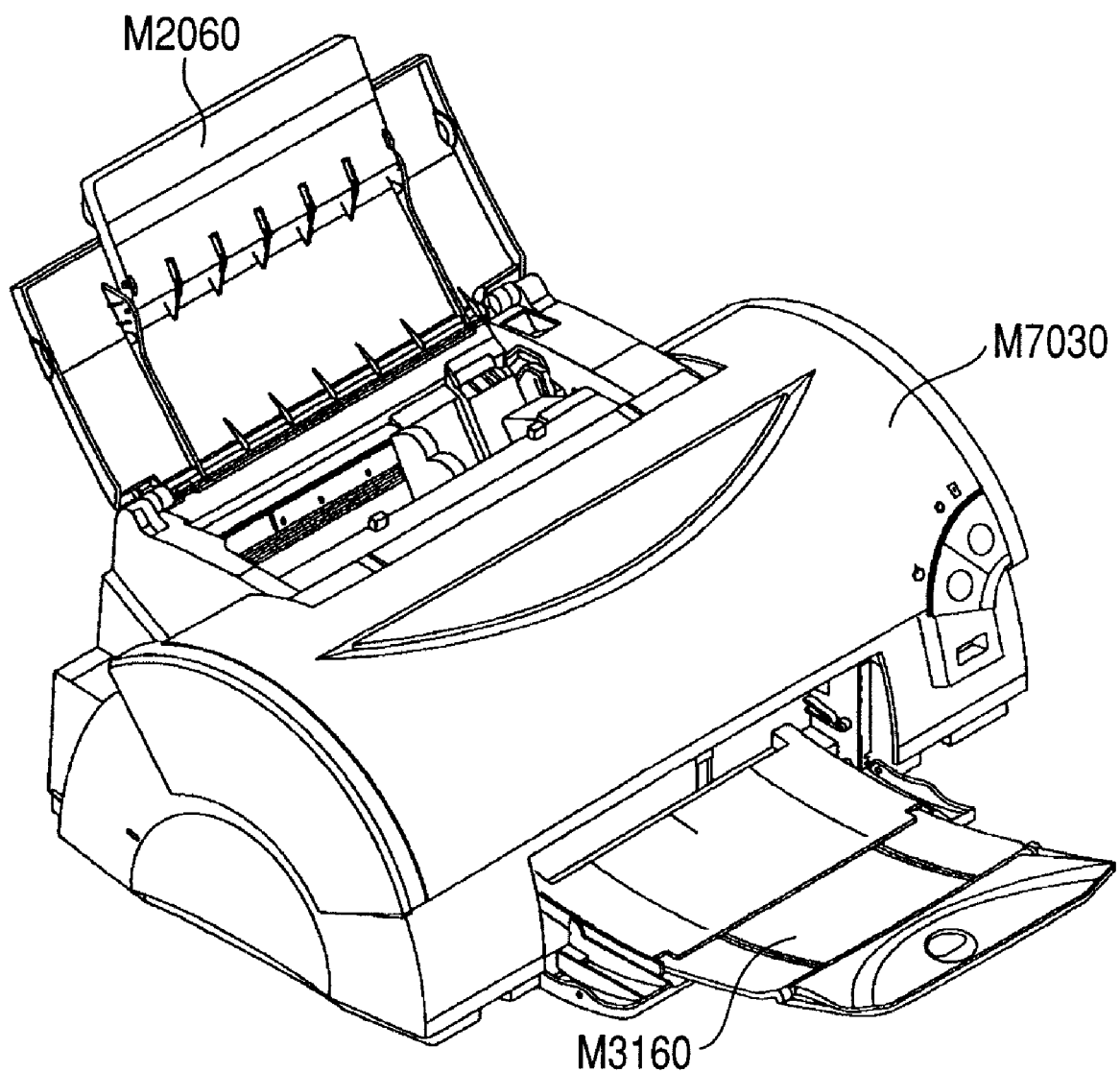
FIG. 1 is a perspective view of an ink jet recording apparatus.

The present invention will hereinafter be described in detail by exemplary embodiments. Incidentally, when a compound is a salt, the salt is present in an ink as being dissociated into ions. In the present invention, however, the ink is represented as "containing the salt" for the sake of convenience. In the following description, the compounds represented by the general formulae (I) to (VII) may be shortened and described as "compounds of the general formulae (I) to (VII)", respectively. The number of substituents in each compound in an ink is an average value unless expressly noted. The respective embodiments corresponding to the respective objects in the present invention have been separately described above. However, the inks may be simply referred to as "inks according to the present invention". In the following description, the above-described compounds and coloring materials may be simply referred to as "first coloring material" and "second coloring material", and coloring materials and compounds not included in the present invention may be referred to as "general" dyes, coloring materials and compounds.

<Ink>

The components making up the ink according to the present invention and physical properties of the ink will hereinafter be described in detail.

(Coloring Material)

A main feature of the present invention resides in that a compound of the following general formula (I) as a first coloring material and a compound of the following general formula (II) as a second coloring material are used in combination as coloring materials of an ink to achieve excellent ozone fastness in an image formed.

[First Coloring Material: Compound Represented by the General Formula (I)]

The ink according to the present invention requires containing the compound of the following general formula (I) as the first coloring material (dye).

General formula (I)

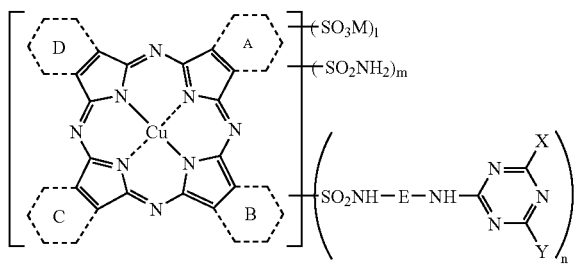

wherein A, B, C and D are, independently of one another, an aromatic six-membered ring, M is a hydrogen atom, alkali metal, ammonium or organic ammonium, E is an alkylene group, X is a sulfo-substituted anilino group, carboxyl-substituted anilino group or phosphono-substituted anilino group, with the proviso that such a substituted anilino group may further have 1 to 4 substituents selected from the group consisting of sulfonic, carboxyl, phosphono, sulfamoyl, carbamoyl, hydroxyl, alkoxy, amino, alkylamino, dialkylamino, arylamino, diarylamino, acetylamino, ureido, alkyl, nitro, cyano, alkylsulfonyl and alkylthio groups and halogen atoms, Y is a hydroxyl group or amino group, and l, m and n have the following relationship: $0 \leq l \leq 2$, $0 \leq m \leq 3$, $0.1 \leq n \leq 3$ and $l+m+n=1$ to 4.

In the general formula (I), A, B, C and D are, independently of one another, an aromatic six-membered ring. Examples of the aromatic six-membered ring include a benzene ring and nitrogen-containing heterocyclic rings. Examples of the heterocyclic rings include pyridine, pyrazine, pyrimidine and pyridazine rings. Among these rings, the pyridine or pyrazine ring is favorable and the pyridine ring is particularly favorable. Specific examples of the compound of the general formula (I), which are favorably usable in the present invention, include the following compounds: compounds in which all of A, B, C and D are benzene rings or nitrogen-containing heterocyclic rings, and compounds in which one to three of A, B, C and D are nitrogen-containing heterocyclic rings and the remainder is a benzene ring. According to the investigation by the present inventors, the compound of the general formula (I) has such a tendency that when the number of nitrogen-containing heterocyclic rings in the structure thereof increases, the ozone fastness of the resulting recorded article is improved, while the resistance to bronzing (inhibition of a bronzing phenomenon) is lowered to the contrary. Therefore, it is favorable that the number of the nitrogen-containing heterocyclic rings is controlled in view of a balance between ozone fastness and resistance to bronzing.

E in the general formula (I) is an alkylene group, and the number of carbon atoms in the alkylene group is favorably 2 to 12, more favorably 2 to 6. Specific examples of the alkylene group include ethylene group, propylene group, butylene group, pentylene group, hexylene group, cyclopropylenediyl group, 1,2- and 1,3-cyclopentylendiyl groups, and 1,2-, 1,3- and 1,4-cyclohexylene groups. Among these groups, ethylene, propylene and butylene groups are favorable.

X in the general formula (I) is a sulfo-substituted anilino group, carboxyl-substituted anilino group or phosphono-substituted anilino group. The substituted anilino group may further have 1 to 4 substituents, favorably 1 or 2 substituents selected from the following substituent group. Substituent group: sulfonic, carboxyl, phosphono, sulfamoyl, carbamoyl, hydroxyl, alkoxy, amino, alkylamino, dialkylamino, arylamino, diarylamino, acetylamino, ureido, alkyl, nitro, cyano, alkylsulfonyl and alkylthio groups and halogen atoms. Specific examples of X in the general formula (I) include 2,5-disulfoanilino, 2-sulfoanilino, 3-sulfoanilino, 4-sulfoanilino, 2-carboxyanilino, 2-methoxy-5-sulfoanilino, 4-ethoxy-2-sulfoanilino, 2-methyl-5-sulfoanilino, 2-nitro-4-sulfoanilino, 2-methoxy-4-nitro-5-sulfoanilino, 2-chloro-5-sulfoanilino, 2-carboxy-4-sulfoanilino, 3-carboxy-4-hydroxyanilino, 3-carboxy-4-hydroxy-5-sulfoanilino, 2-hydroxy-5-nitro-3-sulfoanilino, 4-acetylamino-2-sulfoanilino, 4-anilino-3-sulfoanilino, 3,5-dicarboxyanilino, 2-carboxy-4-sulfamoylanilino, 2,5-dichloro-4-sulfoanilino and 3-phosphonoanilino groups.

Y in the general formula (I) is a hydroxyl or amino group.

M in the general formula (I) is a hydrogen atom, alkali metal, ammonium or organic ammonium. Examples of the alkali metal include lithium, sodium and potassium. Examples of the organic ammonium include acetamido, benzamido, methylamino, butylamino, diethylamino and phenylamino. Incidentally, when the compound of the general formula (I) has two sulfonic groups, namely 1 in the general formula (I) is 2, the sulfonic groups may has the same or different M's.

The sulfonic, carboxyl or phosphono group mentioned upon the description of X in the compound of the general formula (I) may be in the form of a salt. Examples of a counter ion for forming the salt include ions of alkali metals, ammonium and organic ammonium. Examples of the alkali metals include lithium, sodium and potassium. Examples of the organic ammonium include onium salts of alkylamines having 1 to 3 carbon atoms, such as methylamine and ethylamine, and mono-, di- or tri-[(C1-C4)alkanol]amines such as monoethanolamine, diethanolamine, triethanolamine, monoisopropanolamine, diisopropanolamine and triisopropanolamine. The counter ion may be an alkaline earth metal such as calcium or magnesium.

The compound of the general formula (I) can be synthesized in the following manner. A compound (copper porphyrazine compound) of the following general formula (A) is first synthesized.

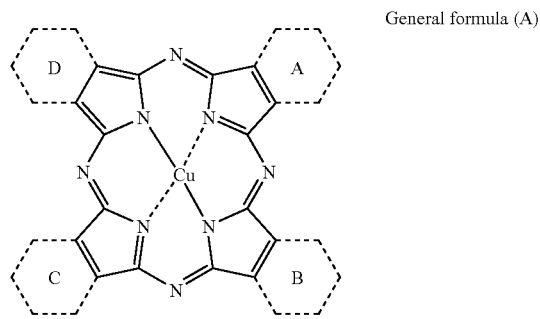

General formula (A)

wherein A, B, C and D are, independently of one another, an aromatic six-membered ring.

The compound of the general formula (A) is obtained by, for example, reacting a nitrogen-containing aromatic heterocyclic dicarboxylic acid derivative with a phthalic acid derivative in the presence of a catalyst and a copper compound. The molar ratio in the reaction of the nitrogen-containing aromatic heterocyclic dicarboxylic acid derivative with the phthalic acid derivative is changed, whereby the number of nitrogen-containing aromatic heterocyclic rings and the number of benzene rings in A, B, C and D can be controlled.

Examples of the nitrogen-containing aromatic heterocyclic dicarboxylic acid derivative used at this time include dicarboxylic acid compounds such as quinolinic acid, 3,4-pyridinedicarboxylic acid and 2,3-pyrazinedicarboxylic acid, and acid anhydrides thereof; dicarboxyamide compounds such as pyridine-2,3-dicarboxyamide; dicarboxylic acid monoamide compounds such as pyrazine-2,3-dicarboxylic acid monoamide; acid imide compounds such as quinolinic acid imide; and dicarbonitrile compounds such as pyridine-2,3-dicarbonitrile and pyrazine-2,3-dicarbonitrile. Examples of the phthalic acid derivative include phthalic acid, phthalic anhydride, phthalamide, phthalamic acid, phthalimide, phthalonitrile, 1,3-diiminoisoindoline and 2-cyanobenzamide.

General methods for synthesizing the copper compound include a nitrile method and a Wyler's method, which are different from each other in reaction conditions. The nitrile method is a method for synthesizing the copper compound by using, as a raw material, a dicarbonitrile compound such as 2,3-pyridine-dicarbonitrile, 2,3-pyrazine dicarbonitrile or phthalonitrile. The Wyler's method is a method for synthesizing the copper compound by using the following compound as a raw material. Examples of the compound usable as the raw material for the Wyler's method include dicarboxylic acid compounds such as phthalic acid, quinolinic acid, 3,4-pyridine-dicarboxylic acid, acid and 2,3-pyrazinedicarboxylic acid, and acid anhydrides thereof; dicarboxyamide compounds such as phthalimide, 2,3-pyridinedicarboxyamide; dicarboxylic acid monoamide compounds such as phthalamic acid and 2,3-pyrazinedicarboxylic acid monoamide; and acid imide compounds such as phthalimide and quinolinic acid imide. Incidentally, urea is required to synthesize the copper compound by the Wyler's method, and the amount of urea used is favorably 5 mol to 100 mol per one mol of the total of the nitrogen-containing aromatic heterocyclic dicarboxylic acid derivative and phthalic acid derivative.

The synthesis reaction of the copper compound is generally conducted in the presence of an organic solvent. In the nitrile method, an organic solvent having a boiling point of 100° C. or more, favorably 130° C. or more is used. Examples of organic solvents usable in the nitrile method include alcohols such as n-amyl alcohol, n-hexanol, cyclohexanol, 2-methyl-1-pentanol, 1-heptanol, 1-octanol, 2-ethylhexanol, N,N-dimethyl-aminoethanol and benzyl alcohol; glycols such as ethylene glycol and propylene glycol; trichlorobenzene; chloronaphthalene; nitrobenzene; quinolinesulfolane; and urea. In the Wyler's method, an aprotic organic solvent having a boiling point of 150° C. or more, preferably 180° C. or more is used. Examples of organic solvents usable in the Wyler's method include trichlorobenzene, chloronaphthalene, nitrobenzene, quinoline, sulfolane and urea. The amount of the organic solvent used is favorably one to 100 times as much as the total mass of the nitrogen-containing aromatic heterocyclic dicarboxylic acid derivative and phthalic acid derivative.

Examples of catalysts usable in the nitrile method include amines such as quinoline, 1,8-diazabicyclo[5,5,0]-7-undecene, tributylamine, ammonia and N,N-dimethylaminoethanol; and alkali metal alcoholates such as sodium ethoxide and sodium methoxide. Examples of catalysts usable in the Wyler's method include ammonium molybdate and boric acid. The amount of these catalysts used is favorably 0.001 mol to 1 mol per mol of the total of the nitrogen-containing aromatic heterocyclic dicarboxylic acid derivative and phthalic acid derivative.

Examples of the copper compound used in the above synthesis include metal copper, copper halides, copper carboxylates, copper sulfate, copper nitrate, copper acetylacetonate and copper complexes. Specifically, copper chloride, copper bromide, copper acetate and copper acetylacetonate are mentioned. The amount of the copper compound used is favorably 0.15 mol to 0.35 mol per one mol of the total of the nitrogen-containing aromatic heterocyclic dicarboxylic acid derivative and phthalic acid derivative.

The reaction temperature in the nitrile method is favorably 100° C. to 200° C., more favorably 130° C. to 170° C. The reaction temperature in the Wyler's method is favorably 150° C. to 300° C., more favorably 170° C. to 220° C. Incidentally, the reaction time varies according to reaction conditions, but is generally favorably 1 hour to 40 hours. After completion of the reaction, filtration, washing and drying are conducted, whereby the copper porphyrazine compound represented by the general formula (A) can be obtained.

A compound (copper dibenzobis(2,3-pyrido)porphyrazine) in which two of A, B, C and D in the general formula (A) are pyridine rings, and the remainder are benzene rings is taken as an example to describe the synthesis process of the compound of the general formula (I) in more detail.

Quinolinic acid (0.5 mol), phthalic anhydride (0.5 mol), copper(II) chloride (0.25 mol), phosphorus ammonium molybdate (0.004 mol) and urea (6 mol) are first reacted for 5 hours at 200° C. in sulfolane that is an organic solvent. In such a manner, copper dibenzobis(2,3-pyrido)porphyrazine in which two of A, B, C and D in the general formula (A) are pyridine rings, and the remainder are benzene rings is obtained. Incidentally, reactivities of quinolinic acid, phthalic anhydride, the metal compound, the organic solvent and the catalyst vary according to the kinds thereof and the amounts used, and are not limited thereto.

The main product obtained by the above-described synthesis process is copper dibenzobis(2,3-pyrido)porphyrazine. In this compound, 5 isomers (the following structural formulae 1A, 1B, 1C, 1D and 1E) that are different in the positions of the pyridine rings and the positions of the nitrogen atom in the pyridine rings exist. Copper tribenzo(2,3-pyrido)porphyrazine and copper benzotris(2,3-pyrido)porphyrazine are formed as by-products at the same time of the formation of the main product. Copper tribenzo(2,3-pyrido)porphyrazine is a compound (the following structural formula 2) in which one of A, B, C and D in the general formula (A) is a pyridine ring, and the remainder are benzene rings. Copper benzotris(2,3-pyrido)porphyrazine is a compound in which three of A, B, C and D in the general formula (A) are pyridine rings, and the remainder is a benzene ring. In these compounds, regioisomers (the following structural formulae 3A, 3B, 3C and 3D) with respect to pyridine ring also exist. In addition, copper tetrakis(2,3-pyrido)porphyrazine and copper phthalocyanine (copper tetrabenzoporphyrazine) are also formed though the amounts thereof are small. In other words, the product obtained by the above-described synthesis process is a mixture of these compounds.

It is generally very different to isolate only the intended compound from the mixture of these compounds. Therefore, the mixture of these compounds is often used as "copper dibenzobis(2,3-pyrido)porphyrazine in which 2 rings are pyridine rings and the remainder are benzene rings on the average".

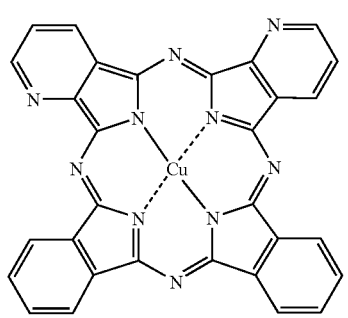

Structural formula 1A

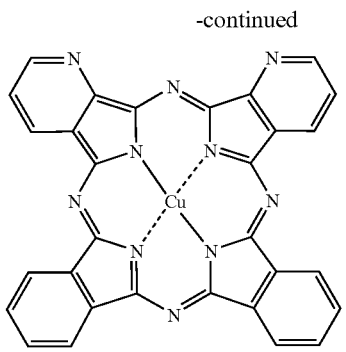

Structural formula 1B

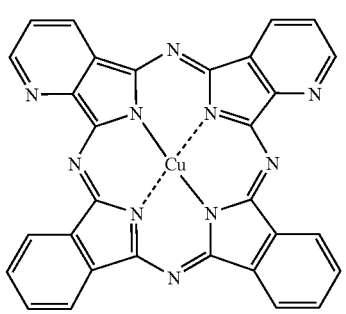

Structural formula 1C

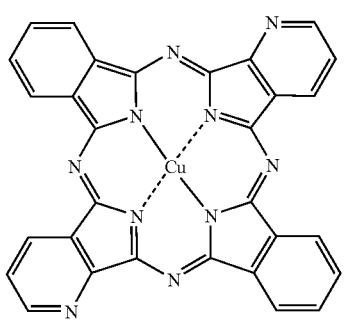

Structural formula 1D

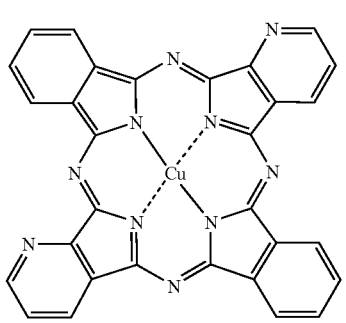

Structural formula 1E

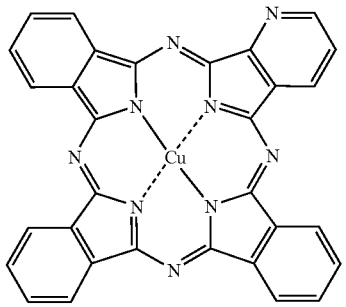

Structural formulae 2

-continued

Structural formulae 3A

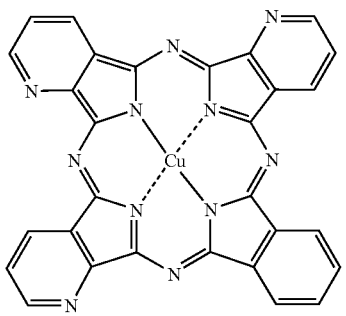

Structural formulae 3B

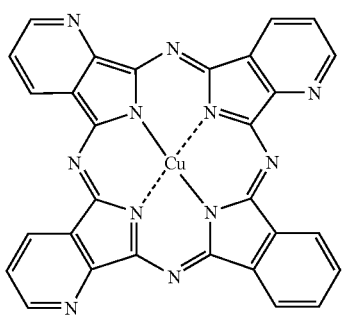

Structural formulae 3C

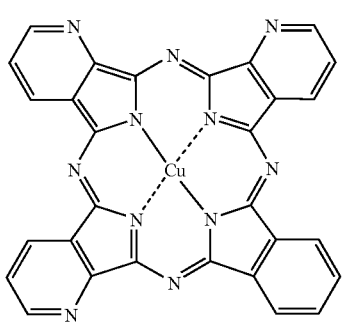

Structural formula 3D

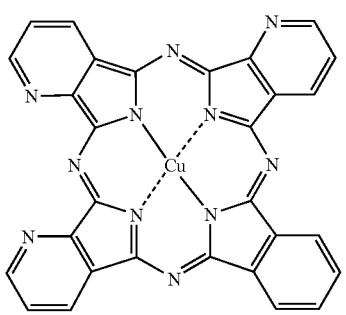

A compound (copper chlorosulfonylporphyrazine compound) of the following general formula (B) is then synthesized.

General formula (B)

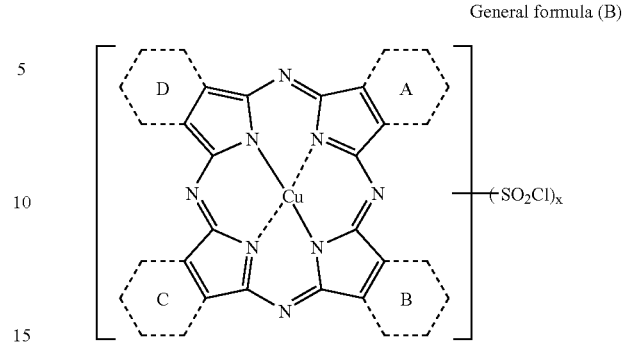

wherein A, B, C and D are, independently of one another, an aromatic six-membered ring, and x is 1 to 4.

The compound of the general formula (B) is obtained by chlorosulfonating the compound of the general formula (A) obtained in the above-described manner in chlorosulfonic acid.

The compound is also obtained by sulfonating the compound of the general formula (A) in a sulfuric acid or fuming sulfuric acid and then deriving a chlorosulfonic group from the sulfonic group with a chlorinating agent. When A, B, C and D in the general formula (A) are benzene rings, the chlorosulfonic group or sulfonic group obtained in such a manner is introduced into such benzene rings. When A, B, C and D are nitrogen-containing aromatic heterocyclic rings, the chlorosulfonic group or sulfonic group is not introduced. In other words, the chlorosulfonic group or sulfonic group is introduced into only benzene ring(s) among A, B, C and D in the general formula (A).

In the reaction for chlorosulfonating the compound of the general formula (A), chlorosulfonic acid is generally used as a solvent. The amount of chlorosulfonic acid used is favorably 3 to 20 times, more favorably 5 to 10 times as much as the mass of the compound of the general formula (A). The reaction temperature is generally favorably 100° C. to 150° C., more favorably 120° C. to 150° C. The reaction time varies according to conditions such as reaction temperature, but is generally favorably 1 hour to 10 hours. The substituent of the resultant compound of the general formula (B) is a mixture of the chlorosulfonic and sulfonic groups. However, the proportion of the chlorosulfonic group can be increased by adding the chlorinating agent to the reaction system. Examples of the chlorinating agent include chlorosulfonic acid, thionyl chloride, sulfuryl chloride, phosphorus trichloride, phosphorus pentachloride and phosphorus oxychloride. Needless to say, the present invention is not limited thereto.

The compound of the general formula (B) can also be obtained by the following process in addition to the above-described process. Sulfophthalic acid having a sulfonic group, or sulfophthalic acid having a sulfonic group and quinolinic acid are subjected to condensation ring closure, thereby synthesizing a compound (copper porphyrazine compound having a sulfonic group) of the following general formula (C). A chlorosulfonic group is derived from the sulfonic group in the thus-obtained compound of the general formula (C), whereby the compound of the general formula (B) can be obtained.

General formula (C)

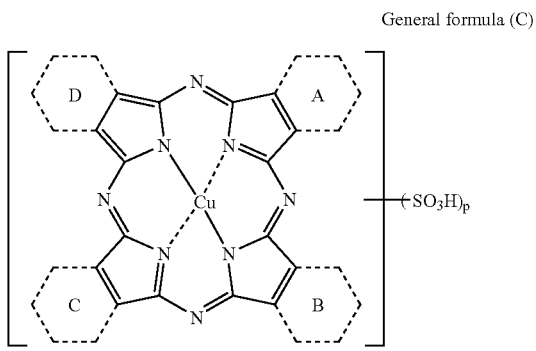

wherein A, B, C and D are, independently of one another, an aromatic six-membered ring, and p is 1 to 4.

The sulfonic group in the compound of the general formula (C) can be converted to a chlorosulfonic group by reacting the compound of the general formula (C) with a chlorinating agent. Examples of a solvent used in the reaction for the chlorination include sulfuric acid, fuming sulfuric acid, chlorosulfonic acid, benzene, toluene, nitrobenzene, chlorobenzene, N,N-dimethylformamide and N,N-dimethylacetamide. Examples of the chlorinating agent include chlorosulfonic acid, thionyl chloride, sulfuryl chloride, phosphorus trichloride, phosphorus pentachloride and phosphorus oxychloride. Needless to say, the present invention is not limited thereto.

Finally, the compound of the general formula (B) obtained in the above-described manner, a compound (organic amine) of the following general formula (D) and ammonia are reacted to synthesize the intended compound of the general formula (I).

General formula (D)

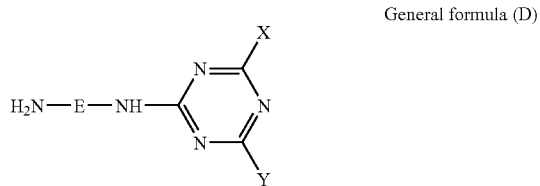

wherein E is an alkylene group, X is a sulfo-substituted anilino group, carboxyl-substituted anilino group or phosphono-substituted anilino group, with the proviso that such a substituted anilino group may further have 1 to 4 substituents selected from the group consisting of sulfonic, carboxyl, phosphono, sulfamoyl, carbamoyl, hydroxyl, alkoxy, amino, alkylamino, dialkylamino, arylamino, diarylamino, acetylamino, ureido, alkyl, nitro, cyano, alkylsulfonyl and alkylthio groups and halogen atoms, and Y is a hydroxyl group or amino group.

Specifically, the compound of the general formula (I) used in the present invention can be synthesized by using the above-described respective compounds according to the following procedure. Namely, the compound of the general formula (B) obtained above, the compound of the general formula (D) and ammonia (aminating agent) are reacted for 1 hour to 20 hours under conditions of generally a pH of 8 to 10 and a temperature of 5° C. to 70° C., thereby obtaining the compound of the general formula (I). Examples of ammonia used at this time include ammonium salts such as ammonium chloride and ammonium sulfate, urea, aqueous ammonia, and ammonia gas. The use of these compounds permits introducing them into the reaction system. Incidentally, the reaction of the compound of the general formula (B), the compound of the general formula (C) and the aminating agent is generally conducted in water. The amount of mole of the compound of the general formula (D) is favorably 1 times or more the theoretical value per one mol of the compound of the general formula (B) though the amount varies according to the reactivity of the compound of the general formula (D) and reaction conditions.

The compound of the general formula (D) can be synthesized in the following manner. A substituted aniline compound (0.95 to 1.0 mol) corresponding to X in the general formula (D) and 2,4,6-trichloro-S-triazine (cyanuric chloride, 1 mol) are first reacted for 2 hours to 12 hours under conditions of a pH of 3 to 7 and a temperature of 5° C. to 40° C. in water, thereby obtaining a primary condensate. When the compound of the general formula (D), in which Y in the formula is an amino group, is provided, the primary condensate obtained above is then reacted with ammonia (0.95 to 2.0 mol) for 0.5 to 12 hours under conditions of a pH of 4 to 10 and a temperature of 5° C. to 80° C. When the compound of the general formula (D), in which Y in the formula is a hydroxyl group, is provided, an alkali metal hydroxide such as sodium hydroxide is then added to the primary condensate obtained above to conduct a reaction for 0.5 to 8 hours under conditions of a pH of 4 to 10 and a temperature of 5° C. to 80° C. The compound of the general formula (D) can be obtained according to such procedure. Incidentally, the pH upon the condensation can be adjusted with an alkali metal hydroxide such as sodium hydroxide or potassium hydroxide, or an alkali metal carbonate such as sodium carbonate or potassium carbonate. Incidentally, the order of the condensation can be suitably determined according to the reactivity of the respective compound.

As described above, the compound of the general formula (I) is synthesized from the compound of the general formula (B) and the compound of the general formula (D) in the presence of ammonia. Therefore, it is considered that a part of the chlorosulfonyl group in the compound of the general formula (B) is theoretically hydrolyzed with water present in the reaction system to form a product converted to sulfonic acid as a by-product and the by-product is mixed into the compound of the general formula (I). However, it is difficult to distinguish an unsubstituted sulfamoyl group from a sulfonic group by mass spectrometric analysis. In the present invention, all chlorosulfonyl groups in other compounds of the general formula (B) than that reacted with the compound (organic amine) of the general formula (D) are thus described as those converted to an unsubstituted sulfamoyl group (—$SO_2$—$NH_2$).

When the compound of the general formula (I) is synthesized according to the above-described process, impurities resulting from the reaction in which a copper porphyrazine ring (Pz) forms a dimer (Pz-L-Pz) and a trimer (Pz-L-Pz-L-Pz) through a divalent linking group may be mixed as by-products in the reaction product in some cases. In this case, the divalent linking group (L) is —$SO_2$— or —$SO_2$—NH—$SO_2$—. In the case of the trimer, these 2 linking groups (L) may be combined in some cases to form the by-product.

The compound of the general formula (I) can be taken out of such reaction system as described above by filtration after conducting acidifying out or salting out. The salting out can be conducted in an acidic to alkaline range and is favorably conducted in a pH range of from 1 to 11. The salting out is favorably conducted by heating the reaction product to 40 to 80° C., favorably 50 to 70° C. and then adding common salt.

The compound of the general formula (I) synthesized by such process as described above is provided in the form of a free acid or a salt thereof. In order to provide the compound of the general formula (I) in the form of the free acid, it is only necessary to conduct acidifying out. In order to provide the compound of the general formula (I) in the form of the salt, it is only necessary to conduct salting out. If the desired salt is not provided by the salting out, it is only necessary to utilize, for example, an ordinary salt interchange method in which the reaction product is converted to the form of a free acid, and a desired organic or inorganic base is then added.

Specific favorable examples of the compound of the general formula (I) include Exemplified Compounds I-1 to I-25 shown in the following Table 1. Incidentally, in Table 1, portions of A, B, C, D, E, X and Y in the general formula (I) are respectively shown. Needless to say, the compounds of the general formula (I) in the present invention are not limited to the following Exemplified Compounds so far as the compounds are embraced in the structure of the general formula (I) and definition thereof. When A, B, C and D in the general formula (I) are pyridine rings, regioisomers with respect to the nitrogen atom exist as described above, and so a mixture of these regioisomers is contained upon the synthesis of the compound. It is difficult to isolate these isomers, and it is also difficult to identify these isomer by analysis. Accordingly, the compound of the general formula (I) is generally used in the form of the mixture. However, the effects of the present invention are achieved even when containing isomers, so that the compound of the general formula (I) is described herein without distinguishing the isomers. In the present invention, the number of pyridine rings among A, B, C and D in the general formula (I) is favorably 1 to 3, more favorably 1 or 2. In this case, an image having better ozone fastness can be achieved, and an absorption wavelength becomes broad, so that a color difference due to difference in light source becomes low, and metamerism is improved. Among the following Exemplified Compounds, Exemplified Compounds I-1 to I-3, I-10 to I-12, I-21 to I-23, and I-25 are particularly favorably used. Incidentally, Exemplified Compound I-25 is a compound of M in the general formula (I) corresponds to sodium.

TABLE 1

Exemplified Compounds of general formula (I)

| Exemplified Compound | A | B | C | D | E | X | Y | l | m | n |
|---|---|---|---|---|---|---|---|---|---|---|
| I-1 | 2,3-PD | Bz | Bz | Bz | Et | 2,5-Disulfoanilino | $NH_2$ | 0 | 2 | 1 |
| I-2 | 2,3-PD | 2,3-PD | Bz | Bz | Et | 2,5-Disulfoanilino | $NH_2$ | 0 | 1 | 1 |
| I-3 | 2,3-PD | Bz | 2,3-PD | Bz | Et | 2,5-Disulfoanilino | $NH_2$ | 0 | 1 | 1 |
| I-4 | 2,3-PD | 2,3-PD | 2,3-PD | Bz | Et | 2,5-Disulfoanilino | $NH_2$ | 0 | 0 | 1 |
| I-5 | 2,3-PD | Bz | Bz | Bz | Et | 4-Sulfoanilino | $NH_2$ | 0 | 2 | 1 |
| I-6 | 2,3-PD | Bz | Bz | Bz | Et | 2,5-Disulfoanilino | OH | 0 | 2 | 1 |
| I-7 | 2,3-PD | Bz | Bz | Bz | Et | 3,5-Dicarboxyanilino | $NH_2$ | 0 | 2 | 1 |
| I-8 | 2,3-PD | Bz | Bz | Bz | Pr | 2,5-Disulfoanilino | $NH_2$ | 0 | 2 | 1 |
| I-9 | 2,3-PD | Bz | Bz | Bz | Et | 2-Carboxy-4-sulfoanilino | $NH_2$ | 0 | 2 | 1 |
| I-10 | 2,3-PZ | Bz | Bz | Bz | Et | 2,5-Disulfoanilino | $NH_2$ | 0 | 2 | 1 |
| I-11 | 2,3-PZ | 2,3-PZ | Bz | Bz | Et | 2,5-Disulfoanilino | $NH_2$ | 0 | 1 | 1 |
| I-12 | 2,3-PZ | Bz | 2,3-PZ | Bz | Et | 2,5-Disulfoanilino | $NH_2$ | 0 | 1 | 1 |
| I-13 | 2,3-PZ | 2,3-PZ | 2,3-PZ | Bz | Et | 2,5-Disulfoanilino | $NH_2$ | 0 | 0 | 1 |

2,3-PD: 2,3-Pyrido
2,3-PZ: 2,3-Pyrazino
Bz: Benzo
Et: Ethylene
Pr: Propylene.

| | A | B | C | D | E | X | Y | l | m | n |
|---|---|---|---|---|---|---|---|---|---|---|
| I-14 | 2,3-PD | Bz | Bz | Bz | Et | 2-Metoxy-5-sulfoanilino | $NH_2$ | 0 | 2 | 1 |
| I-15 | 2,3-PD | Bz | Bz | Bz | Et | 2-Nitro-4-sulfoanilino | $NH_2$ | 0 | 2 | 1 |
| I-16 | 2,3-PD | Bz | Bz | Bz | Et | 2,5-Dichloro-4-sulfoanilino | $NH_2$ | 0 | 2 | 1 |
| I-17 | 2,3-PD | Bz | Bz | Bz | Bt | 2,5-Disulfoanilino | $NH_2$ | 0 | 2 | 1 |
| I-18 | 2,3-PD | Bz | Bz | Bz | Et | 3-Carboxy-4-hydroxy-5-sulfoanilino | $NH_2$ | 0 | 2 | 1 |
| I-19 | 2,3-PD | Bz | Bz | Bz | Et | 2-Sulfoanilino | OH | 0 | 2 | 1 |
| I-20 | 2,3-PD | Bz | Bz | Bz | Et | 3-Sulfoanilino | OH | 0 | 2 | 1 |
| I-21 | 3,4-PD | Bz | Bz | Bz | Et | 2,5-Disulfoanilino | $NH_2$ | 0 | 2 | 1 |
| I-22 | 3,4-PD | 3,4-PD | Bz | Bz | Et | 2,5-Disulfoanilino | $NH_2$ | 0 | 1 | 1 |
| I-23 | 3,4-PD | Bz | 3,4-PD | Bz | Et | 2,5-Disulfoanilino | $NH_2$ | 0 | 1 | 1 |
| I-24 | 3,4-PD | 3,4-PD | 3,4-PD | Bz | Et | 2,5-Disulfoanilino | $NH_2$ | 0 | 0 | 1 |
| I-25 | Bz | Bz | Bz | Bz | Et | 2,5-Disulfoanilino | $NH_2$ | 1 | 2 | 1 |

2,3-PD: 2,3-Pyrido
3,4-PD: 3,4-Pyrido
Bz: Benzo
Et: Ethylene
Bt: Butylene.

[Second Coloring Material: Compound Represented by the General Formula (II)]

The ink according to the present invention requires containing the compound represented by the following general formula (II) as the second coloring material (dye) together with the above-described first coloring material.

General formula (II)

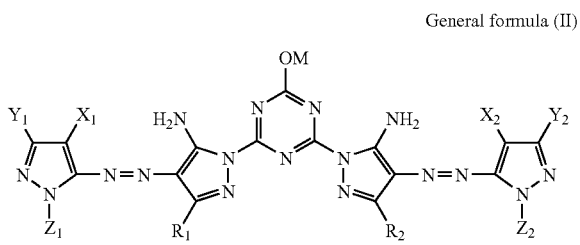

wherein $R_1$, $R_2$, $Y_1$ and $Y_2$ are, independently of one another, a monovalent group, $X_1$ and $X_2$ are, independently of each other, an electron attractive group having a Hammett's σp value of 0.20 or more, $Z_1$ and $Z_2$ are, independently of each other, a hydrogen atom, substituted or unsubstituted alkyl group, substituted or unsubstituted alkenyl group, substituted or unsubstituted alkynyl group, substituted or unsubstituted aralkyl group, substituted or unsubstituted aryl group, or substituted or unsubstituted heterocyclic group, and M is a hydrogen atom, alkali metal, ammonium or organic ammonium.

$R_1$, $R_2$, $Y_1$ and $Y_2$ in the general formula (II) are, independently of one another, a monovalent group. Specifically, the monovalent group may be the following substituent: hydrogen atom, halogen atom, alkyl, cycloalkyl, aralkyl, alkenyl, alkynyl, aryl, heterocyclic, cyano, hydroxyl, nitro, alkoxy, aryloxy, silyloxy, heterocyclic oxy, acyloxy, carbomoyloxy, alkoxycarbonyloxy, aryloxycarbonyloxy, amino(alkylamino, arylamino), acylamino(amido), aminocarbonylamino(ureido), alkoxycarbonylamino, aryloxycarbonylamino, sulfamoylamino, alkylsulfonylamino, arylsulfonylamino, alkylthio, arylthio, heterocyclic thio, sulfamoyl, alkylsulfinyl, arylsulfinyl, alkylsulfonyl, arylsulfonyl, acyl, aryloxycarbonyl, alkoxycarbonyl, carbamoyl, phosphino, phosphinyl, phosphinylamino, silyl, azo or imido group. These groups may be further substituted.

Among the above-mentioned substituents, the monovalent group is favorably the following substituent: hydrogen atom, halogen atom, alkyl, aryl, heterocyclic, cyano, alkoxy, amido, ureido, alkylsulfonylamino, arylsulfonylamino, sulfamoyl, alkylsulfonyl, arylsulfonyl, carbamoyl or alkoxycarbonyl group. Among these substituents, hydrogen atom, halogen atom, alkyl, aryl, cyano, alkylsulfonyl, arylsulfonyl and heterocyclic groups are particularly favorable.

$R_1$, $R_2$, $Y_1$ and $Y_2$ in the general formula (II) will hereinafter be described in more detail.

Examples of the halogen atom include chlorine, bromine and iodine atoms. Among these, the chlorine or bromine atom is favorable, and the chlorine atom is particularly favorable.

Examples of the alkyl group include substituted or unsubstituted alkyl groups having 1 to 30 carbon atoms. Specific examples thereof include methyl, ethyl, butyl, t-butyl, n-octyl, eicosyl, 2-chloroethyl, hydroxyethyl, cyanoethyl and 4-sulfobutyl.

Examples of the cycloalkyl group include substituted or unsubstituted cycloalkyl groups having 5 to 30 carbon atoms. Specific examples thereof include cyclohexyl, cyclopentyl and 4-n-dodocylcyclohexyl.

Examples of the aralkyl group include substituted or unsubstituted aralkyl groups having 7 to 30 carbon atoms. Specific examples thereof include benzyl and 2-phenethyl.

Examples of the alkenyl group include substituted or unsubstituted alkenyl groups having 2 to 30 carbon atoms. Specific examples thereof include vinyl, allyl, prenyl, geranyl, oleyl, 2-cyclopenten-1-yl and 2-cyclohexen-1-yl.

Examples of the alkynyl group include substituted or unsubstituted alkynyl groups having 2 to 30 carbon atoms. Specific examples thereof include ethynyl and propargyl.

Examples of the aryl group include substituted or unsubstituted aryl groups having 6 to 20 carbon atoms. Specific examples thereof include phenyl, p-tolyl, naphthyl, m-chlorophenyl and o-hexadecanoylaminophenyl.

The heterocyclic group is a five-membered or six-membered ring and is a monovalent group obtained by removing a hydrogen atom from a substituted or unsubstituted aromatic or non-aromatic heterocyclic compound. This heterocyclic group may be further fused. In particular, the heterocyclic group is favorably a five-membered or six-membered aromatic heterocyclic group having 3 to 50 carbon atoms. When examples of the heterocyclic group are mentioned without limiting a substituted position, examples thereof include pyridine, pyrazine, pyridazine, pyrimidine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidone, piperidine, piperazine, imidazolidine and thiazoline.

Examples of the alkoxy group include substituted or unsubstituted alkoxy groups having 1 to 30 carbon atoms. Specific examples thereof include methoxy, ethoxy, isopropoxy, n-octyloxy, methoxyethoxy, hydroxyethoxy and 3-carboxypropoxy.

Examples of the aryloxy group include substituted or unsubstituted aryloxy groups having 6 to 30 carbon atoms. Specific examples thereof include phenoxy, 2-methylphenoxy, 4-t-butylphenoxy, 3-nitro-phenoxy and 2-tetradecanoylaminophenoxy.

Examples of the silyloxy group include silyloxy groups having 3 to 30 carbon atoms. Specific examples thereof include trimethylsilyloxy and t-butyldimethylsilyloxy.

Examples of the heterocyclic oxy group include substituted or unsubstituted heterocyclic oxy groups having 2 to 30 carbon atoms. Specific examples thereof include 1-phenyltetrazole-5-oxy and 2-tetrahydropyranyloxy.

Examples of the acyloxy group include substituted or unsubstituted alkylcarbonyloxy groups having 2 to 30 carbon atoms and substituted or unsubstituted arylcarbonyloxy groups having 6 to 30 carbon atoms. Specific examples thereof include formyloxy, acetyloxy, pivaloyloxy, stearoyloxy, benzoyloxy and p-methoxyphenylcarbonyloxy.

Examples of the carbamoyloxy group include substituted or unsubstituted carbamoyloxy groups having 1 to 30 carbon atoms. Specific examples thereof include N,N-dimethylcarbamoyloxy, N,N-diethylcarbamoyl-oxy, morpholinocarbonyloxy, N,N-di-n-octylaminocarbonyloxy and N-n-octylcarbamoyloxy.

Examples of the alkoxycarbonyloxy group include substituted or unsubstituted alkoxycarbonyloxy groups having 2 to 30 carbon atoms. Specific examples thereof include methoxycarbonyloxy, ethoxycarbonyloxy, t-butoxycarbonyloxy and n-octyloxycarbonyloxy.

Examples of the aryloxycarbonyloxy group include substituted or unsubstituted aryloxycarbonyloxy groups having 7 to 30 carbon atoms. Specific examples thereof include phenoxycarbonyloxy, p-methoxyphenoxy-carbonyloxy and p-n-hexadecyloxyphenoxycarbonyloxy.

Examples of the amino group include substituted or unsubstituted alkylamino groups having 1 to 30 carbon atoms and substituted or unsubstituted arylamino groups having 6 to 30 carbon atoms. Specific examples thereof include amino, methylamino, dimethylamino, anilino, N-methylanilino, diphenylamino, hydroxyethylamino, carboxyethylamino, sulfoethylamino and 3,5-dicarboxyanilino.

Examples of the acylamino group include substituted or unsubstituted alkylcarbonylamino groups having 1 to 30 carbon atoms and substituted or unsubstituted arylcarbonylamino groups having 6 to 30 carbon atoms. Specific examples thereof include formylamino, acetylamino, pivaloylamino, lauroylamino, benzoylamino and 3,4,5-tri-n-octyloxyphenylcarbonyl-amino.

Examples of the aminocarbonylamino group include substituted or unsubstituted aminocarbonylamino groups having 1 to 30 carbon atoms. Specific examples thereof include carbamoylamino, N,N-dimethylamono-carbonylamino, N,N-diethylaminocarbonylamino and morpholinecarbonylamino.

Examples of the alkoxycarbonylamino group include substituted or unsubstituted alkoxycarbonyl-amino groups having 2 to 30 carbon atoms. Specific examples thereof include methoxycarbonylamino, ethoxy-carbonylamino, t-butoxycarbonylamino, n-octadecyloxy-carbonylamino and N-methyl-methoxycarbonylamino.

Examples of the aryloxycarbonylamino group include substituted or unsubstituted aryloxycarbonyl-amino groups having 7 to 30 carbon atoms. Specific examples thereof include phenoxycarbonylamino, p-chlorophenoxycarbonylamino and m-n-octyloxyphenoxy-carbonylamino.

Examples of the sulfamoylamino group include substituted or unsubstituted sulfamoylamino groups having 0 to 30 carbon atoms. Specific examples thereof include sulfamoylamino, N,N-dimethylaminosulfonylamino and N-n-octylaminosulfonylamino.

Examples of the alkylsulfonylamino group and arylsulfonylamino group include substituted or unsubstituted alkylsulfonylamino groups having 1 to 30 carbon atoms and substituted or unsubstituted arylsulfonylamino groups having 6 to 30 carbon atoms. Specific examples thereof methylsulfonylamino, butylsulfonylamino, phenylsulfonylamino, 2,3,5-trichlorophenylsulfonylamino and p-methylphenylsulfonylamino.

Examples of the alkylthio group include substituted or unsubstituted alkylthio groups having 1 to 30 carbon atoms. Specific examples thereof methylthio, ethylthio and n-hexadecylthio.

Examples of the arylthio group include substituted or unsubstituted arylthio groups having 6 to 30 carbon atoms. Specific examples thereof include phenylthio, p-chlorophenylthio and m-methoxyphenylthio.

Examples of the heterocyclic thio group include substituted or unsubstituted heterocyclic thio groups having 2 to 30 carbon atoms. Specific examples thereof include 2-benzothiazolylthio and 1-phenyltetrazol-5-ylthio.

Examples of the sulfamoyl group include substituted or unsubstituted sulfamoyl groups having 0 to 30 carbon atoms. Specific examples thereof include N-ethylsulfamoyl, N-(3-dodecyloxypropyl)sulfamoyl, N,N-dimethylsulfamoyl, N-acetylsulfamoyl, N-benzoyl-sulfamoyl and N—(N'-phenylcarbamoyl)sulfamoyl.

Examples of the alkylsulfinyl group and aryl-sulfinyl group include substituted or unsubstituted alkylsulfinyl groups having 1 to 30 carbon atoms and substituted or unsubstituted arylsulfonyl groups having 6 to 30 carbon atoms. Specific examples thereof include methylsulfinyl, ethylsulfinyl, phenylsulfinyl and p-methylphenylsulfinyl.

Examples of the alkylsulfonyl group and arylsulfonyl group include substituted or unsubstituted alkylsulfonyl groups having 1 to 30 carbon atoms and substituted or unsubstituted arylsulfonyl groups having 6 to 30 carbon atoms. Specific examples thereof include methylsulfonyl, ethylsulfonyl, phenylsulfonyl and p-toluenesulfonyl.

Examples of the acyl group include formyl, substituted or unsubstituted alkylcarbonyl groups having 2 to 30 carbon atoms, substituted or unsubstituted arylcarbonyl groups having 7 to 30 carbon atoms, and substituted or unsubstituted heterocyclic carbonyl groups having 4 to 30 carbon atoms and bonded to a carbonyl group through a carbon atom. Specific examples thereof include acetyl, pivaloyl, 2-chloro-acetyl, stearoyl, benzoyl, p-n-octyloxyphenylcarbonyl, 2-pyridinecarbonyl and 2-furylcarbonyl.

Examples of the aryloxycarbonyl group include substituted or unsubstituted aryloxycarbonyl groups having 7 to 30 carbon atoms. Specific examples thereof include phenoxycarbonyl, o-chlorophenoxycarbonyl, m-nitrophenoxycarbonyl and p-t-butylphenoxycarbonyl.

Examples of the alkoxycarbonyl group include substituted or unsubstituted alkoxycarbonyl groups having 2 to 30 carbon atoms. Specific examples thereof include methoxycarbonyl, ethoxycarbonyl, t-butoxycarbonyl and n-octadecyloxycarbonyl.

Examples of the carbamoyl group include substituted or unsubstituted carbamoyl groups having 1 to 30 carbon atoms. Specific examples thereof include carbamoyl, N-methylcarbamoyl, N,N-dimethylcarbamoyl, N,N-di-n-octylcarbamoyl and N-(methylsulfonyl)carbamoyl.

Examples of the phosphino group include substituted or unsubstituted phosphino groups having 2 to 30 carbon atoms. Specific examples thereof include dimethylphosphino, diphenylphosphino and methylphenoxy-phosphino.

Examples of the phosphinyl group include substituted or unsubstituted phosphinyl groups having 2 to 30 carbon atoms. Specific examples thereof include phosphinyl, dioctyloxyphosphinyl and diethoxyphosphinyl.

Examples of the phosphinyloxy group include substituted or unsubstituted phosphinyloxy groups having 2 to 30 carbon atoms. Specific examples thereof include diphenoxyphosphinyloxy and dioctyloxyphosphinyloxy.

Examples of the phosphinylamino group include substituted or unsubstituted phosphinylamino groups having 2 to 30 carbon atoms. Specific examples thereof include dimethoxyphosphinylamino and dimethylamino-phosphinylamino.

Examples of the silyl group include substituted or unsubstituted silyl groups having 3 to 30 carbon atoms. Specific examples thereof include trimethylsilyl, t-butyldimethylsilyl and phenyldimethylsilyl.

Specific examples of the azo group include phenylazo, 4-methoxyphenylazo, 4-pivaloylaminophenylazo and 2-hydroxy-4-propanoylphenylazo.

Specific examples of the imido group include N-succinimido and N-phthalimido.

These substituents may be further substituted. Examples of substituents in this case include the following substituents: linear or branched alkyl groups having 1 to 12 carbon atoms, linear or branched aralkyl groups having 7 to 18 carbon atoms, linear or branched alkenyl groups having 2 to 12 carbon atoms, linear or branched alkynyl groups having 2 to 12 carbon atoms, linear or branched cycloalkyl groups having 3 to 12 carbon atoms and linear or branched cycloalkenyl groups having 3 to 12 carbon atoms. These substituents favorably have a branched chain and more favorably have an asymmetric carbon atom for the purpose of improving the solubility of the dye used and the stability of the resulting ink.

As specific examples of the substituents, may be mentioned the following substituents: substituted or unsubstituted alkyl groups such as methyl, ethyl, propyl, isopropyl, sec-butyl, t-butyl, 2-ethylhexyl, 2-methylsulfoethyl, 3-phenoxypropyl, trifluoromethyl and cyclopentyl; halogen atoms such as chlorine and bromine atoms; aryl groups such as phenyl, 4-t-butylphenyl and 2,4-di-t-amylphenyl; heterocyclic groups such as imidazolyl, pirazolyl, triazolyl, 2-furyl, 2-thienyl, 2-pyrimidinyl and 2-benzothiazolyl; cyano group; hydroxyl group; nitro group, carboxyl group; amino group; alkyloxy groups such as methoxy, ethoxy, 2-methoxyethoxy and 2-methylsulfonylethoxy; aryloxy groups such as phenoxy, 2-methylphenoxy, 4-t-butylphenoxy, 3-nitrophenoxy, 3-t-butylcarbonylphenoxy and 3-methoxycarbonylphenyloxy; acylamino groups such as acetamido, benzamido and 4-(3-t-butyl-4-hydroxyphenoxy)butanamido; alkylamino groups such as methylamino, butylamino, diethylamino and methylbutylamino; anilino groups such as phenylamino and 2-chloroanilino; ureido groups such as phenylureido, methylureido and N,N-dibutylureido; sulfamoylamino groups such as N,N-dipropylsulfamoylamino; alkylthio groups such as methylthio, octylthio and 2-phenoxy-ethylthio; arylthio groups such as phenylthio, 2-butoxy-5-t-octylphenylthio and 2-carboxyphenylthio; alkyloxycarbonylamino groups such as methoxycarbonylamino; alkyl- or arylsulfonylamino groups such as methylsulfonylamino, phenylsulfonylamino and p-toluenesulfonylamino; carbamoyl groups such as N-ethylcarbamoyl and N,N-dibutylcarbamoyl; sulfamoyl groups such as N-ethylsulfamoyl, N,N-dipropylsulfamoyl and N-phenylsulfamoyl; sulfonyl groups such as methyl-sulfonyl, octylsulfonyl, phenylsulfonyl and p-toluene-sulfonyl; alkyloxycarbonyl groups such as methoxy-carbonyl and butyloxycarbonyl; heterocyclic oxy groups such as 1-phenyltetrazol-5-oxy and 2-tetrahydropyranyloxy; azo groups such as phenylazo, 4-methoxyphenylazo, 4-pivaloylaminophenylazo and 2-hydroxy-4-propanoyl-phenylazo; acyloxy groups such a acetoxy; carbamoyloxy groups such as N-methylcarbamoyloxy and N-phenyl-carbamoyloxy; silyloxy groups such as trimethylsilyloxy and dibutylmethylsilyloxy; aryloxycarbonylamino groups such as phenoxycarbonylamino; imido groups such as N-succinimido and N-phthalimido; heterocyclic thio groups such as 2-benzothiazolythio, 2,4-diphenoxy-1,3,5-triazol-6-thio and 2-pyridylthio; sulfinyl groups such as 3-phenoxypropylsulfinyl; phosphonyl groups such as phenoxyphosphonyl, octylphosphonyl and phenyl-phosphonyl; aryloxycarbonyl groups such as phenoxy-carbonyl; acyl groups such as acetyl, 3-phenylpropanoyl and benzoyl; and ionic hydrophilic groups such as carboxyl, sulfonic, phosphono and quaternary ammonium groups.

The second coloring material used in the present invention and represented by the general formula (II) requires that $X_1$ and $X_2$ in the general formula (II) are, independently of each other, an electron attractive group having a Hammett's σp value of 0.20 or more. Here, Hammett's rule and Hammett's substituent constant, σp value (hereinafter referred to as "Hammett's σp value") will now be described. The Hammett's rule is an empirical rule advocated by L. P. Hammett in 1935 for quantitatively discussing the influence of a substituent on the reaction and equilibrium of a benzene derivative and its propriety is widely recognized at present. The substituent constants determined by the Hammett's role include a σp value and a σm value. These values are set forth in many general books. For example, the detailed description thereof is given in Langer's Handbook of Chemistry, 12$^{th}$ edition; edited by J. A. Dean, 1979, McGraw-Hill, and Region of Chemistry, extra edition; No. 122, pp. 96 to 103, 1979, Nanko-do.

In the present invention, the respective substituents are defined by the Hammett's σp value. However, the present invention is not limited to substituents whose σp values were specifically described in such literature as described above. It is needless to say that the present invention also includes substituents whose σp values are not described in such literature as described above but are to be included within the range when the σp values thereof are calculated out according to the Hammett's rule. The compound of the general formula (II) is not a benzene derivative. In the present invention, however, the σp value is used as a scale indicating the electron effect of a substituent irrespective of the substituted position. Specific examples of substituents usable as electron attractive groups having a Hammett's σp value of 0.20 or more in the substituents that the compound of the general formula (II) used in the present invention has will hereinafter be mentioned in terms of range of the Hammett's σp value.

Electron attractive groups having a Hammett's σp value of 0.60 or more include the following groups: cyano, nitro, alkylsulfonyl (for example, methane-sulfonyl) and arylsulfonyl (for example, benzene-sulfonyl) groups.

Electron attractive groups having a Hammett's σp value of 0.45 or more include, in addition to the above-mentioned groups, the following groups: acyl (for example, acetyl), alkoxycarbonyl (for example, dodecyloxycarbonyl), aryloxycarbonyl (for example, m-chlorophenoxycarbonyl), alkylsulfinyl (for example, n-propylsulfinyl), arylsulfinyl (for example, phenylsulfinyl), sulfamoyl (for example, N-ethylsulfamoyl, N,N-dimethylsulfamoyl) and halogenated alkyl (for example, trifluoromethyl) groups.

Electron attractive groups having a Hammett's σp value of 0.30 or more include, in addition to the above-mentioned groups, the following groups: acryoxy (for example, acetoxy), carbamoyl (for example, N-ethylcarbamoyl, N,N-dibutylcarbamoyl), halogenated alkoxy (for example, trifluoromethyloxy), halogenated aryloxy (for example, pentafluorophenyloxy), sulfonyloxy (for example, methylsulfonyloxy), halogenated alkylthio (for example, difluoromethylthio), aryl substituted with 2 or more substituents having a σp value of 0.15 or more (for example, 2,4-dinitrophenyl, pentafluorophenyl), and heterocyclic (for example, 2-benzoxazolyl, 2-benzothiazolyl, 1-phenyl-2-benzimidazole).

Electron attractive groups having a Hammett's σp value of 0.20 or more include halogen atoms (for example, fluorine, chlorine, bromine) in addition to the above-mentioned groups.

$Z_1$ and $Z_2$ in the general formula (II) are, independently of each other, any one of the following substituents: hydrogen atom, substituted or unsubstituted alkyl group, substituted or unsubstituted alkenyl group, substituted or unsubstituted alkynyl group, substituted or unsubstituted aralkyl group, substituted or unsubstituted aryl group, and substituted or unsubstituted heterocyclic group. Examples of the alkyl group include the same groups as the alkyl groups mentioned above in the description of $R_1$, $R_2$, $Y_1$ and $Y_2$. Examples of the alkenyl group include the same groups as the alkenyl groups mentioned above in the description of $R_1$, $R_2$, $Y_1$ and $Y_2$. Examples of the alkynyl group include the same groups as the alkynyl groups mentioned above in the description of $R_1$, $R_2$, $Y_1$ and $Y_2$. Examples of the aralkyl group include the same groups as the aralkyl groups mentioned above in the description of $R_1$, $R_2$, $Y_1$ and $Y_2$. Examples of the aryl group include the same groups as the aryl groups mentioned above in the description of $R_1$, $R_2$, $Y_1$ and $Y_2$. Examples of the heterocyclic group include the same groups as the heterocyclic groups mentioned above in the description of $R_1$, $R_2$, $Y_1$ and $Y_2$.

These substituents may be further substituted. Examples of substituents in this case include the same groups as the groups for further substituting the substituents mentioned above in the description of $R_1$, $R_2$, $Y_1$ and $Y_2$.

M in the general formula (II) is a hydrogen atom, alkali metal, ammonium or organic ammonium. Examples of the alkali metal include lithium, sodium and potassium. Examples of the organic ammonium include acetamido, benzamido, methylamino, butylamino, diethylamino and phenylamino.

Specific favorable examples of the compound of the general formula (II) include the following Exemplified Compounds II-1 to II-14. Incidentally, the following Exemplified Compounds are described in the form of a free acid. Needless to say, the compounds of the general formula (II) in the present invention are not limited to the following Exemplified Compounds so far as the compounds are embraced in the structure of the general formula (II) and definition thereof. Among the following Exemplified Compounds, Exemplified Compounds II-5, II-6, II-7, II-8 and II-10 are favorably used in the present invention.

Exemplified compound II-1

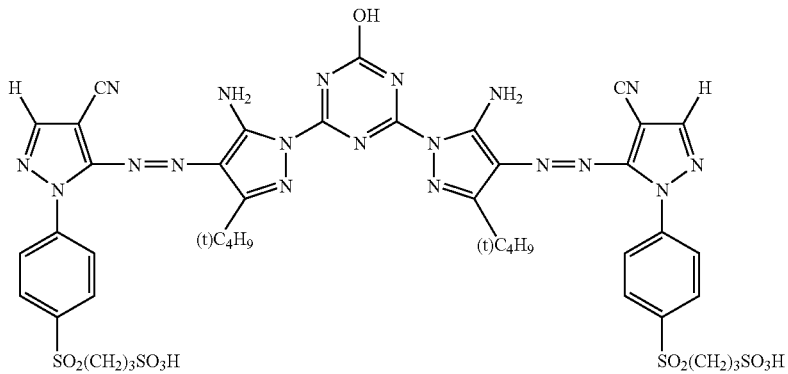

Exemplified compound II-2

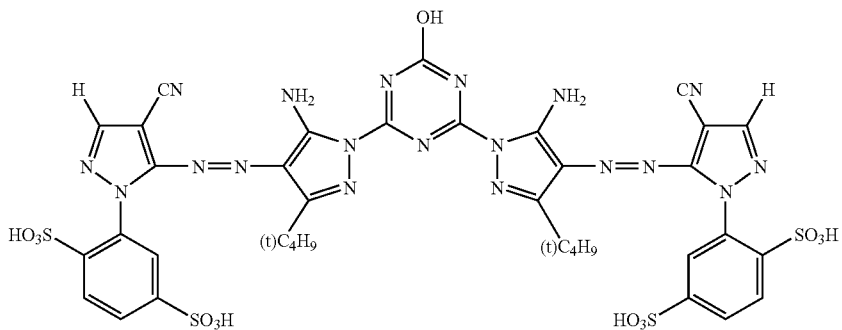

Exemplified compound II-3

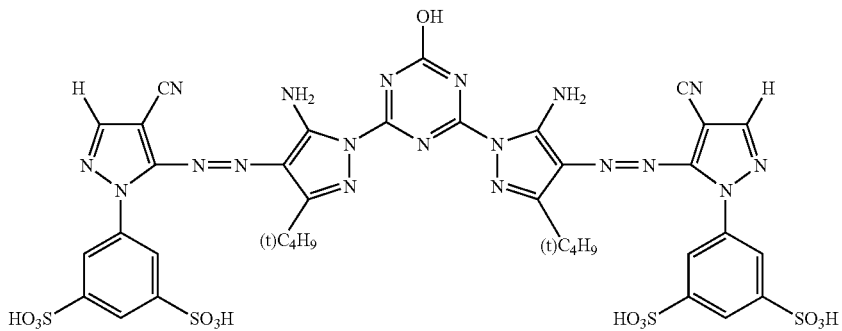

Exemplified compound II-4

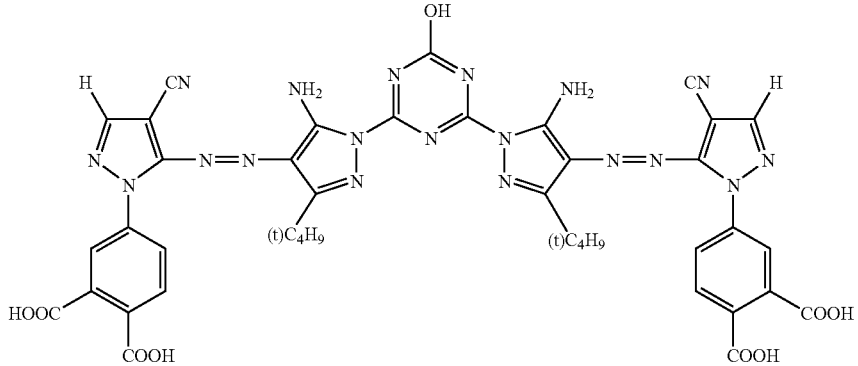

-continued
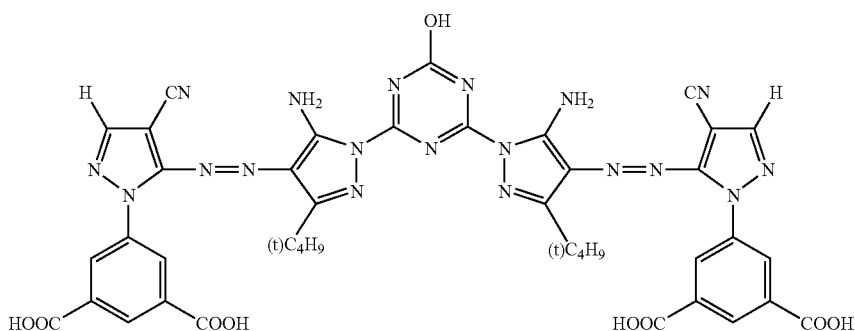
Exemplified compound II-5
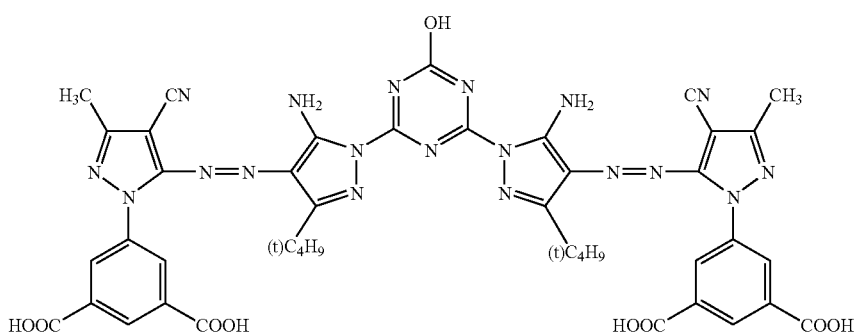
Exemplified compound II-6
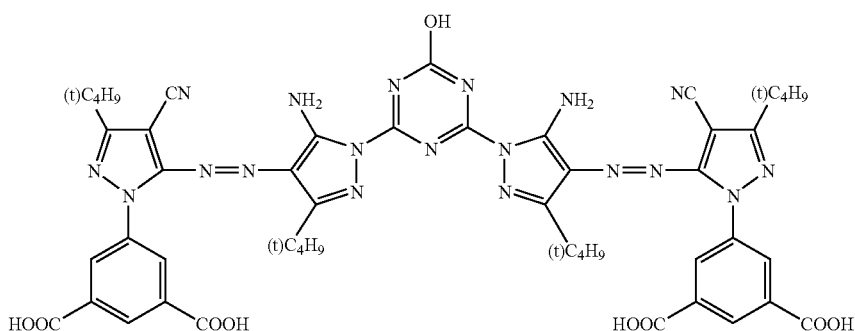
Exemplified compound II-7
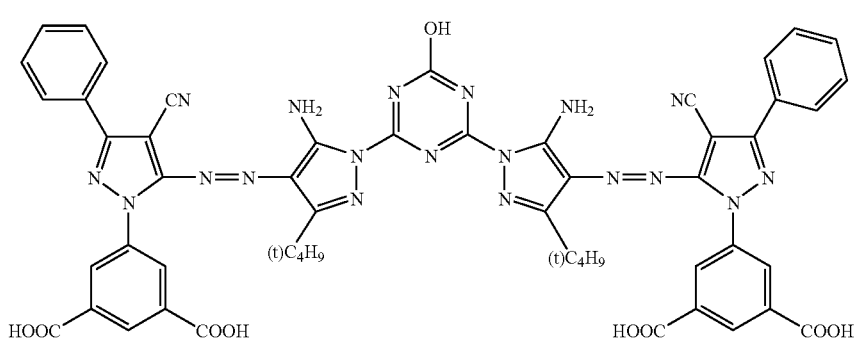
Exemplified compound II-8

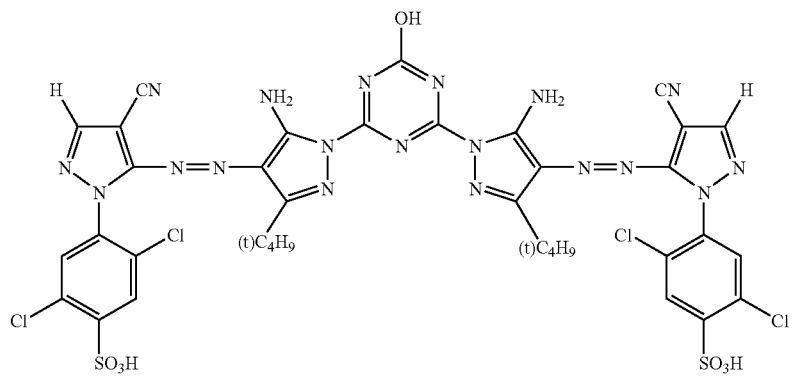
Exemplified compound II-9
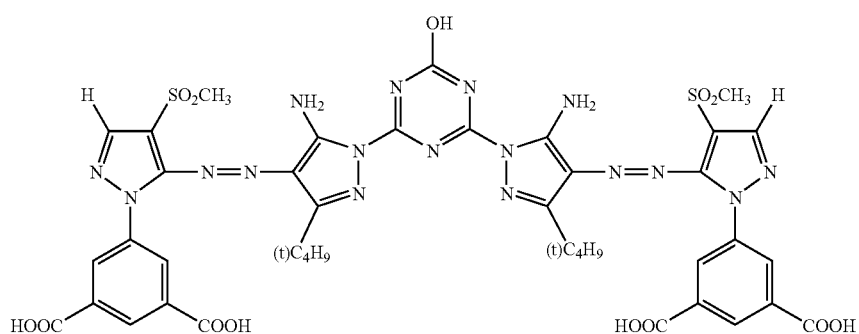
Exemplified compound II-10
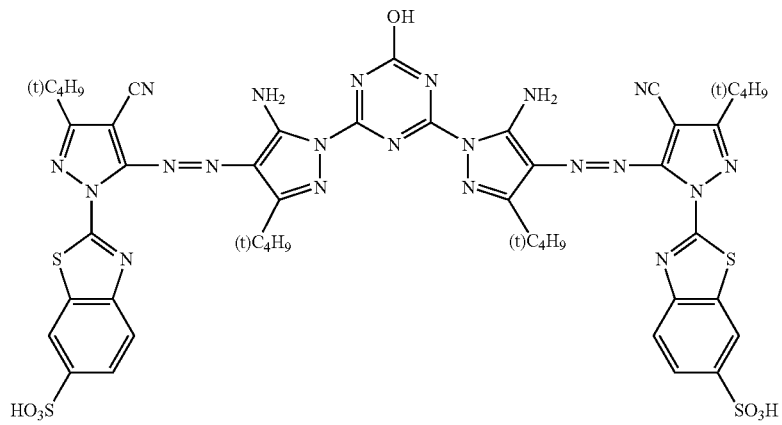
Exemplified compound II-11
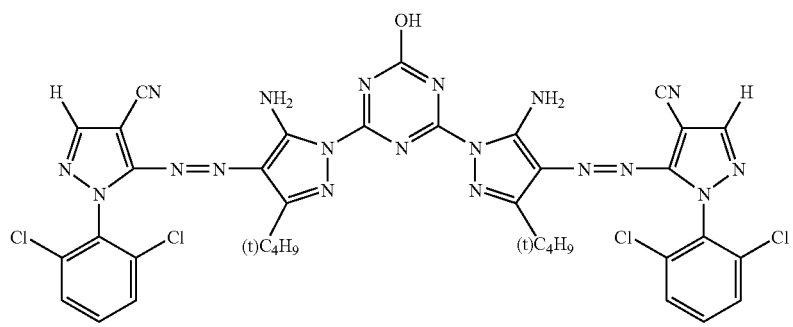
Exemplified compound II-12

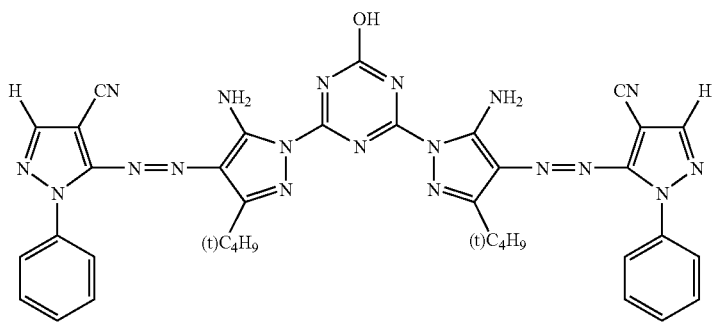

Exemplified compound II-13

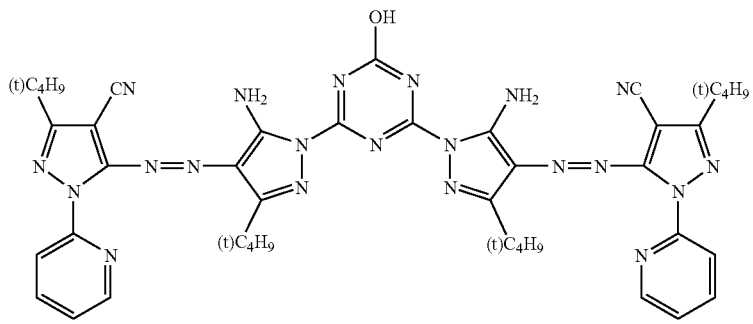

Exemplified compound II-14

[Contents of First Coloring Material and Second Coloring Material]

The content (% by mass) of the first coloring material (compound of the general formula (I)) in the ink is favorably from 0.1% by mass or more to 10.0% by mass or less based on the total mass of the ink. The content (% by mass) of the second coloring material (compound of the general formula (II)) in the ink is favorably from 0.1% by mass or more to 10.0% by mass or less based on the total mass of the ink.

The total of the content (% by mass) of the first coloring material and the content (% by mass) of the second coloring material in the ink is favorably from 1.0% by mass or more to 10.0% by mass or less based on the total mass of the ink. The total of the content (% by mass) of these coloring materials is particularly favorably from 1.5% by mass or more to 7.0% by mass or less. If the total of the content is less than 1.0% by mass, the ozone fastness and color develop abilities of the resulting image may not be sufficiently achieved in some cases. If the total of the content exceeds 10.0% by mass, the ink jet properties such as sticking resistance may not be achieved in some cases.

The content (% by mass) of the first coloring material based on the total mass of the ink is favorably from 0.1 times or more to 15.0 times or less in terms of mass ratio to the content (% by mass) of the second coloring material (first coloring material/second coloring material). More specifically, the ratio {the content of the compound of the general formula (I)/the content of the compound of the general formula (II)} is favorably from 0.1 times or more to 15.0 times or less. When the mass ratio between these contents is controlled within the above range, the ozone fastness of the resulting image can be particularly improved. In the present invention, the mass ratio is more favorably from 1.0 time or more to 8.0 times or less. When the mass ratio between these contents is controlled within the above range, the interaction (which will be described in detail subsequently) between the first coloring material and the second coloring material is particularly strongly exhibited, whereby better ozone fastness of the image can be achieved.

[Investigation on the Effect to Improve the Ozone Fastness of an Image by the Combined Use of First Coloring Material and Second Coloring Material]

As described above, in an image formed with the ink containing the second coloring material excellent in the ozone fastness and light fastness of the resulting image, and the first coloring material, the marked lowering of ozone fastness in an image formed with a conventional ink due to marked deterioration of a cyan component was inhibited. This result can be explained from the relative relation between the first coloring material and the second coloring material in the ink and analysis of the image formed.

The present inventors have carried out an investigation on the image formed with the ink according to the present invention, and images formed with inks making combined use of other coloring materials or inks making single use of the respective coloring materials as follows. Specifically, the position of each coloring material in a thickness-wise direction of an ink-receiving layer of a recording medium (permeation depth) was measured by cutting each image and observing the section thereof, and the positions measured were compared. As a result, the position of each coloring material existing in the ink-receiving layer was similar between the image formed with the ink containing only a general cyan dye and the image formed with the ink containing the general cyan dye and the compound of the general formula (II). In other words, the existing position of the general cyan dye was concentrated in the vicinity of the surface of the ink-receiving layer and was at a shallow position in the thickness-wise direction. On the other hand, in the image formed with the ink containing the compound of the general formula (I) and the compound of the general formula (II), the compound of the general formula (I) permeated into the ink-receiving layer of the recording medium and existed dispersively up to a position relatively deep from the surface. Namely, it has been found that the ink containing the first coloring material and second coloring material makes the first coloring material permeate and exist at a deeper position than the conventional ink.

The present inventors have analyzed the condition of dyes in inks and searched the aggregation condition or association condition of the dyes in the inks and the adsorption rates of the respective dyes on components making up an ink-receiving layer. Incidentally, upon the search of the adsorption rates, alumina hydrate and silica particles that are general as the components making up the ink-receiving layer have been investigated.

<Aggregation Condition or Association Condition of Dye in Ink>

The aggregation condition or association condition of a dye can be determined by a small angle X-ray scattering method. The small angle X-ray scattering method is a method commonly used in calculation of an interparticle distance in a colloidal solution as described in "New Colloidal Chemistry" (KODANSHA SCIENTIFIC LTD., KITAHARA Fumio, FURUSAWA Kunio), and "Surface State and Colloidal State" (TOKYO KAGAKU DOZIN CO., LTD., NAKAGAI Masayuki). The present inventors have determined the aggregation condition or association condition of dyes by this small angle X-ray scattering method. As a result, the aggregation condition or association condition of dyes in an aqueous dye solution containing the first coloring material and second coloring material has been found to be as follows compared with an aqueous dye solution containing a general cyan dye and the compound of the general formula (II) and an aqueous dye solution containing only the general cyan dye. Specifically, it has been found that in the aqueous dye solution containing the first coloring material and second coloring material, the aggregation condition or association condition of the cyan coloring material is somewhat inhibited. It has also been found that the aggregation condition of the dyes in the ink according to the present invention is particularly inhibited in aggregation. Accordingly, when used in combination with the compound of the general formula (II), the aggregation of the compound of the general formula (I) is more inhibited than the general cyan dye. Therefore, it has been found that in the permeation of the dye in an image formed into the ink-receiving layer, the compound of the general formula (I) permeates deeper, and the above-described effect is brought about.

<Adsorption Rate of Dye on Components Making Up Ink-receiving Layer>

The adsorption rate of a general cyan dye on components making up an ink-receiving layer when the cyan dye was used in combination with the compound of the general formula (II) was almost the same as an adsorption rate when this general cyan dye was singly used. In any case, the adsorption rate was about 100%. However, in the case of the compound of the general formula (I), the adsorption rate thereof was found to be changed when used in combination with the compound of the general formula (II). Specifically, the adsorption rate when the compound of the general formula (I) was singly used was about 100%, while the adsorption rate of the compound of the general formula (I) when the compound of the general formula (II) was used in combination with the compound of the general formula (II) was lowered to about 40%.

Incidentally, the term "adsorption rate" in the present invention means a proportion of a coloring material adsorbed on a material (for example, aluminum oxide) forming an ink-receiving layer of a recording medium. This adsorption rate can be calculated out by adding an aqueous solution containing a dye the absorbance of which has been measured in advance to an aqueous solution containing, for example, an alumina dispersion, stirring the resultant mixed solution for a certain period of time and then measuring the absorbance of the aqueous solution.

As a result of the investigation by the present inventors, such a phenomenon in the compound of the general formula (I) as described above has been found to show the same tendency in not only the case where the component forming the ink-receiving layer is an alumina system, but also the case where the component forming the ink-receiving layer is another general material such as a silica system. From the result of the above-described investigation, it can be understood that the ink according to the present invention can markedly inhibit the lowering of ozone fastness of the resulting image.

In order to confirm a predominant element for achieving the above-described effect from the respective structures of the first coloring material and second coloring material, the present inventors have carried out an investigation by separating respective elements to establish the technology of the present invention. First, description is given with reference to FIGS. 7A to 7E that are typical views illustrating existing positions of respective coloring materials in an ink-receiving layer of a recording medium in the case where inks respectively containing the respective coloring materials have been separately applied to the recording medium.

Figure 7A:
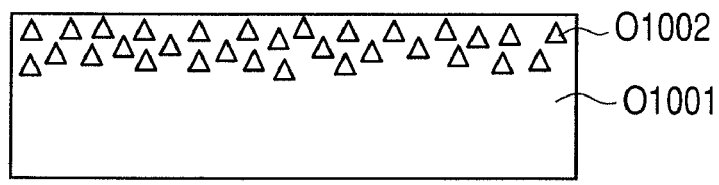
FIGS. 7A, 7B, 7C, 7D and 7E typically illustrate presence positions of coloring materials in an ink-receiving layer of a recording medium when inks containing the respective coloring materials have been separately applied to the recording medium.
Figure 7B:
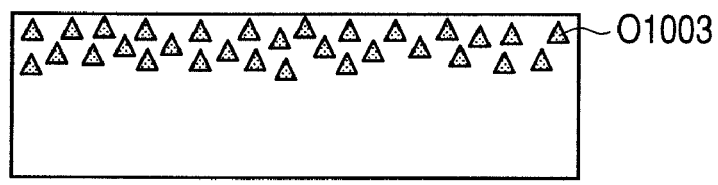

When an ink containing only a general cyan dye O1002 as a coloring material was applied to a recording medium, the dye O1002 existed at a shallow position (in the vicinity of the surface) in the thickness-wise direction of an ink-receiving layer O1001 of the recording medium as illustrated in FIG. 7A. When an ink containing only the compound O1003 of the general formula (I) was applied to a recording medium, the compound O1003 of the general formula (I) existed at a shallow position (in the vicinity of the surface) in the thickness-wise direction of an ink-receiving layer O1001 of the recording medium like the above as illustrated in FIG. 7B.

Figure 7C:
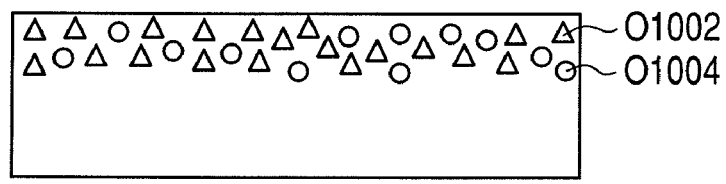
Figure 7D:
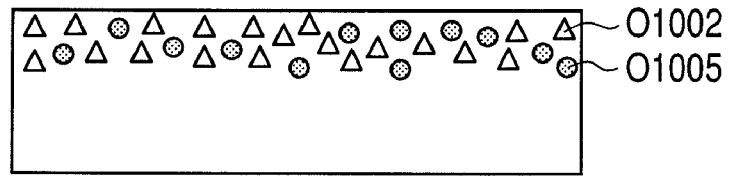

When an ink containing the general cyan dye O1002 and another general dye O1004 was applied to a recording medium, these dyes also existed at a shallow position (in the vicinity of the surface) in the thickness-wise direction of an ink-receiving layer O1001 of the recording medium as illustrated in FIG. 7C. When an ink containing the general cyan dye O1002 and the compound O1005 of the general formula (II) was applied to a recording medium, these dyes also existed at a shallow position (in the vicinity of the surface) in the thickness-wise direction of an ink-receiving layer O1001 of the recording medium as illustrated in FIG. 7D. The shallow position in the thickness-wise direction of the ink-receiving layer O1001 of the recording medium will hereinafter be referred to as "vicinity of the surface of the ink-receiving layer".

When oxide gases such as ozone gas in the air cause such a reaction that a coloring material is deteriorated when the coloring material exists in such a state as described above in the ink-receiving layer of the recording medium, the degree of deterioration of a cyan component existing in the vicinity of the surface of the ink-receiving layer becomes great. The compound of the general formula (I) that is a cyan dye used in the present invention also exists in the vicinity of the surface of the ink-receiving layer when the resulting ink contains only the compound as a coloring material because the adsorption rate of the compound on the component making up the ink-receiving layer of the recording medium is high.

Figure 7E:
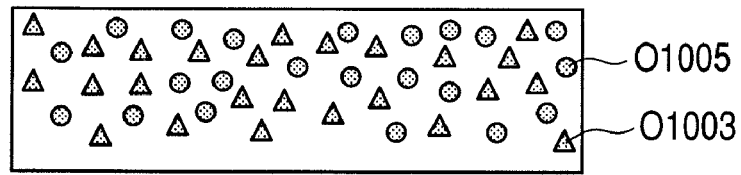

However, as illustrated in FIG. 7E, in an ink containing the compound O1003 of the general formula (I) and the compound O1005 of the general formula (II) as coloring materials, the existing positions of the respective coloring materials in the ink-receiving layer of the recording medium are as follows. Namely, these coloring materials are used in combination, whereby the adsorption rate of the compound O1003 of the general formula (I) on the ink-receiving layer O1001 becomes relatively low as described above. Therefore, the compound O1003 of the general formula (I) comes to exist at a position somewhat permeated in the thickness-wise direction of the ink-receiving layer O1001 compared with the case of FIG. 7B. As a result, it is inferred that the contact of the compound of the general formula (I) with oxide gases such as ozone gas in air is relieved when the coloring materials are used in combination as described above, and so the deterioration of a cyan component is inhibited, and the ozone fastness of the resulting image is improved.

Incidentally, in the case of the general cyan dye O1002, the adsorption rate on the component making up the ink-receiving layer O1001 remains high even when the cyan dye is used in combination with the compound O1005 of the general formula (II). Therefore, a marked difference is not found in the existing position of the coloring material as illustrated in FIG. 7D.

The present inventors infer that the reason why the existing position of the compound of the general formula (I) in the ink-receiving layer of the recording medium when the ink containing the compound of the general formula (I) and the compound of the general formula (II) in combination is used shows such specific behavior as described above is as follows. A software (WinMOPAC 3.9Pro; manufactured by FUJITSU) capable of calculating molecular orbits was used to find a stabilized structure of the compound of the general formula (II), and the following fact was found. Specifically, in the compound of the general formula (II), nitrogen atoms on the pyrazole rings having no amino group face each other and exist as a circular structure. The compound of the general formula (II) interacts with a triazine ring of the compound of the general formula (I), thereby taking such a state that the compound of the general formula (I) overlaps with the compound of the general formula (II). The interaction to the compound of the general formula (II) of the compound of the general formula (I) taking such a state is greater than the adsorption force thereof on the component making up the ink-receiving layer. On the other hand, the compound of the general formula (I) shows a decreased adsorption rate on the ink-receiving layer and comes to exist together with the compound of the general formula (II) at a position somewhat permeated in the thickness-wise direction of the ink-receiving layer. In such a manner, an image formed with the ink containing the compound of the general formula (I) and the compound of the general formula (II) is considered to be particularly markedly suppress deterioration caused by ozone.

As a result of an investigation by the present inventors, it has been found that the following phenomenon is caused by using, in combination, a phthalocyanine coloring material whose substituent contains a triazine ring and a compound having a skeleton in which (a plurality of) nitrogen-containing aromatic heterocyclic rings are directly bonded to a triazine ring. Specifically, it has been found that the above compound lowers the adsorption rate of the phthalocyanine coloring material on the ink-receiving layer, thereby improving the ozone fastness of the resulting image. A compound having a partial element structure of the compound represented by the general formula (I), which is the first coloring material, may hereinafter be referred to as "phthalocyanine coloring material". A compound having a partial element structure of the compound represented by the general formula (II), which is the second coloring material, may be referred to as "compound having a skeleton in which (a plurality of) nitrogen-containing aromatic heterocyclic rings are directly bonded to a triazine ring".

The present inventors have calculated molecular orbits for analyzing the factors thereof. As a result, it has been found that the following phenomenon is caused. Specifically, the triazine ring in the phthalocyanine coloring material approaches nitrogen-containing aromatic heterocyclic rings of the triazine ring in the other compound, whereby an existing interval (distance) between molecules of the phthalocyanine coloring material is widened. As a result, it has been found that the association condition of the phthalocyanine coloring material is hard to be taken. As a result, it is considered that the interaction between the phthalocyanine coloring material and the compound becomes strong, and the adsorption rate of the phthalocyanine coloring material on the ink-receiving layer is lowered. It has further been found that the phthalocyanine coloring material has nitrogen-containing aromatic heterocyclic ring(s) in its phthalocyanine skeleton, thereby the synergistic effect thereof is more increased. It has also been found that when the nitrogen-containing aromatic heterocyclic ring is a pyridine ring or pyrazine ring in particular, the synergistic effect is markedly increased. In this case, the nitrogen-containing aromatic heterocyclic ring in this compound particularly favorably has an amino group because the solubility of such a compound comes not to depend on pH, and the synergistic effect with the phthalocyanine coloring material can be retained more stably. When the compound is a compound having such a skeleton that a plurality of nitrogen-containing aromatic heterocyclic rings are directly bonded to the triazine ring, an existing interval (distance) between molecules of the phthalocyanine dye can be more widened. Therefore, the range of distribution of the phthalocyanine dye in the thickness-wise direction of the recording medium can be more widened, and so such a compound is particularly favorable. The nitrogen-containing aromatic heterocyclic ring in the above compound particularly favorably has an amino group because the solubility of this compound comes not to depend on pH as described above. In the present invention, the effect is the greatest so far as the above compound is a compound of the general formula (II), which satisfies all these conditions at the same time.

From the above, an ink having the following respective constitutions is provided, whereby an ink markedly exhibiting the above effects of the present invention can be obtained. (1) An ink containing a phthalocyanine coloring material which has a pyridine ring or pyrazine ring in the phthalocyanine skeleton thereof and has a substituent containing a triazine ring, and a compound having a skeleton in which a triazine ring is directly bonded to a nitrogen-containing aromatic heterocyclic ring; (2) an ink containing a phthalocyanine coloring material which has a nitrogen-containing aromatic heterocyclic ring in the phthalocyanine skeleton thereof and has a substituent containing a triazine ring, and a compound having a skeleton in which a triazine ring is directly bonded to the nitrogen-containing aromatic heterocyclic ring; (3) an ink containing a phthalocyanine coloring material which has a nitrogen-containing aromatic heterocyclic ring in the phthalocyanine skeleton thereof and has a substituent containing the triazine ring, and a compound having a skeleton in which a triazine ring is directly bonded to a plurality of nitrogen-containing aromatic heterocyclic rings; and (4) an ink containing a phthalocyanine coloring material which has a nitrogen-containing aromatic heterocyclic ring in the phthalocyanine skeleton thereof and has a substituent containing a triazine ring, and a compound represented by the general formula (II). In each of the inks having the respective constitutions (1), (2), (3) and (4), the nitrogen-containing aromatic heterocyclic ring in the compound favorably has an amino group.

[Third Coloring Material: Compound Represented by the General Formula (III), Compound Represented by the General Formula (IV) and/or Compound Represented by the General Formula (V)]

The ink according to the present invention favorably further contains a third coloring material in addition to the first coloring material and the second coloring material. As the third coloring material, is used at least one compound selected from the group consisting of a compound represented by the following general formula (III), a compound represented by the following general formula (IV) and a compound represented by the following general formula (V). Incidentally, at least one compound selected from the group consisting of the compound represented by the following general formula (III), the compound represented by the following general formula (IV) and the compound represented by the following general formula (V) is referred to as the third coloring material in the following description. A gray ink providing an image excellent in ozone fastness and color tone can be obtained by using, in combination, the third coloring material in addition to the above-described first coloring material and second coloring material.

2-hydroxyethyl, 3-hydroxypropyl or 4-hydroxybutyl with the hydroxy substituted at its terminal is particularly favorable.

Examples of the monoalkylaminoalkyl group include mono-(C1-C4)alkylamino-(C1-C4)alkyl groups. Specific examples thereof include monomethylaminopropyl and monoethylaminopropyl.

Examples of the dialkylaminoalkyl group include di-(C1-C4)alkylamino-(C1-C4)alkyl groups. Specific examples thereof include dimethylaminopropyl and diethylaminoethyl.

In the present invention, R in the general formula (III) is favorably a hydrogen atom, alkyl group or cycloalkyl group, more favorably a hydrogen atom or alkyl group, and particularly favorably a methyl group.

X in the general formula (III) is a linking group. Examples of the linking group include the following linking groups 1 to 7. In the linking groups 1 to 7, a bond indicated with "*" is a bond of each nitrogen atom and directly bonded to each of different two triazine rings in the general formula (III). Among the following linking groups, the linking group 1 is particularly favorably used.

Linking group 1

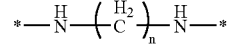

wherein n is 2 to 8, favorably 2 to 6, more favorably 2, and '*'s are respective linking sites to different two triazine rings.

General formula (III)

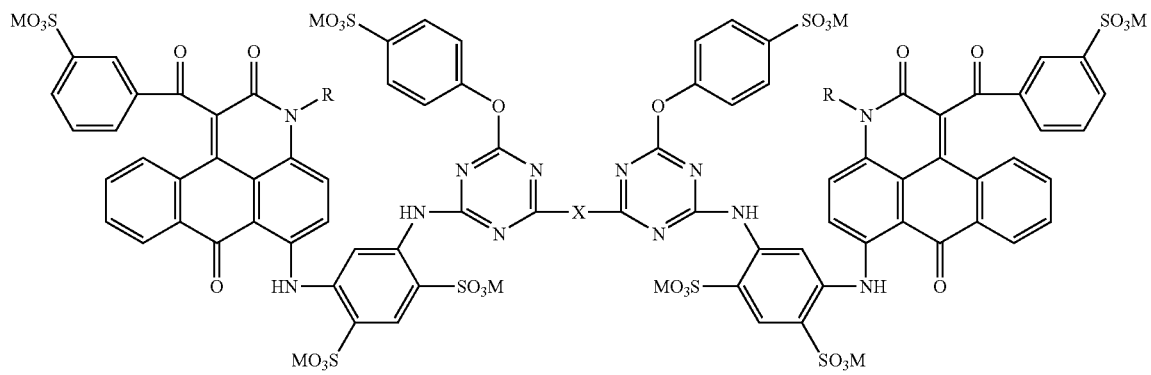

wherein R's are, independently of each other, a hydrogen atom, alkyl group, hydroxyl group, cyclohexyl group monoalkylaminoalkyl group or dialkylaminoalkyl group, M's are, independently of one another, a hydrogen atom, alkali metal, ammonium or organic ammonium, and X is a linking group;

The R's in the general formula (III) are, independently of each other, a hydrogen atom, alkyl group, hydroxyl group, cyclohexyl group monoalkylaminoalkyl group or dialkylaminoalkyl group.

Examples of the alkyl group include alkyl groups having 1 to 8 carbon atoms. Specific examples thereof include methyl, ethyl, n-propyl, isopropyl, n-butyl, sec-butyl, t-butyl, isobutyl, n-pentyl, n-hexyl, n-heptyl and n-octyl.

Examples of the hydroxyalkyl group include hydroxyalkyl groups having 1 to 4 carbon atoms. Specific examples thereof include hydroxymethyl, hydroxyethyl, hydroxypropyl and hydroxybutyl. The alkyl in the hydroxyalkyl may be a linear, branched or cyclic alkyl, and a linear alkyl is particularly favorable. The substitution position of the hydroxy in the hydroxyalkyl may be any position. However, for example, a Linking group 2

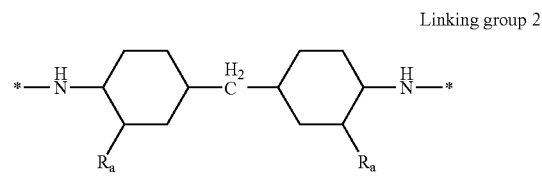

wherein $R_a$ are, independently of each other, a hydrogen atom or methyl group, and '*'s are respective linking sites to different two triazine rings.

Linking group 3

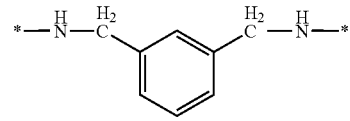

wherein '*'s are respective linking sites to different two triazine rings.

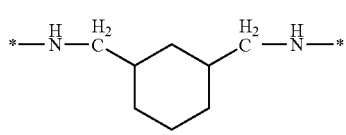
Linking group 4 wherein '*'s are respective linking sites to different two triazine rings.

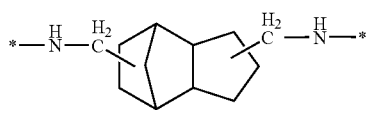
Linking group 5 wherein '*'s are respective linking sites to different two triazine rings.

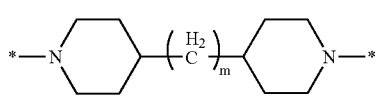
Linking group 6 wherein m is 2 to 4, and '*'s are respective linking sites to different two triazine rings.

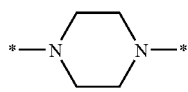
Linking group 7 wherein '*'s are respective linking sites to different two triazine rings.

M's in the general formula (III) are, independently of one another, a hydrogen atom, alkali metal, ammonium or organic ammonium. Examples of the alkali metal include lithium, sodium and potassium. Examples of the organic ammonium include acetamido, benzamido, methylamino, butylamino, diethylamino, phenylamino and triethanolamino.

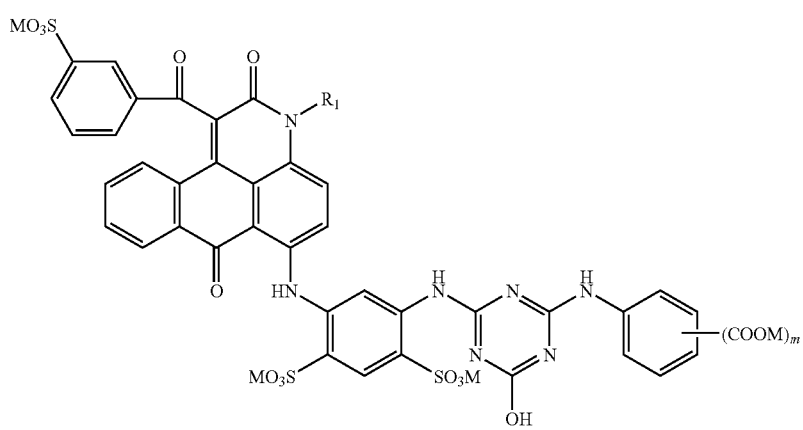
Gerneral formula (IV)

wherein $R_1$ is a hydrogen atom or alkyl group, m is an integer of 1 to 3, and M's are, independently of one another, a hydrogen atom, alkali metal, ammonium or organic ammonium.

$R_1$ in the general formula (IV) is a hydrogen atom or alkyl group. The alkyl group favorably has 1 to 3 carbon atoms from the viewpoint of solubility in an aqueous medium making up an ink, and specific examples thereof include methyl, ethyl, primary propyl and secondary propyl groups. Incidentally, if the number of carbon atoms in the alkyl group is 4 or more, the hydrophobicity of such a coloring material becomes high, and so the coloring material may not be dissolved in the aqueous medium making up the ink.

M's in the general formula (IV) are, independently of one another, a hydrogen atom, alkali metal, ammonium or organic ammonium. Examples of the alkali metal include lithium, sodium and potassium. Examples of the organic ammonium include acetamido, benzamido, methylamino, butylamino, diethylamino, phenylamino and triethanolamino.

General formula (V)

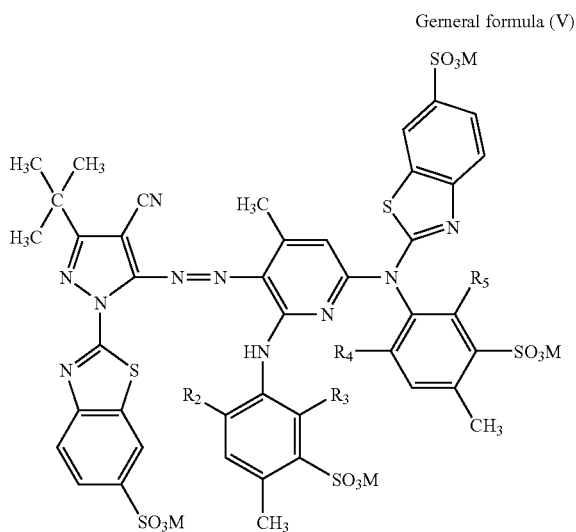

wherein $R_2$, $R_3$, $R_4$ and $R_5$ are, independently of one another, an alkyl group, and M's are, independently of one another, a hydrogen atom, alkali metal, ammonium or organic ammonium.

$R_2$, $R_3$, $R_4$ and $R_5$ in the general formula (V) are, independently of one another, an alkyl group. The alkyl group favorably has 1 to 3 carbon atoms from the viewpoint of solubility in an aqueous medium making up an ink, and specific examples thereof include methyl, ethyl, primary propyl and secondary propyl groups. Incidentally, if the number of carbon atoms in the alkyl group is 4 or more, the hydrophobicity of such a coloring material becomes high, and so the coloring material may not be dissolved in the aqueous medium making up the ink.

M's in the general formula (V) are, independently of one another, a hydrogen atom, alkali metal, ammonium or organic ammonium. Examples of the alkali metal include lithium, sodium and potassium. Examples of the organic ammonium include acetamido, benzamido, methylamino, butylamino, diethylamino, phenylamino and triethanolamino.

As specific favorable examples of the compound of the general formula (III), the compound of the general formula (IV) and the compound of the general formula (V), may be mentioned the following Exemplified Compounds III-1, III-2, IV-1, IV-2, and V-1 to V-3. Incidentally, the following Exemplified Compounds are described in the form of a free acid. Needless to say, the compounds of the general formula (III), the general formula (IV) and the general formula (V) in the present invention are not limited to the following Exemplified Compounds so far as the compounds are embraced in the structures of the general formula (III), the general formula (IV) and the general formula (V) and definitions thereof. Among the following Exemplified Compounds, Exemplified Compound III-1, Exemplified Compound IV-1 or Exemplified Compound V-2 is favorably used in the present invention, and Exemplified Compound V-2 is particularly favorably used.

Exemplified compound III-1

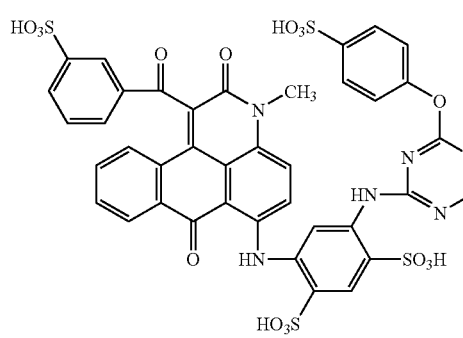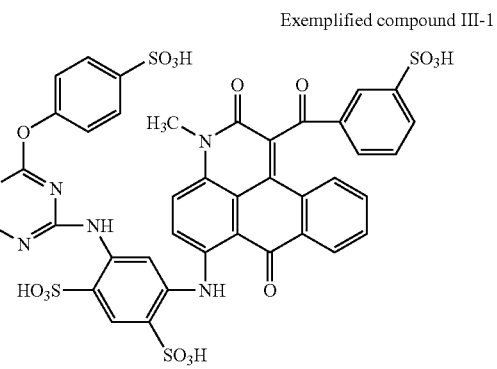

Exemplified compound III-2

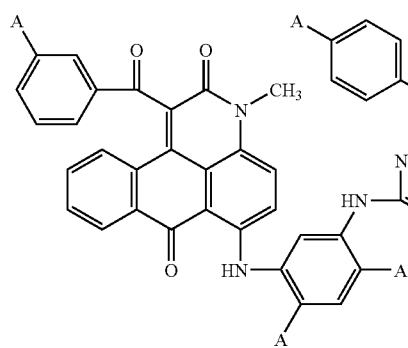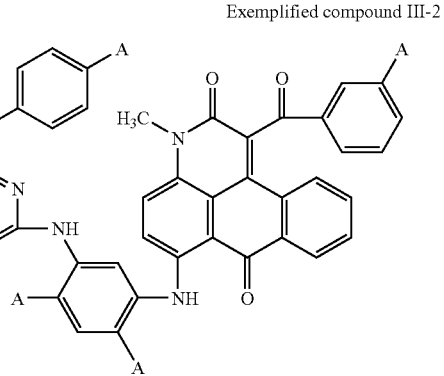

[ where A: $SO_3^- \cdot HN^+(CH_2CH_2OH)_3$ ]

-continued
Exemplified compound IV-1
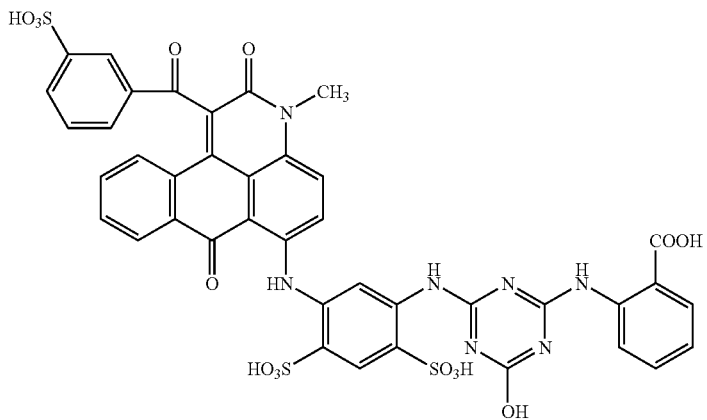
Exemplified compound IV-2
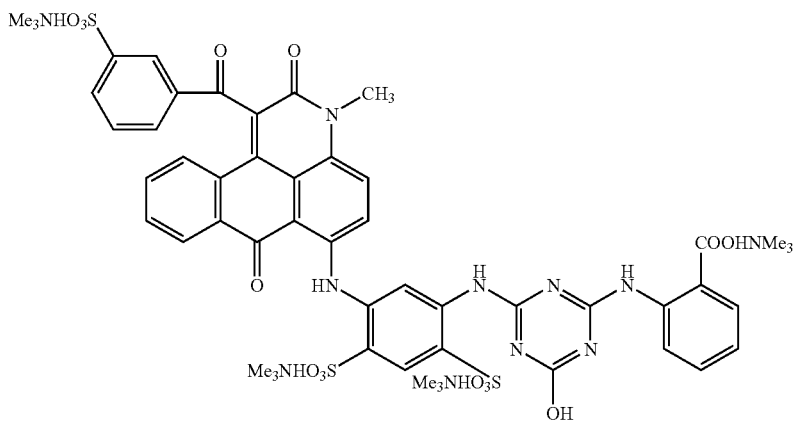
[where SO$_3$HNMe$_3$: SO$_3^-$·HN$^+$(CH$_3$)$_3$, COOHNMe$_3$: COO$^-$·HN$^+$(CH$_3$)$_3$]
Exemplified compound V-1
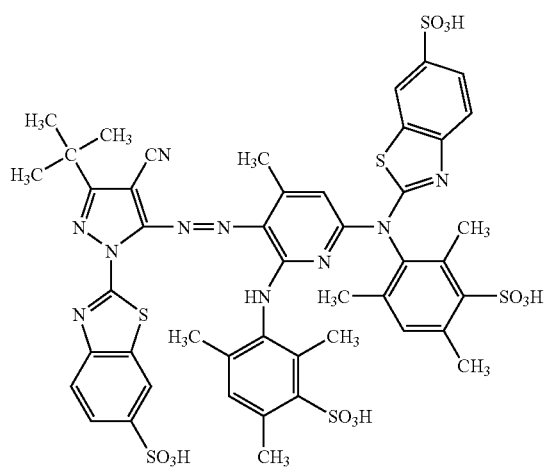
Exemplified compound V-2
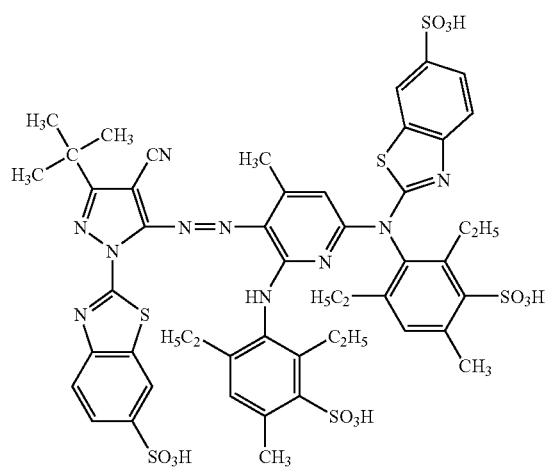

-continued

Exemplified compound V-3

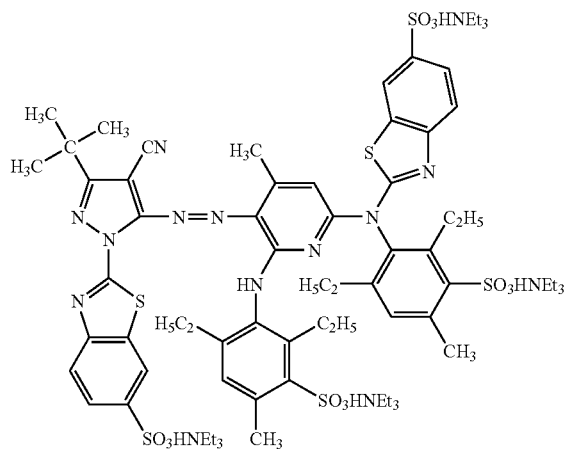

[where SO$_3$HNEt$_3$: SO$_3^-$·HN$^+$(C$_2$H$_5$)$_3$]

[Content of Third Coloring Material]

The ink according to the present invention favorably contains, as the third coloring material, at least one compound selected from the group consisting of such respective compounds of the general formula (III), the general formula (IV) and the general formula (V) as described above. In this case, the content (% by mass) of the third coloring material in the ink is favorably from 0.1% by mass or more to 10.0% by mass or less based on the total mass of the ink.

The total of the content (% by mass) of the first coloring material, the content (% by mass) of the second coloring material and the content (% by mass) of the third coloring material in the ink is favorably from 1.0% by mass or more to 10.0% by mass or less based on the total mass of the ink. The total of the content (% by mass) of these coloring materials is particularly favorably from 1.5% by mass or more to 7.0% by mass or less. If the total content is less than 1.0% by mass, the ozone fastness and color developability of the resulting image with such an ink may not be sufficiently achieved in some cases. If the total content of the coloring materials exceeds 10.0% by mass, the ink jet properties such as sticking resistance may not be achieved in some cases.

The content (% by mass) of the third coloring material based on the total mass of the ink is favorably from 0.5 times or more to 5.0 times or less in terms of mass ratio to the total of the content (% by mass) of the first coloring material and the content (% by mass) of the second coloring material (total of first coloring material and second coloring material/third coloring material). The mass ratio is particularly favorably from 1.0 time or more to 3.0 times or less. The mass ratio of the contents is controlled within the above range, whereby the resulting ink can provide an image excellent in ozone fastness and light fastness and moreover can achieve a color tone favorable for gray ink.

Incidentally, when the first coloring material, the second coloring material and the third coloring material are used in combination, a favorable range of a mass ratio of the first coloring material to the second coloring material (first coloring material/second coloring material) based on the total mass of the ink is as described above.

[Color Tone Favorable for Gray Ink]

The color tone favorable for a gray ink, i.e., the color tone that is neutral and provides a favorable image, in the present invention specifically means the following. With respect to an image having gradation property formed with a gray ink by gradually lowering a recording duty from 100%, a* and b* in the L*a*b* color space prescribed by CIE (International Commission on Illumination) are measured. When the values of a* and b* in at least a portion where the recording duty is 100% are $-5 \leq a^* \leq 10$ and $-10 \leq b^* \leq 1$, respectively, such an ink is defined as an ink having a color tone favorable for gray ink in the present invention. An ink satisfying the following provisions is defined as an ink having a color tone more favorable for gray ink. Namely, it is favorable that the values of a* and b* in the portion where the recording duty is 100% are $-0.5 \leq a^* \leq 5$ and $-6.5 \leq b^* \leq 0$, respectively. Incidentally, the values of a* and b* can be measured by means of, for example, a spectrophotometer (trade name: Spectrolino; manufactured by Gretag Macbeth). Needless to say, the present invention is not limited thereto.

In the present invention, a gray ink is favorably prepared so as to have the color tone favorable for gray ink within the above range of the mass ratio among the first coloring material, second coloring material and third coloring material. Incidentally, the adjustment to the range of the color tone favorable for gray ink can be conducted by suitably determining the contents of the respective coloring materials within the above range of the mass ratio. In order to achieve the color tone favorable for gray ink, it is particularly favorable to use the compound of the general formula (V) as the third coloring material.

[Fourth Coloring Material: Compound Represented by the General Formula (VI) and/or Compound Represented by the General Formula (VII)]

The ink according to the present invention may further contain, as a fourth coloring material, at least one compound selected from a compound represented by the following general formula (VI) and a compound represented by the following general formula (VII) in addition to the above-described coloring materials. Specifically, an ink containing the fourth coloring material in addition to the first coloring material and second coloring material, and an ink containing the fourth coloring material in addition to the first coloring material, second coloring material and third coloring material are included. The ink containing the fourth coloring material in addition to the first coloring material, second coloring material and third coloring material is particularly favorable.

General formula (VI)

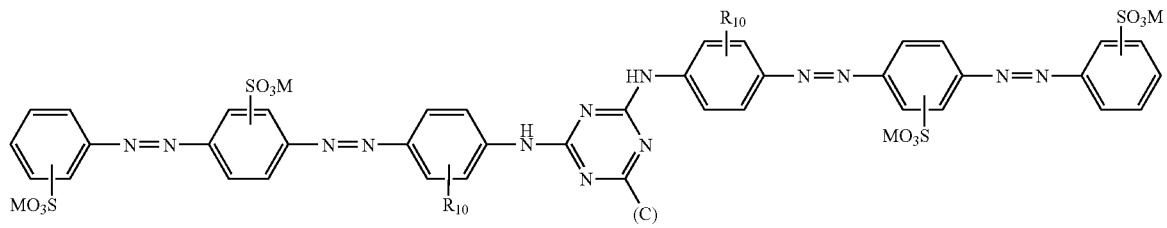

wherein $R_{10}$ are, independently of each other, a hydrogen atom, a hydroxyl group, a carboxyl group, an alkyl group having 1 to 4 carbon atoms, which may be substituted by a hydroxyl group or an alkoxy group having 1 to 4 carbon atoms, an alkoxy group having 1 to 4 carbon atoms, which may be substituted by a hydroxyl group or an alkoxy group having 1 to 4 carbon atoms, an alkylamino group having 1 to 4 carbon atoms, which may be substituted by a hydroxyl group or an alkoxy group having 1 to 4 carbon atoms, a carboxy-(C1-C5)alkylamino group, a bis[carboxy-(C1-C5)alkyl]amino group, an alkanoylamino group having 1 to 4 carbon atoms, which may be substituted by a hydroxyl group or an alkoxy group having 1 to 4 carbon atoms, a phenylamino group, which may be substituted by a carboxyl, sulfonic or amino group, a sulfonic group, a halogen atom, or a ureido group, [C] is an aliphatic amine residue having a carboxyl or sulfonic group, and M's are, independently of one another, a hydrogen atom, alkali metal, ammonium or organic ammonium.

$R_{10}$ in the general formula (VI) are, independently of each other, a hydrogen atom, a hydroxyl group, a carboxyl group, an alkyl group having 1 to 4 carbon atoms, which may be substituted by a hydroxyl group or an alkoxy group having 1 to 4 carbon atoms, an alkoxy group having 1 to 4 carbon atoms, which may be substituted by a hydroxyl group or an alkoxy group having 1 to 4 carbon atoms, an alkylamino group having 1 to 4 carbon atoms, which may be substituted by a hydroxyl group or an alkoxy group having 1 to 4 carbon atoms, a carboxy-(C1-C5)alkylamino group, a bis[carboxy-(C1-C5)alkyl]amino group, an alkanoylamino group having 1 to 4 carbon atoms, which may be substituted by a hydroxyl group or an alkoxy group having 1 to 4 carbon atoms, a phenylamino group, which may be substituted by a carboxyl, sulfonic or amino group, a sulfonic group, a halogen atom, or a ureido group.

Specific examples of the alkyl group having 1 to 4 carbon atoms, which may be substituted by a hydroxyl group or an alkoxy group having 1 to 4 carbon atoms, include the following groups: methyl, ethyl, n-propyl, isopropyl, n-butyl, isobutyl, sec-butyl, tert-butyl, methoxyethyl, ethoxyethyl, n-propoxyethyl, isopropoxyethyl, n-butoxyethyl, sec-butoxyethyl, tert-butoxyethyl and 2-hydroxyethyl.

Specific examples of the alkoxy group having 1 to 4 carbon atoms, which may be substituted by a hydroxyl group or an alkoxy group having 1 to 4 carbon atoms, include the following groups: methoxy, ethoxy, n-propoxy, isopropoxy, n-butoxy, sec-butoxy, tert-butoxy, 2-hydroxyethoxy, 2-hydroxypropoxy, 3-hydroxy-propoxy, methoxyethoxy, ethoxyethoxy, n-propoxyethoxy, isopropoxyethoxy, n-butoxyethoxy, methoxypropoxy, ethoxypropoxy, n-propoxypropoxy, isopropoxybutoxy, n-propoxybutoxy and 2-hydroxyethoxyethoxy.

Specific examples of the alkylamino group having 1 to 4 carbon atoms, which may be substituted by a hydroxyl group or an alkoxy group having 1 to 4 carbon atoms, include the following groups: methylamino, ethylamino, n-propylamino, isopropyl-amino, n-butyl-amino, isobutylamino, N,N-dimethylamino, N,N-diethyl-amino, N,N-di(n-propyl)amino, N,N-di(isopropyl)amino, hydroxyethylamino, 2-hydroxypropylamino, 3-hydroxy-propylamino, bis(hydroxyethyl)amino, methoxyethylamino, ethoxyethylamino, bis(methoxyethyl)amino and bis(2-ethoxyethyl)amino.

Specific examples of the carboxy-(C1-C5)alkylamino group include carboxymethylamino, carboxyethylamino, carboxypropylamino, carboxy-n-butylamino and carboxy-n-pentylamino.

Specific examples of the bis[carboxy-(C1-C5)-alkyl]amino group include bis(carboxymethyl)amino, bis(carboxyethyl)amino and bis(carboxypropyl)amino.

Specific examples of the alkanoylamino group having 1 to 4 carbon atoms, which may be substituted by a hydroxyl group or an alkoxy group having 1 to 4 carbon atoms, include the following groups: acetylamino, n-propionylamino, isopropionylamino, hydroxyacetylamino, 2-hydroxy-n-propionylamino, 3-hydroxy-n-propionylamino, 2-methoxy-n-propionylamino, 3-methoxy-n-propionylamino, 2-hydroxy-n-butyrylamino, 3-hydroxy-n-butyrylamino, 2-methoxy-n-butyrylamino and 3-methoxy-n-butyrylamino.

Specific examples of the phenylamino group, which may be substituted by a carboxyl, sulfonic or amino group, include the following groups: phenylamino, sulfophenylamino, carboxyphenylamino, biscarboxy-phenylamino, aminophenylamino, diaminophenylamino and diaminosulfophenylamino.

Specific examples of the halogen atom include chlorine, bromine and iodine atoms. Among these, the chlorine or bromine atom is favorable, and the chlorine atom is particularly favorable.

Specific examples of the ureido group include 3-methylureido, 3,3-dimethylureido and 3-phenylureido groups.

[C] in the general formula (VI) is an aliphatic amine residue having a carboxyl or sulfonic group. The aliphatic amine residue is favorably a mono(C1-C5)alkylamine residue or di(C1-C5)alkylamine residue having a carboxyl or sulfonic group. Specific examples of the aliphatic amine residue having a carboxyl or sulfonic group include the following groups: amino-(C1-C5)alkylsulfonic acid, diimino-(C1-C5)alkylsulfonic acid, amino-(C1-C5)alkylcarboxylic acid and diimino-(C1-C5)alkylcarboxylic acid. Among these, the amine residues whose aliphatic group has 1 or 2 carbon atoms are favorable. Sulfoethylamino and dicarboxymethylimino groups are particularly favorable as the aliphatic amine residue, and the sulfoethylamino group is further favorable.

M's in the general formula (VI) are, independently of one another, a hydrogen atom, alkali metal, ammonium or organic ammonium. Specific examples of the alkali metal include lithium, sodium and potassium. Specific examples of the organic ammonium include acetamido, benzamido, methylamino, butylamino, diethylamino and phenylamino.

The compound of the general formula (VI) used in the present invention is favorably such that $R_{10}$ is an alkyl having 1 to 4 carbon atoms, and more favorably such that $R_{10}$ is a methyl group.

The compound of the general formula (VI) used in the present invention favorably has a maximum absorption wavelength ($\lambda_{max}$) of 400 nm or more and 440 nm or less in an absorption spectrum measured by using water as a solvent.

Specific favorable examples of the compound of the general formula (VI) include the following Exemplified Compounds VI-1 to VI-12. Exemplified Compounds VI-1 to VI-12 are compounds of the following general formula (VIII) of which [C] is the aliphatic amine residues shown in the following Table 2. Incidentally, the compounds of the general formula (VI) in the present invention are not limited to the following Exemplified Compounds so far as the compounds are embraced in the structure of the general formula (VI). Among the following Exemplified Compounds, Exemplified Compounds VI-1, VI-5 and VI-9 are particularly favorably used in the present invention.

General formula (VII)

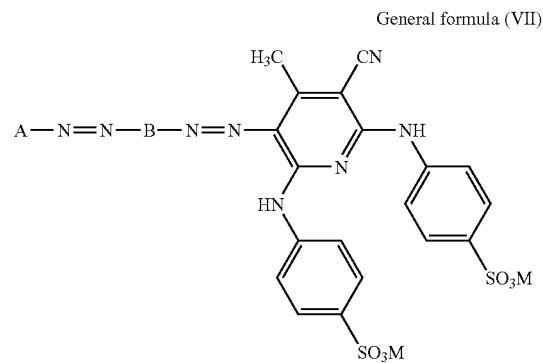

wherein A is an aromatic or heterocyclic group which may be substituted, B is any group of the following general formulae (1) to (5), and M's are, independently of each other, a hydrogen atom, alkali metal, ammonium or organic ammonium.

General formula (VIII)

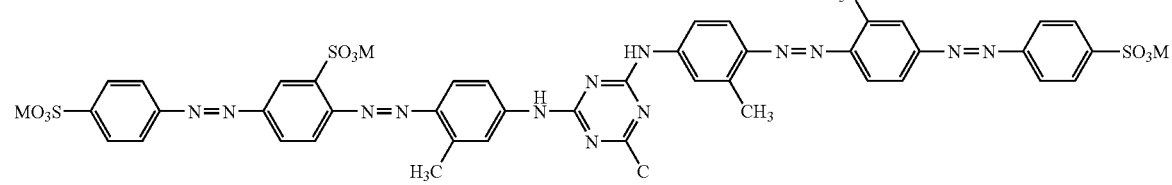

wherein M's are, independently of one another, a hydrogen atom, alkali metal, ammonium or organic ammonium.

TABLE 2

| Exemplified Compounds of general formula (VI) | |
|---|---|
| Exemplified Compound | [C] in general formula (VIII) |
| VI-1 | NH(CH$_2$)$_2$SO$_3$M |
| VI-2 | NH((CH$_2$)$_2$COOM)$_2$ |
| VI-3 | NH(CH$_2$)$_2$COOM |
| VI-4 | NH(CH$_2$)$_5$COOM |
| VI-5 | NHCH$_2$SO$_3$M |
| VI-6 | N(CH$_2$SO$_3$M)$_2$ |
| VI-7 | N((CH$_2$)$_2$SO$_3$M)$_2$ |
| VI-8 | NHCH$_2$COOM |
| VI-9 | N(CH$_2$COOM)$_2$ |
| VI-10 | N((CH$_2$)$_3$COOM)$_2$ |
| VI-11 | NH(CH$_2$)$_3$SO$_3$M |
| VI-12 | N((CH$_2$)$_3$SO$_3$M)$_2$ |

The compound of the following general formula (VII) used as the fourth coloring material in the ink according to the present invention will be now described in detail.

General formula (1)

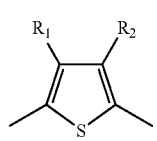

General formula (2)

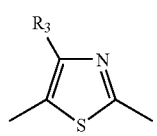

General formula (3)

General formula (4)

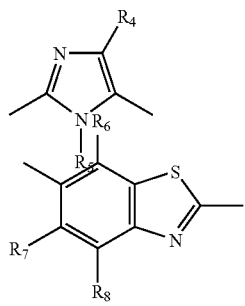

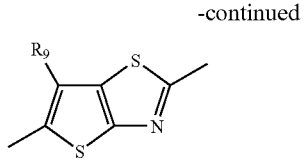

General formula (5)

wherein $R_1$ to $R_9$ are, independently of one another, a hydrogen atom, halogen atom, aliphatic group, aromatic group, heterocyclic group, carboxyl group, carbamoyl group, alkoxycarbonyl group, aryloxycarbonyl group, heterocyclic oxycarbonyl group, acyl group, hydroxyl group, alkoxy group, aryloxy group, heterocyclic oxy group, silyloxy group, acyloxy group, carbamoyloxy group, alkoxycarbonyloxy group, aryloxycarbonyloxy group, amino group, acylamino group, ureido group, sulfamoylamino group, alkoxycarbonylamino group, aryloxycarbonylamino group, alkyl- or arylsulfonylamino group, heterocyclic sulfonylamino group, cyano group, nitro group, alkyl- or arylthio group, heterocyclic thio group, alkyl- or arylsulfonyl group, heterocyclic sulfonyl group, alkyl- or arylsulfinyl group, heterocyclic sulfinyl group, sulfamoyl group, or sulfonic group with the proviso that each group may be further substituted.

A in the general formula (VII) is an aromatic or heterocyclic group which may be substituted. Specific examples thereof include substituents such as benzene ring, naphthalene ring, pyridine ring, imidazole ring, pyrazole ring, thiazole ring, isothiazole ring, thiadiazole ring, benzothiazole ring and benzoisothiazole ring. Among these substituents, benzene ring, naphthalene ring, pyridine ring, pyrazole ring, imidazole ring, isothiazole ring and benzothiazole ring are favorable, and benzene ring and naphthalene ring are more favorable.

B in the general formula (VII) is any group of the above-described general formulae (1) to (5). $R_1$ to $R_9$ in the general formulae (1) to (5) are, independently of one another, a hydrogen atom, halogen atom, aliphatic group, aromatic group, heterocyclic group, carboxyl group, carbamoyl group, alkoxycarbonyl group, aryloxycarbonyl group, heterocyclic oxycarbonyl group, acyl group, hydroxyl group, alkoxy group, aryloxy group, heterocyclic oxy group, silyloxy group, acyloxy group, carbamoyloxy group, alkoxycarbonyloxy group, aryloxycarbonyloxy group, amino group, acylamino group, ureido group, sulfamoylamino group, alkoxycarbonylamino group, aryloxycarbonylamino group, alkyl- or arylsulfonylamino group, heterocyclic sulfonylamino group, cyano group, nitro group, alkyl- or arylthio group, heterocyclic thio group, alkyl- or arylsulfonyl group, heterocyclic sulfonyl group, alkyl- or arylsulfinyl group, heterocyclic sulfinyl group, sulfamoyl group, or sulfonic group with the proviso that each group may be further substituted.

Examples of the halogen atom include chlorine, bromine and iodine atoms. Among these halogen atoms, the chlorine and bromine atoms are favorable, and the chlorine atom is more favorable.

Examples of the aliphatic group include alkyl, substituted alkyl, alkenyl, substituted alkenyl, alkynyl, substituted alkynyl, aralkyl and substituted aralkyl groups. These aliphatic groups may have a branch or may form a cycle. The aliphatic group favorably has 1 to 20 carbon atoms, more favorably 1 to 16 carbon atoms. The aryl portion of the aralkyl or substituted aralkyl group is favorably phenyl or naphthyl, more favorably phenyl. Specific examples of the aliphatic group include the following groups: methyl, ethyl, butyl, isopropyl, t-butyl, hydroxyethyl, methoxyethyl, cyanoethyl, trifluoromethyl, 3-sulfo-propyl, 4-sulfobutyl, cyclohexyl, benzyl, 2-phenethyl, vinyl and allyl.

Examples of the aromatic group include monovalent or divalent aryl groups and substituted aryl groups. The monovalent aromatic groups include aryl groups and substituted aryl groups. The aryl group is favorably phenyl or naphthyl, more favorably phenyl. The monovalent aromatic group favorably has 6 to 20 carbon atoms, more favorably 6 to 16 carbon atoms. Specific examples of the monovalent aromatic groups include phenyl, p-phenylphenyl, p-tolyl, p-methoxy-phenyl, o-chlorophenyl, p-chlorophenyl, p-acetylamino-phenyl and m-(3-sulfopropylamino)phenyl. Examples of the divalent aromatic groups include those obtained by converting these monovalent aromatic groups into divalent groups, and specific examples thereof include phenylene, p-tolylene, p-methoxyphenylene, o-chloro-phenylene, m-(3-sulfopropylamino) phenylene and naphthylene.

Examples of the heterocyclic group include substituted heterocyclic groups and unsubstituted heterocyclic groups. An alicyclic ring, aromatic ring or another heterocyclic ring may be condensed with the heterocyclic ring. The heterocyclic ring is favorably a five-membered or six-membered heterocyclic ring. Examples of a heteroatom of the heterocyclic ring include nitrogen, oxygen and sulfur atoms. Specific examples of the substituent include aliphatic groups, halogen atoms, alkyl- or arylsulfonyl groups, acyl group, acylamino group, sulfamoyl group, carbamoyl group and ionic hydrophilic groups. Examples of a monovalent heterocyclic group include 2-pyridyl, 3-pyridyl, 2-thienyl, 2-thiazolyl, 2-benzothiazolyl, 2-benzoxazolyl and 2-furyl. Examples of a divalent heterocyclic group include groups (i.e., bonds) obtained by removing a hydrogen atom from the monovalent heterocyclic groups.

Examples of the carbamoyl group include substituted and unsubstituted carbamoyl groups. Specific examples of the substituent include alkyl groups. Specific examples of the carbamoyl group include methylcarbamoyl and dimethylcarbamoyl groups.

Examples of the alkoxycarbonyl group include substituted and unsubstituted alkoxycarbonyl groups. The alkoxycarbonyl group is favorably an alkoxycarbonyl group having 2 to 20 carbon atoms. Specific examples of the substituent include ionic hydrophilic groups. Specific examples of the alkoxycarbonyl group include methoxycarbonyl and ethoxycarbonyl groups.

Examples of the aryloxycarbonyl group include substituted and unsubstituted aryloxycarbonyl groups. The aryloxycarbonyl group is favorably an aryloxycarbonyl group having 7 to 20 carbon atoms. Specific examples of the substituent include ionic hydrophilic groups. Specific examples of the aryloxycarbonyl group include a phenoxycarbonyl group.

Examples of the heterocyclic oxycarbonyl group include substituted and unsubstituted heterocyclic oxycarbonyl groups. The heterocyclic oxycarbonyl group is favorably a heterocyclic oxycarbonyl group having 2 to 20 carbon atoms. Specific examples of the substituent include ionic hydrophilic groups. Specific examples of the heterocyclic oxycarbonyl group include 2-pyridyl-oxycarbonyl group.

Examples of the acyl group include substituted and unsubstituted acyl groups. The acyl group is favorably an acyl group having 1 to 20 carbon atoms. Specific examples of the substituent include ionic hydrophilic groups. Specific examples of the acyl group include acetyl and benzoyl groups.

Examples of the alkoxy group include substituted and unsubstituted alkoxy groups. The alkoxy group is favorably an alkoxy group having 1 to 20 carbon atoms. Specific examples of the substituent include alkoxy, hydroxyl and ionic hydrophilic groups. Specific examples of the alkoxy group include methoxy, ethoxy, isopropoxy, methoxyethoxy, hydroxyethoxy and 3-carboxypropoxy groups.

Examples of the aryloxy group include substituted and unsubstituted aryloxy groups. The aryloxy group is favorably an aryloxy group having 6 to 20 carbon atoms. Specific examples of the substituent include alkoxy and ionic hydrophilic groups. Specific examples of the aryloxy group include phenoxy, p-methoxyphenoxy and o-methoxyphenoxy groups.

Examples of the heterocyclic oxy group include substituted and unsubstituted heterocyclic oxy groups. The heterocyclic oxy group is favorably a heterocyclic oxy group having 2 to 20 carbon atoms. Specific examples of the substituent include alkyl, alkoxy and ionic hydrophilic groups. Specific examples of the heterocyclic oxy group include 3-pyridyloxy and 3-thienyloxy groups.

The silyloxy group is favorably a silyloxy group substituted by an aliphatic group having 1 to 20 carbon atoms and/or an aromatic group. Specific examples of the silyloxy group include trimethylsilyloxy and diphenylmethylsilyloxy groups.

Examples of the acyloxy group include substituted and unsubstituted acyloxy groups. The acyloxy group is favorably an acyloxy group having 1 to 20 carbon atoms. Specific examples of the substituent include ionic hydrophilic groups. Specific examples of the acyloxy group include acetoxy and benzoyloxy groups.

Examples of the carbamoyloxy group include substituted and unsubstituted carbamoyloxy groups. Specific examples of the substituent include alkyl groups. Specific examples of the carbamoyloxy group include an N-methylcarbamoyloxy group.

Examples of the alkoxycarbonyloxy group include substituted and unsubstituted alkoxy carbonyloxy groups. The alkoxycarbonyloxy group is favorably an alkoxycarbonyloxy group having 2 to 20 carbon atoms. Specific examples of the alkoxycarbonyloxy group include methoxycarbonyloxy and isopropoxycarbonyloxy groups.

Examples of the aryloxycarbonyloxy group include substituted and unsubstituted aryloxy-carbonyloxy groups. The aryloxycarbonyloxy group is favorably an aryloxycarbonyloxy group having 7 to 20 carbon atoms. Specific examples of the aryloxy-carbonyloxy group include a phenoxycarbonyloxy group.

Examples of the amino group include amino groups substituted by an alkyl, aryl or heterocyclic group, and the alkyl, aryl and heterocyclic groups may be further substituted. The alkylamino group is favorably an alkylamino group having 1 to 20 carbon atoms. Specific examples of the substituent include ionic hydrophilic groups. Specific examples of the alkylamino group include methylamino and diethylamino groups. Examples of the arylamino group include substituted and unsubstituted arylamino groups. The arylamino group is favorably an arylamino group having 6 to 20 carbon atoms. Specific examples of the substituent include halogen atoms and ionic hydrophilic groups. Specific examples of the arylamino group include anilino and 2-chlorophenylamino groups. Examples of the heterocyclic amino group include substituted and unsubstituted heterocyclic amino groups. The heterocyclic amino group is favorably a heterocyclic amino group having 2 to 20 carbon atoms. Specific examples of the substituent include alkyl groups, halogen atoms and ionic hydrophilic groups.

Examples of the acylamino group include substituted and unsubstituted acylamino groups. The acylamino group is favorably an acylamino group having 2 to 20 carbon atoms. Specific examples of the substituent include ionic hydrophilic groups. Specific examples of the acylamino group include acetylamino, propionylamino, benzoylamino, N-phenylacetylamino and 3,5-disulfobenzoylamino groups.

Examples of the ureido group include substituted and unsubstituted ureido groups. The ureido group is favorably a ureido group having 1 to 20 carbon atoms. Specific examples of the substituent include alkyl and aryl groups. Specific examples of the ureido group include 3-methylureido, 3,3-dimethylureido and 3-phenylureido groups.

Examples of the sulfamoylamino group include substituted and unsubstituted sulfamoylamino groups. Specific examples of the substituent include alkyl groups. Specific examples of the sulfamoylamino group include an N,N-dipropylsulfamoylamino group.

Examples of the alkoxycarbonylamino group include substituted and unsubstituted alkoxycarbonyl-amino groups. The alkoxycarbonylamino group is favorably an alkoxycarbonylamino group having 2 to 20 carbon atoms. Specific examples of the substituent include ionic hydrophilic groups. Specific examples of the alkoxycarbonylamino group include an ethoxycarbonylamino group.

Examples of the aryloxycarbonylamino group include substituted and unsubstituted aryloxycarbonyl-amino groups. The aryloxycarbonylamino group is favorably an aryloxycarbonylamino group having 7 to 20 carbon atoms. Specific examples of the substituent include ionic hydrophilic groups. Specific examples of the aryloxycarbonylamino group include a phenoxycarbonylamino group.

Examples of the alkyl- or arylsulfonylamino group include substituted and unsubstituted alkyl- or arylsulfonylamino groups. The sulfonylamino group is favorably a sulfonylamino group having 1 to 20 carbon atoms. Specific examples of the substituent include ionic hydrophilic groups. Specific examples of the sulfonylamino group include methylsulfonylamino, N-phenylmethylsulfonylamino, phenylsulfonylamino and 3-carboxyphenylsulfonylamino groups.

Examples of the heterocyclic sulfonylamino group include substituted and unsubstituted heterocyclic sulfonylamino groups. The heterocyclic sulfonylamino group is favorably a heterocyclic sulfonylamino group having 1 to 12 carbon atoms. Specific examples of the substituent include ionic hydrophilic groups. Specific examples of the heterocyclic sulfonylamino group include 2-thiophenesulfonylamino and 3-pyridinesulfonylamino groups.

Examples of the alkyl- or arylthio group include substituted and unsubstituted alkyl- or arylthio groups. The alkyl- or arylthio group favorably has 1 to 20 carbon atoms. Specific examples of the substituent include ionic hydrophilic groups. Specific examples of the alkyl- or arylthio group include methylthio and phenylthio groups.

Examples of the heterocyclic thio group include substituted and unsubstituted heterocyclic thio groups. The heterocyclic thio group favorably has 1 to 20 carbon atoms. Specific examples of the substituent include ionic hydrophilic groups. Specific examples of the heterocyclic thio group include a 2-pyridylthio group.

Examples of the alkyl- or arylsulfonyl group include substituted and unsubstituted alkyl- or arylsulfonyl groups. Specific examples of the alkyl- or arylsulfonyl group include methylsulfonyl and phenylsulfonyl groups.

Examples of the heterocyclic sulfonyl group include substituted and unsubstituted heterocyclic sulfonyl groups. The heterocyclic sulfonyl group favorably has 1 to 20 carbon atoms. Specific examples of the substituent include ionic hydrophilic groups. Specific examples of the heterocyclic sulfonyl group include 2-thiophenesulfonyl and 3-pyridinesulfonyl groups.

Examples of the alkyl- or arylsulfinyl group include substituted and unsubstituted alkyl- or arylsulfinyl groups. Specific examples of the alkyl- or arylsulfinyl group include methylsulfinyl and phenylsulfinyl groups.

Examples of the heterocyclic sulfinyl group include substituted and unsubstituted heterocyclic sulfinyl groups. The heterocyclic sulfinyl group favorably has 1 to 20 carbon atoms. Specific examples of the substituent include ionic hydrophilic groups. Specific examples of the heterocyclic sulfinyl group include a 4-pyridinesulfinyl group.

Examples of the sulfamoyl group include substituted and unsubstituted sulfamoyl groups. Specific examples of the substituent include alkyl groups. Specific examples of the sulfamoyl group include dimethylsulfamoyl and di-(2-hydroxyethyl)-sulfamoyl groups.

M's in the general formula (VII) are, independently of each other, a hydrogen atom, alkali metal, ammonium or organic ammonium. Specific examples of the alkali metal include lithium, sodium and potassium. Specific examples of the organic ammonium include acetamido, benzamido, methylamino, butylamino, diethylamino, phenylamino and triethanolamino.

The compound of the general formula (VII) used in the present invention is favorably such that A is a naphthyl group, which may be substituted, B is a group represented by the general formula (2), and $R_3$ in the general formula (2) is an aryl or pyridyl group. Specific favorable examples of the aryl and pyridyl groups include the following groups: phenyl, 2-methylphenyl, 3-methylphenyl, 4-methylphenyl, 2,3-dimethylphenyl, 2,4-dimethylphenyl, 2,5-dimethylphenyl, 3,4-dimethylphenyl, 2,6-dimethylphenyl, 3,5-dimethyl-phenyl, 2,4,6-trimethylphenyl, 2,3,4-trimethyl-phenyl, 2,3,5-trimethylphenyl, 2,3,6-trimethylphenyl, 2-chloro-phenyl, 3-chlorophenyl, 4-chlorophenyl, 2-ethylphenyl, 3-ethylphenyl, 4-ethylphenyl, 2-pyridyl, 3-pyridyl, 4-pyridyl, 1-naphthyl and 2-naphthyl groups. Among these groups, phenyl, 3-methylphenyl, 4-methylphenyl, 2-chlorophenyl, 3-chlorophenyl, 2-pyridyl, 4-pyridyl, 1-naphthyl and 2-naphthyl groups are favorable.

The compound of the general formula (VII) used in the present invention favorably has a maximum absorption wavelength ($\lambda_{max}$) of 590 nm or more and 620 nm or less in an absorption spectrum measured by using water as a solvent.

Specific favorable examples of the compound of the general formula (VII) include the following Exemplified Compounds VII-1 to VII-12. Incidentally, the compounds of the general formula (VII) in the present invention are not limited to the following Exemplified Compounds so far as the compounds are embraced in the structure of the general formula (VII). Among the following Exemplified Compounds, Exemplified Compounds VII-3, VII-5, VII-6, VII-8, VII-9, VII-10, VII-11 and VII-12 are favorably used in the present invention, and Exemplified Compounds VII-3, VII-5 and VII-10 are more favorably used.

Exemplfied compound VII-1

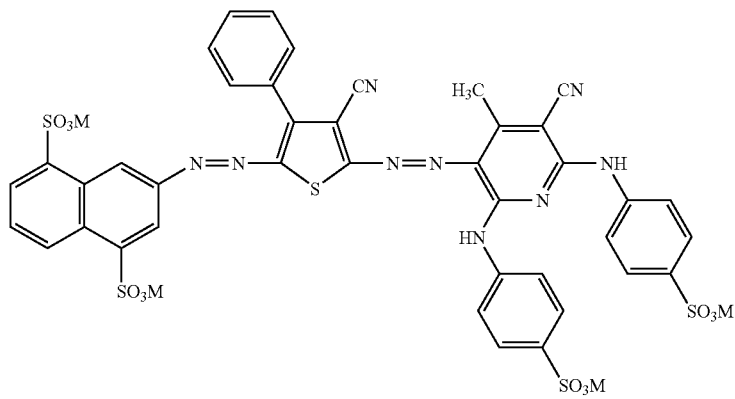

Exemplified compound VII-2

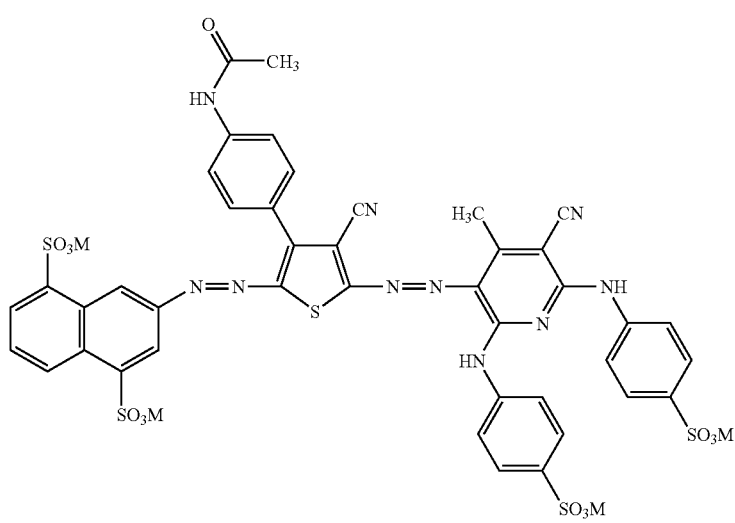

-continued
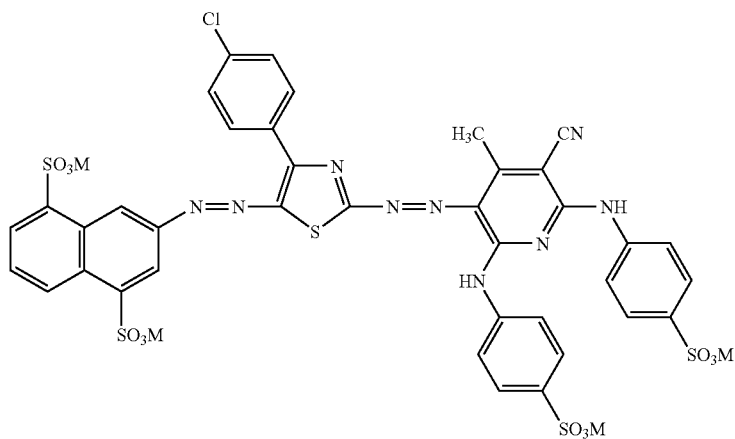
Exemplified compound VII-3
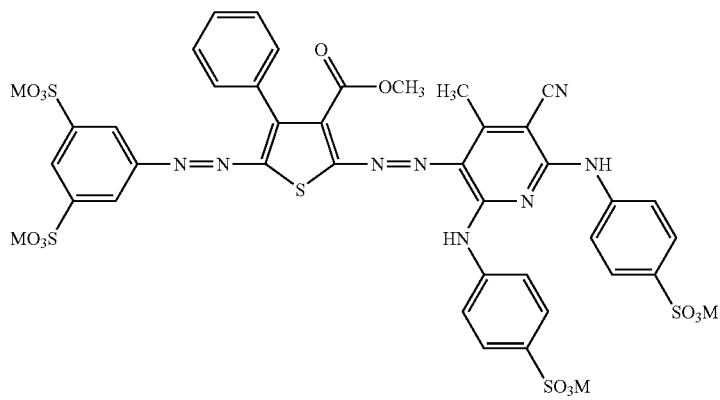
Exemplified compound VII-4
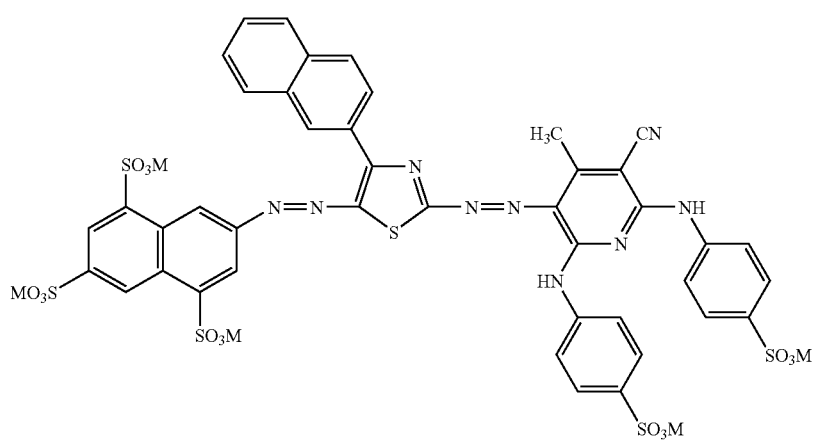
Exemplified compound VII-5

-continued
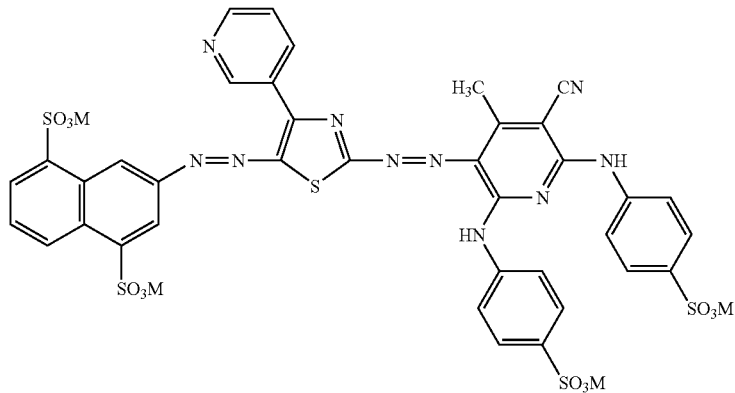
Exemplified compound VII-6
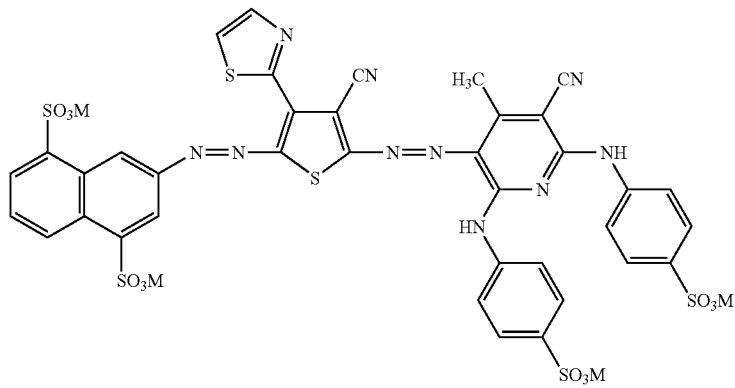
Exemplified compound VII-7
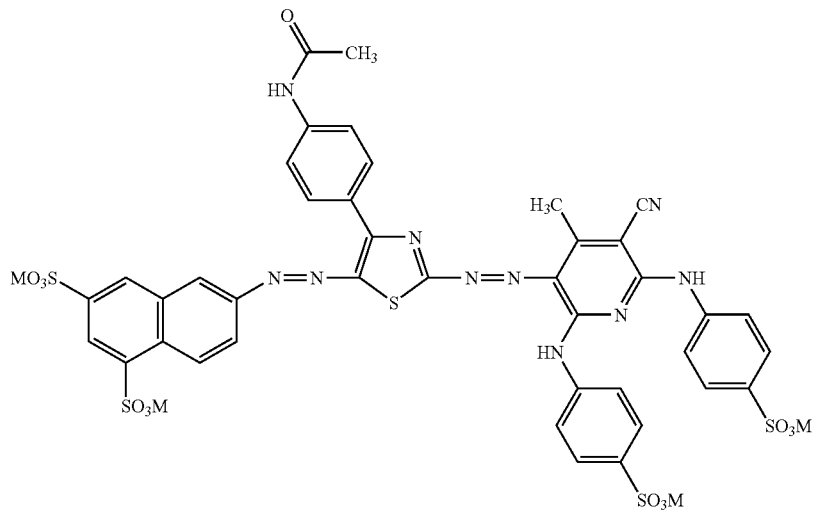
Exemplified compound VII-8

-continued
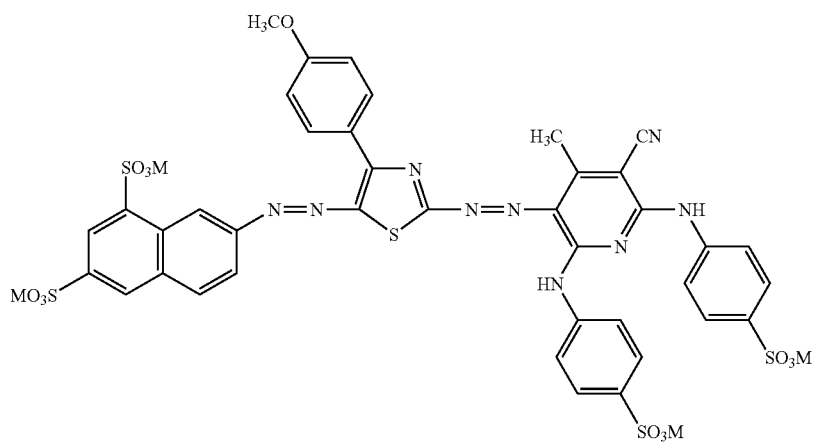
Exemplified compound VII-9
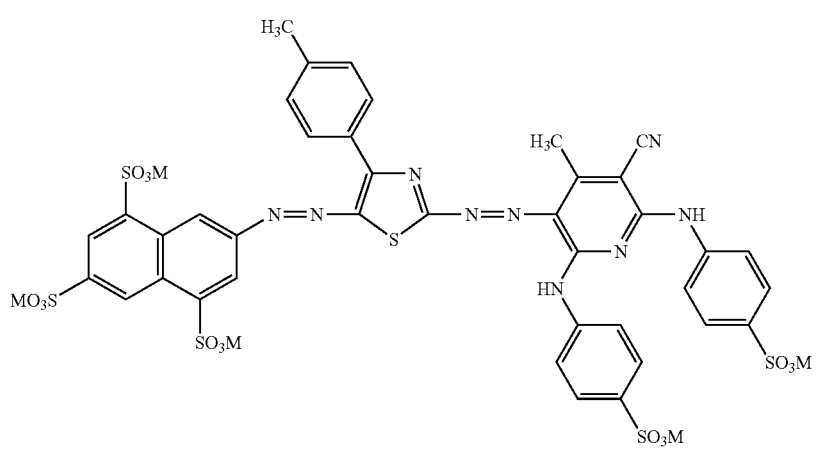
Exemplified compound VII-10
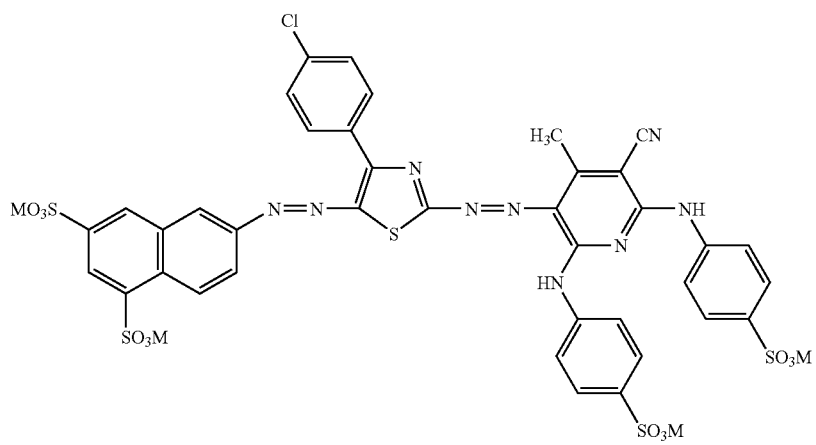
Exemplified compound VII-11

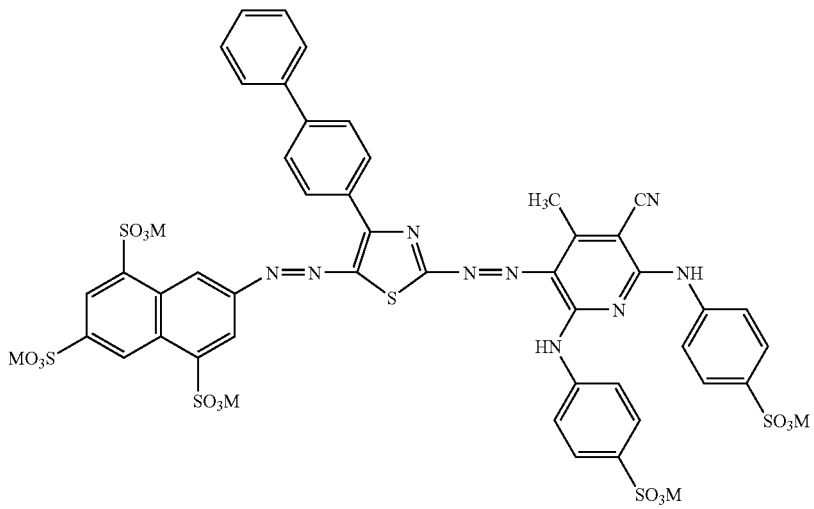

Exemplified compound VII-12

[Content of Fourth Coloring Material]

The ink according to the present invention favorably contains, as the fourth coloring material, at least one compound selected from the compounds of the general formulae (VI) and (VII) as described above. In this case, the content (% by mass) of the fourth coloring material in the ink is favorably from 0.05% by mass or more to 10.0% by mass or less based on the total mass of the ink.

The total of the content (% by mass) of the first coloring material and the content (% by mass) of the second coloring material, and the content (% by mass) of the third coloring material and the content (% by mass) of the fourth coloring material contained as needed in the ink is favorably from 1.0% by mass or more to 10.0% by mass or less based on the total mass of the ink. The total of the content (% by mass) of these coloring materials is particularly favorably from 1.5% by mass or more to 7.0% by mass or less. If the total content of the coloring materials is less than 1.0% by mass, the ozone fastness and color developability of the resulting image with such an ink may not be sufficiently achieved in some cases. If the total content of the coloring materials exceeds 10.0% by mass, the ink jet properties such as sticking resistance may not be achieved in some cases.

The content (% by mass) of the fourth coloring material based on the total mass of the ink is favorably within a specific range to the other coloring materials. For example, the content is favorably from 1.0 times or more to 70.0 times or less in terms of mass ratio to the total of the content (% by mass) of the first coloring material, the content (% by mass) of the second coloring material and the content (% by mass) of the third coloring material (total of first coloring material, second coloring material and third coloring material/fourth coloring material). In the present invention, the mass ratio is particularly favorably from 5.0 times or more to 45.0 times or less. The mass ratio of the contents is controlled within the above range, whereby a color tone close to a neutral color tone and favorable for gray ink can be achieved. The mass ratio of the contents is controlled within the above range, whereby the resulting ink can provide an image excellent in ozone fastness and light fastness, and moreover can more effectively achieve a color tone favorable for gray ink and improve the metamerism.

Incidentally, when the first coloring material, second coloring material, third coloring material and fourth coloring material are used in combination, a favorable range of mass ratio among the first coloring material, second coloring material and third coloring material (total of first coloring material and second coloring material/third coloring material) based on the total mass of the ink is as described above. When the first coloring material, second coloring material and third coloring material are used in combination, a favorable range of the mass ratio of the first coloring material to the second coloring material (first coloring material/second coloring material) based on the total mass of the ink is also as described above.

The color tone favorable for gray ink is as described above. In the present invention, a gray ink is particularly favorably prepared so as to have the color tone favorable for gray ink within the above range of the mass ratio among the first coloring material, second coloring material, third coloring material and fourth coloring material. Incidentally, the adjustment to the range of the color tone favorable for gray ink can be conducted by suitably determining the contents of the respective coloring materials within the above range of the mass ratio. In order to achieve the color tone favorable for gray ink, it is particularly favorable to use the compound of the general formula (VII) as the fourth coloring material.

[Mechanism for Improving Metamerism of a Resulting Image by Further Using, in Combination, Fourth Coloring Material in Addition to First Coloring Material and Second Coloring Material, and Third Coloring Material Added as Needed]

The present inventors infer that a mechanism for improving the metamerism in the resulting image by further containing the fourth coloring material in the ink containing the first coloring material and second coloring material, and the third coloring material added as needed as described above is as follows.

In order to improve the metamerism of an image, it is important that the ink used has absorption over the whole visible ray region (from 380 nm to 780 nm), and the absorption spectrum is flat. Since the respective absorption spectra of the first coloring material, second coloring material and third coloring material used in the present invention are in a relatively sharp form, absorption intensity in a wavelength region between maximum absorption wavelengths of the coloring materials becomes small. As a result, the absorption spectrum of an ink containing the first coloring material, second coloring material and third coloring material causes difference in absorption intensity, so that it is difficult to have absorption over the whole visible ray region and make the absorption spectrum flat.

The fourth coloring material used in the present invention has absorption in a wavelength region between the maximum absorption wavelengths of the first coloring material, second coloring material and third coloring material. Therefore, when the ink containing the first coloring material and second coloring material, and the third coloring material added as needed further contains the fourth coloring material, such an ink has absorption in a wide region of the visible ray region, and the absorption spectrum of the ink becomes flat. It is considered that the metamerism of the image is improved by such mechanism.

[Mechanism for Improving Light Fastness of a Resulting Image by Using Compound of the General Formula (VII) as Fourth Coloring Material]

The ink containing the first coloring material and second coloring material, and the third coloring material used as needed particularly favorably further contains the compound of the general formula (VII) as the fourth coloring material, because both metamerism and light fastness of the resulting image can be improved. The present inventors infer that a mechanism for improving both metamerism and light fastness is as follows.

According to the investigation by the present inventors, not only the metamerism of the image, but also the light fastness is improved by the ink containing the first coloring material and second coloring material, and the third coloring material used as needed and the compound of the general formula (VII) as the fourth coloring material. When a recorded article is irradiated with light, a yellow component in the recorded article is generally particularly markedly deteriorated. On the other hand, the compound of the general formula (VII) has such a property that the color tone thereof changes toward yellow when irradiated with light. Accordingly, the mechanism for improving the light fastness of the image by using the ink making combined use of the above-described coloring materials is considered to be attributable to the fact that the yellow component in the recorded article, which has been deteriorated by irradiation of the light, is remedied by the change of the color tone toward yellow of the compound of the general formula (VII).

[Verification Method of Coloring Material]

In order to verify whether the coloring materials used in the present invention are contained in a liquid (ink) or not, the following verification methods (1) to (3) using high performance liquid chromatography (HPLC) can be applied.
(1) Retention time of peak;
(2) Maximum absorption wavelength on the peak of (1);
(3) M/Z (posi) and M/Z (nega) of mass spectrum on the peak of (1).

Analytic conditions of the high performance liquid chromatography are as follows. First, a liquid (ink) diluted to about 1/1,000 with pure water was prepared and used as a sample for measurement. With respect to the sample, analysis by the high performance liquid chromatography was conducted under the following conditions to measure the retention time and maximum absorption wavelength of a peak.

Column: SunFire $C_{18}$ (manufactured by Nihon Waters K.K.), 2.1 mm×150 mm, column temperature: 40° C.;
Flow rate: 0.2 mL/min;
PDA: 200 nm to 700 nm;
Mobile phase and gradient conditions: see Table 3.

TABLE 3

| Mobile phase and gradient conditions | | | | |
|---|---|---|---|---|
| | 0 to 5 min | 5 to 24 min | 24 to 31 min | 31 to 45 min |
| A: pure water | 85% | 85 → 45% | 45 → 0% | 0% |
| B: methanol | 10% | 10 → 50% | 50 → 95% | 95% |
| C: 0.2 mmol/L aqueous solution of ammonium acetate | 5% | 5% | 5% | 5% |

Analytic conditions of the mass spectrum are as follows. With respect to the resultant peak, the mass spectrum is measured under the following conditions to measure M/Z most strongly detected for posi and nega, respectively.

Ionization method
ESI
Capillary voltage: 3.5 kV
Desolvent gas: 300° C.
Ion source temperature: 120° C.
Detector
posi: 40 V, 200 to 1500 amu/0.9 sec
nega: 40 V, 200 to 1500 amu/0.9 sec.

According to the method and conditions described above, the measurement was conducted on Exemplified Compound II-5 as a representative example of the second coloring material, Exemplified Compounds III-1, IV-1 and V-2 as representative examples of the third coloring material, and Exemplified Compounds VI-1 and VII-5 as representative examples of the fourth coloring material. As a result, the values of the resultant retention time, maximum absorption wavelength, M/Z (posi) and M/Z (nega) are shown in Table 4. When the measurement is conducted on an unknown ink under the same method and conditions as described above, and the resultant respective values correspond to the values shown in Table 4, the ink can be determined to contain a compound corresponding to the compound used in the present invention.

TABLE 4

| | | Analyzed results | | | |
|---|---|---|---|---|---|
| | Exemplified Compound | Retention time [min] | Maximum absorption wavelength [nm] | M/Z | |
| | | | | posi | nega |
| Second coloring material | II-5 | 31.0 to 32.0 | 440 to 460 | 937 to 940 | 935 to 938 |

TABLE 4-continued

<table>
<tr><th colspan="6">Analyzed results</th></tr>
<tr><th></th><th>Exemplified Compound</th><th>Retention time [min]</th><th>Maximum absorption wavelength [nm]</th><th colspan="2">M/Z</th></tr>
<tr><th></th><th></th><th></th><th></th><th>posi</th><th>nega</th></tr>
<tr><td>Third coloring material</td><td>III-1<br>IV-1<br>V-2</td><td>18.0 to 19.0<br>23.0 to 25.0<br>34.0 to 35.0<br>35.0 to 36.0</td><td>500 to 520<br>530 to 550<br>545 to 565<br>545 to 565</td><td>990 to 993<br>941 to 944<br>1176 to 1179<br>1176 to 1179</td><td>987 to 990<br>469 to 471<br>1174 to 1177<br>1174 to 1177</td></tr>
<tr><td>Fourth coloring material</td><td>VI-1<br>VII-5</td><td>30.0 to 31.0<br>29.0 to 30.0</td><td>410 to 430<br>600 to 620</td><td>573 to 576<br>1091 to 1094</td><td>1150 to 1153<br>1090 to 1093</td></tr>
</table>

(Aqueous Medium)

An aqueous solvent that is water or a mixed solvent of water and a water-soluble organic solvent may be used in the ink according to the present invention. Deionized water (ion-exchanged water) is favorably used as the water. The content (% by mass) of water in the ink is favorably 10.0% by mass or more and 90.0% by mass or less based on the total mass of the ink.

No particular limitation is imposed on the water-soluble organic solvent so far as the solvent is soluble in water, and alcohols, polyhydric alcohols, polyglycols, glycol ethers, nitrogen-containing polar solvents and sulfur-containing polar solvents may be used. The content (% by mass) of the water-soluble organic solvent in the ink is favorably 5.0% by mass or more and 90.0% by mass or less, more favorably 10.0% by mass or more and 50.0% by mass or less based on the total mass of the ink. If the content of the water-soluble organic solvent is less than the above range, reliability such as ejection stability may not be achieved in some cases when the resulting ink is used in an ink jet recording apparatus. If the content of the water-soluble organic solvent is more than the above range, the viscosity of the resulting ink may increase in some cases to cause feeding failure of the ink.

Specific examples of usable water-soluble organic solvents include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; glycols such as ethylene glycol, propylene glycol, butylene glycol, diethylene glycol, triethylene glycol, hexylene glycol and thiodiglycol; alkylene glycols the alkylene group of which has 2 to 6 carbon atoms, such as 1,5-pentanediol, 1,6-hexanediol, 2-methyl-1,3-propanediol, 3-methyl-1,5-pentanediol and 1,2,6-hexanetriol; bis(2-hydroxyethyl)sulfone; alkyl ether acetates such as polyethylene glycol monomethyl ether acetate; alkyl ethers of polyhydric alcohols, such as ethylene glycol monomethyl (or ethyl) ether, diethylene glycol methyl (or ethyl) ether and triethylene glycol monomethyl (or ethyl) ether; N-methyl-2-pyrrolidone; 2-pyrrolidone; and 1,3-dimethyl-2-imidazolidinone. Needless to say, the present invention is not limited to these solvents. One or more of these water-soluble organic solvents may be used as needed.

(Other Additives)

The ink according to the present invention may contain water-soluble organic compounds being solid at ordinary temperature, such as polyhydric alcohols such as trimethylolpropane and trimethylolethane, and urea derivatives such as ethyleneurea in addition to the above-described components as needed. In addition, the ink according to the present invention may contain various additives such as surfactants, pH adjustors, rust preventives, preservatives, mildew proofing agents, antioxidants, anti-reducing agents, evaporation accelerators, chelating agents and water-soluble polymers as needed.

(Other Inks)

In order to form a full-color image, the ink according to the present invention may be used in combination with inks having substantially same color tone as the ink according to the present invention or inks having another color tone than the ink according to the present invention. The ink according to the present invention is favorably used in combination with at least one ink selected from, for example, black, cyan, magenta, yellow, red, green and blue inks. The so-called light color inks respectively having substantially the same color tones as these inks may also be further used in combination. Coloring materials used in these inks or light color inks may be publicly known dyes or newly synthesized coloring materials.

<Recording Medium>

As a recording medium used upon forming an image with the ink according to the present invention, any recording medium may be used so far as the ink can be applied thereto to conduct recording. In the present invention, a recording medium for ink jet in which a coloring material such as a dye or pigment is caused to be adsorbed on fine particles forming a porous structure of an ink-receiving layer is favorably used. In particular, a recording medium having the so-called interstice-absorbed type ink-receiving layer in which an ink is absorbed in interstices formed in an ink-receiving layer on a base material is favorably used. The interstice-absorbed type ink-receiving layer is formed by mainly using fine particles and may contain a binder and other additives as needed.

Specific examples of usable fine particles include inorganic pigments such as silica, clay, talc, calcium carbonate, kaolin, aluminum oxides such as alumina and alumina hydrate, diatomaceous earth, titanium oxide, hydrotalcite, and zinc oxide; and organic pigments such as urea-formalin resins, ethylene resins and styrene resins. One or more kinds of these fine particles may be used as needed.

As the binder, may be used a water-soluble polymer or latex. Specific examples of usable binders include polyvinyl alcohol, starch and gelatin, and modified products thereof, gum arabic, cellulose derivatives such as carboxymethyl cellulose, hydroxyethyl cellulose and hydroxypropionylmethyl cellulose, SBR latexes, NBR latexes, methyl methacrylate-butadiene copolymer latexes, functional-group-modified polymer latexes, vinyl copolymer latexes such as ethylene-vinyl acetate copolymers, polyvinyl pyrrolidone, maleic anhydride polymers or copolymers thereof, and acrylic ester copolymers. One or more of these binders may be used as needed.

In addition, additives may be used as needed. Examples of usable additives include dispersing agents, thickeners, pH adjusters, lubricants, flowability modifiers, surfactants, antifoaming agents, parting agents, fluorescent whitening agents, ultraviolet absorbents, antioxidants and dye fixers.

When an image is formed with the ink according to the present invention, a recording medium with an ink-receiving layer formed mainly of fine particles having an average particle size of 1 μm or less is favorably used. Specific examples of the fine particles include fine silica particles and fine aluminum oxide particles. As the fine silica particles, fine silica particles typified by colloidal silica are favorable. A commercially available product may also be used as the colloidal silica. However, colloidal silica described in, for example, Japanese Patent Nos. 2803134 and 2881847 is favorably used. As favorable examples of the fine aluminum oxide particles, may be mentioned fine alumina hydrate particles (alumina pigments).

Among the alumina pigments, alumina hydrates such as pseudoboehmite represented by the following formula are particularly favorably used.

$$AlO_{3-n}(OH)_{2n} \cdot mH_2O$$

wherein n is an integer of 1 to 3, and m is a number of 0 to 10, favorably 0 to 5, with the proviso that m and n are not 0 at the same time.

In many cases, $mH_2O$ represents an aqueous phase which does not participate in the formation of a crystal lattice, but can be eliminated. Therefore, m may take a value other than an integer. When this kind of alumina hydrate is heated, m may reach a value of 0.

The alumina hydrate can be prepared according to such a publicly known process as described below. For example, the alumina hydrate can be prepared by hydrolysis of an aluminum alkoxide or sodium aluminate as described in U.S. Pat. Nos. 4,242,271 and 4,202,870. The alumina hydrate can also be prepared by a process in which an aqueous solution of sodium sulfate or aluminum chloride is added to an aqueous solution of sodium aluminate to conduct neutralization as described in Japanese Patent Publication No. S57-044605.

The recording medium favorably has a base material for supporting the ink-receiving layer. No particular limitation is imposed on the base material so far as an ink-receiving layer can be formed on the base material by the porous fine particles, and a stiffness sufficient for conveyance by a conveying mechanism such as a ink jet recording apparatus can be obtained, and any base material may be used. For example, a paper base material formed of a pulp material composed mainly of natural cellulose fibers may be used. A plastic base material formed of a material such as polyester (for example, polyethylene terephthalate), cellulose triacetate, polycarbonate, polyvinyl chloride, polypropylene or polyimide may also be used. Further, resin-coated paper (for example, RC paper) having a polyolefin resin coated layer, to which a white pigment is added, on at least one surface of a paper substrate may be used.

<Ink Jet Recording Method>

The ink according to the present invention is used in an ink jet recording method performed in the present invention, in which an ink is ejected by an ink jet system to conduct recording on a recording medium. Examples of the ink jet recording method include a recording method in which mechanical energy is applied to an ink to eject the ink, and a recording method in which thermal energy is applied to an ink to eject the ink. In particular, the ink jet recording method utilizing thermal energy may be favorably used in the present invention.

<Ink Cartridge>

An ink cartridge suitable for conducting recording with the ink according to the present invention includes an ink cartridge according to the present invention equipped with an ink storage portion storing such an ink.

<Recording Unit>

A recording unit suitable for conducting recording with the ink according to the present invention includes a recording unit according to the present invention equipped with an ink storage portion storing such an ink and a recording head for ejecting the ink. In particular, a recording unit of which the recording head ejects an ink by applying thermal energy corresponding to a recording signal to the ink may favorably be used. In particular, a recording head having a liquid-contacting face of a heat-generating portion containing a metal and/or a metal oxide is favorably used. Specific examples of the metal and/or the metal oxide making up the liquid-contacting face of the heat-generating portion include metals such as Ta, Zr, Ti, Ni and Al, and oxides of these metals.

<Ink Jet Recording Apparatus>

An ink jet recording apparatus suitable for conducting recording with the ink according to the present invention includes an ink jet recording apparatus according to the present invention equipped with an ink storage portion storing such an ink and a recording head for ejecting the ink. In particular, an ink jet recording apparatus with which an ink is ejected by applying thermal energy corresponding to a recording signal to the ink in the interior of the recording head having the ink storage portion storing the ink is mentioned.

The schematic construction of a mechanism portion of the ink jet recording apparatus will hereinafter be described. The ink jet recording apparatus is constructed, in terms of role of mechanisms, by a paper feeding portion, a conveying portion, a carriage portion, a paper discharging portion, a cleaning portion and an outer facing portion for protecting these portions and imparting design feature.

Figure 2:
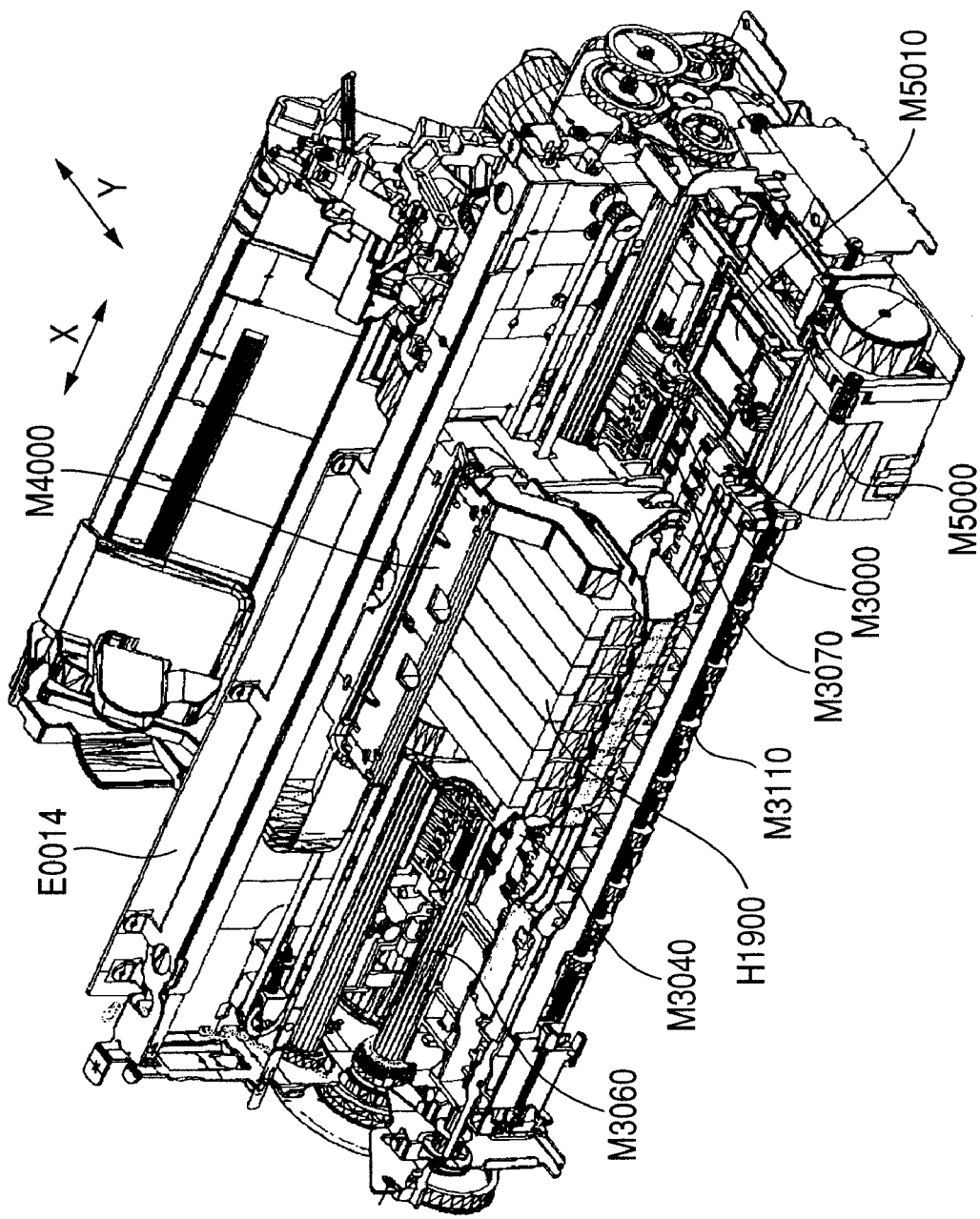
FIG. 2 is a perspective view of a mechanism part of the ink jet recording apparatus.
Figure 3:
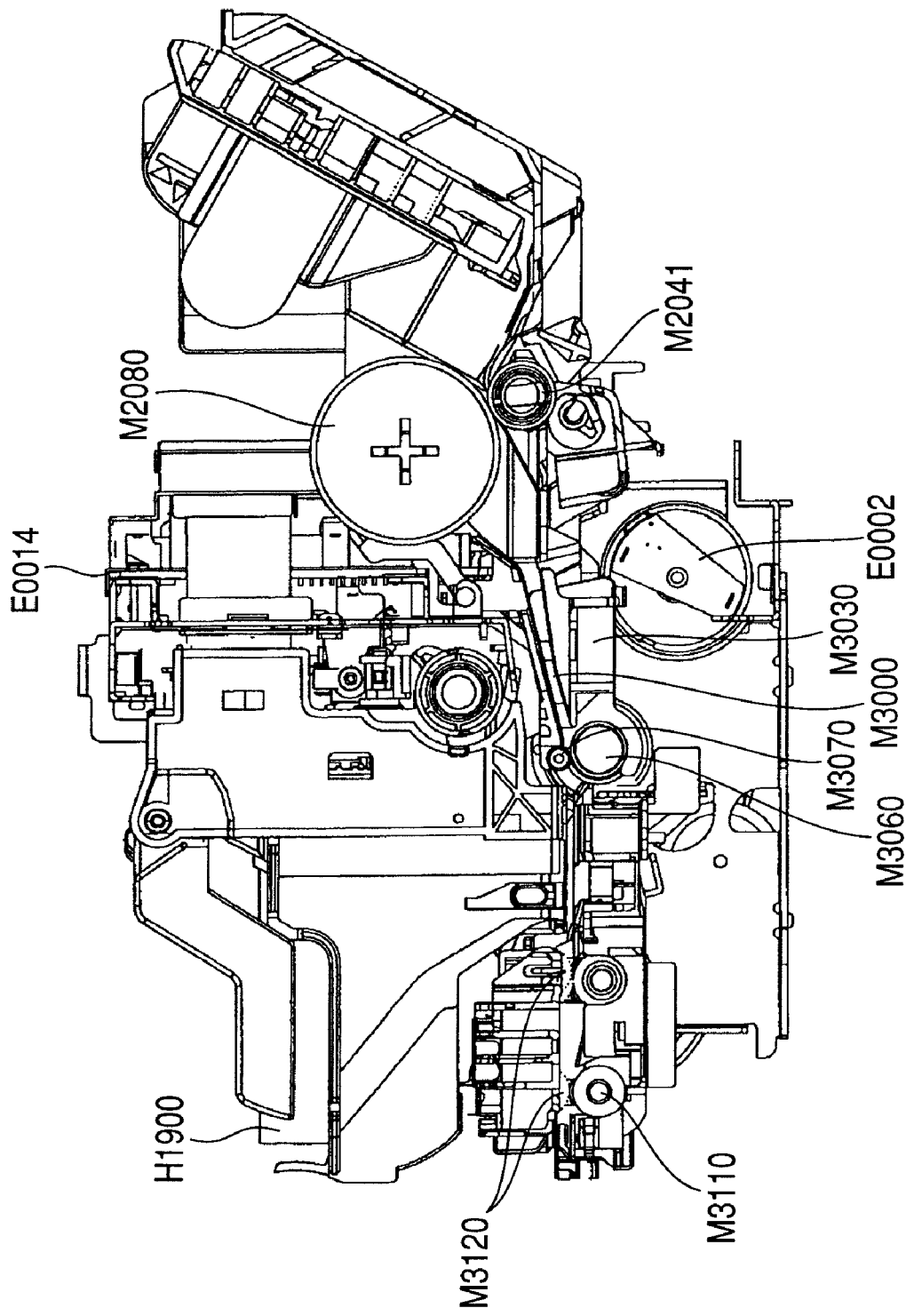
FIG. 3 is a sectional view of the ink jet recording apparatus.

FIG. 1 is a perspective view of the ink jet recording apparatus. FIGS. 2 and 3 are drawings illustrating the internal mechanism of the ink jet recording apparatus, in which FIG. 2 is a perspective view from the top right-hand, and FIG. 3 is a sectional side elevation of the ink jet recording apparatus.

Upon feeding of paper, only a predetermined number of recording media is sent to a nip portion constructed by a paper feed roller M2080 and a separating roller M2041 in the paper feeding portion including a paper feeding tray M2060. The recording media are separated in the nip portion, and only a recording medium located uppermost is conveyed. The recording medium sent to the conveying portion is guided to a pinch roller holder M3000 and a paper guide flapper M3030 and sent to a pair of rollers of a conveying roller M3060 and a pinch roller M3070. The pair of rollers having the conveying roller M3060 and the pinch roller M3070 are rotated by driving of an LF motor E0002, and the recording medium is conveyed on a platen M3040 by this rotation.

Upon forming of an image on the recording medium, a recording head H1001 (FIG. 4; detailed construction will be described subsequently) is arranged at an intended image forming position in the carriage portion, and an ink is ejected on the recording medium according to a signal from an electric substrate E0014. While conducting recording by the recording head H1001, a main scanning in which a carriage M4000 scans in a column direction and a secondary scanning in which the conveying roller M3060 conveys the recording medium in a row direction are alternately repeated, thereby forming an image on the recording medium. The recording medium, on which the image has been formed, is nipped and conveyed between a first paper discharging roller M3110 and a spur M3120 in the paper discharging portion and discharged on a paper discharging tray M3160.

In the cleaning portion, the recording head H1001 before and after the recording is cleaned. A pump M5000 is operated with the ejection orifices of the recording head H1001 being capped with a cap M5010, whereby an unnecessary ink is sucked from the ejection orifices of the recording head H1001. When the ink remaining in the cap M5010 is sucked with the cap being opened, sticking of the remaining ink or other troubles are prevented.

(Construction of Recording Head)

Figure 4:
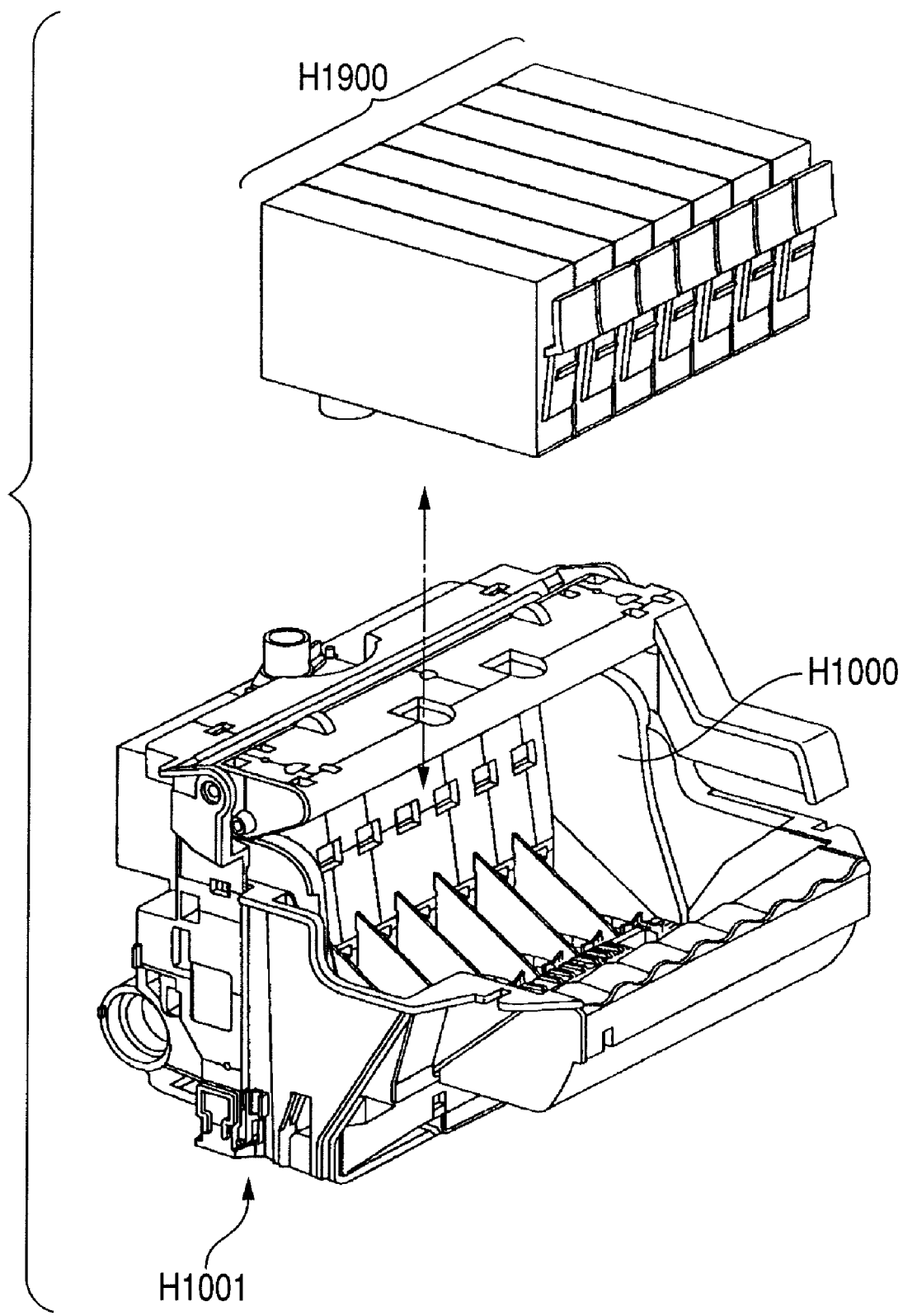
FIG. 4 is a perspective view illustrating a state that an ink cartridge is installed in a head cartridge.

The construction of a head cartridge H1000 will be described. FIG. 4 illustrates the construction of the head cartridge H1000 and a manner of installing an ink cartridge H1900 in the head cartridge H1000. The head cartridge H1000 has a recording head H1001, a unit for installing the ink cartridge H1900 and a unit for feeding an ink from the ink cartridge H1900 to the recording head. The head cartridge H1000 is detachably installed on the carriage M4000.

The ink jet recording apparatus forms an image with respective inks of yellow, magenta, cyan, black, light magenta, light cyan and green. Accordingly, ink cartridges H1900 for 7 colors are independently provided. The ink according to the present invention is used as at least one ink of the inks described above. As illustrated in FIG. 4, each ink cartridge H1900 is detachably installed in the head cartridge H1000. The ink cartridge H1900 can be detached or installed with the head cartridge H1000 being installed in the carriage M4000.

Figure 5:
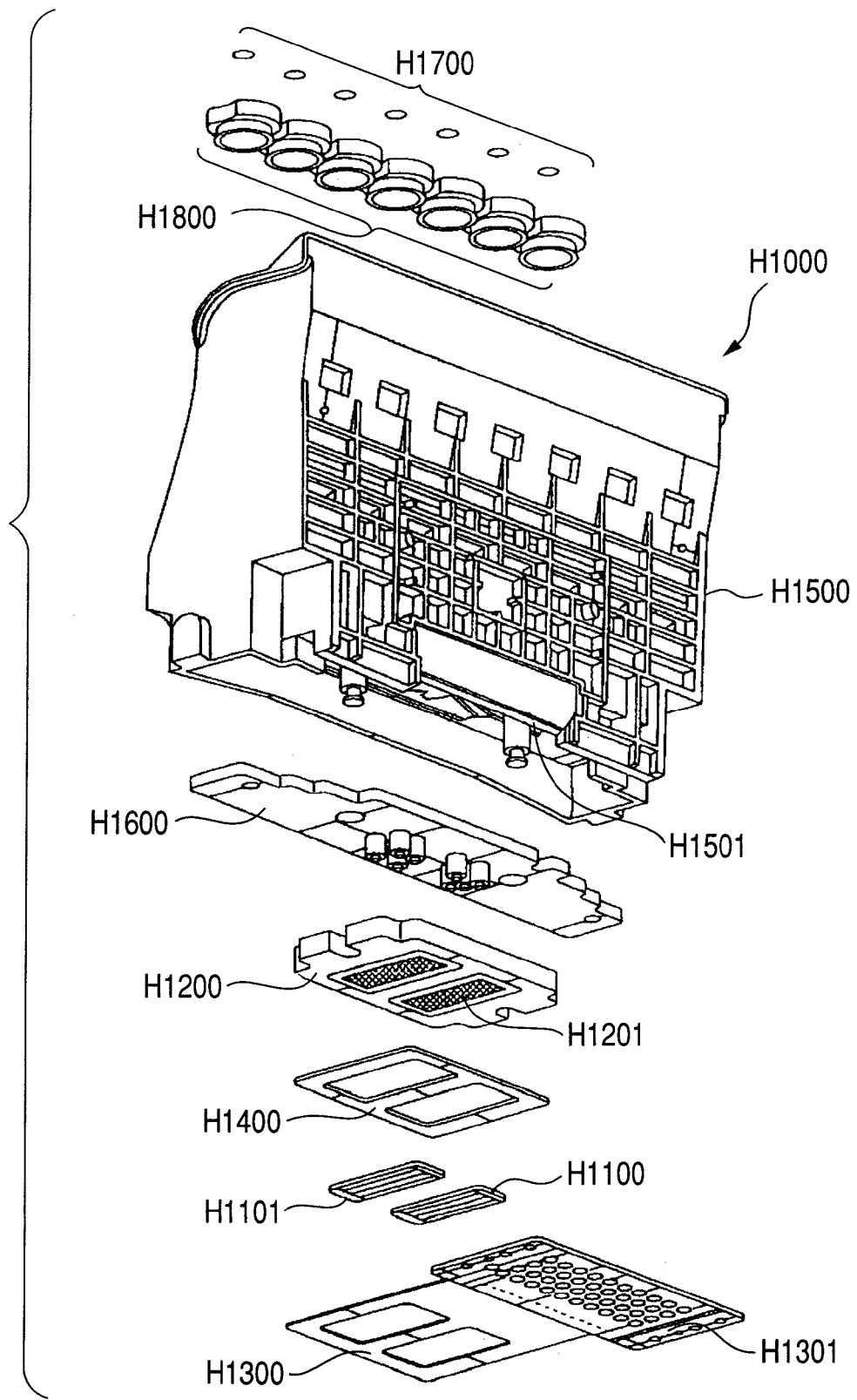
FIG. 5 is an exploded perspective view of the head cartridge.

FIG. 5 is an exploded perspective view of the head cartridge H1000. The head cartridge H1000 is constructed by recording element substrates, plates, an electric wiring substrate H1300, a cartridge holder H1500, a flow path forming member H1600, filters H1700 and seal rubber H1800. The recording element substrates include a first recording element substrate H1100 and a second recording element substrate H1101, and the plates include a first plate H1200 and a second plate H1400.

The first recording element substrate H1100 and the second recording element substrate H1101 are Si substrates, and a plurality of recording elements (nozzles) for ejecting an ink is formed in one surfaces thereof by a photolithographic technique. An electric wiring such as Al for supplying electric power to each recording element is formed by a film forming technique. A plurality of ink flow paths corresponding to the individual recording elements is formed by the photolithographic technique. Ink supply openings for supplying inks to a plurality of the ink flow paths are formed so as to open to a back surface.

Figure 6:
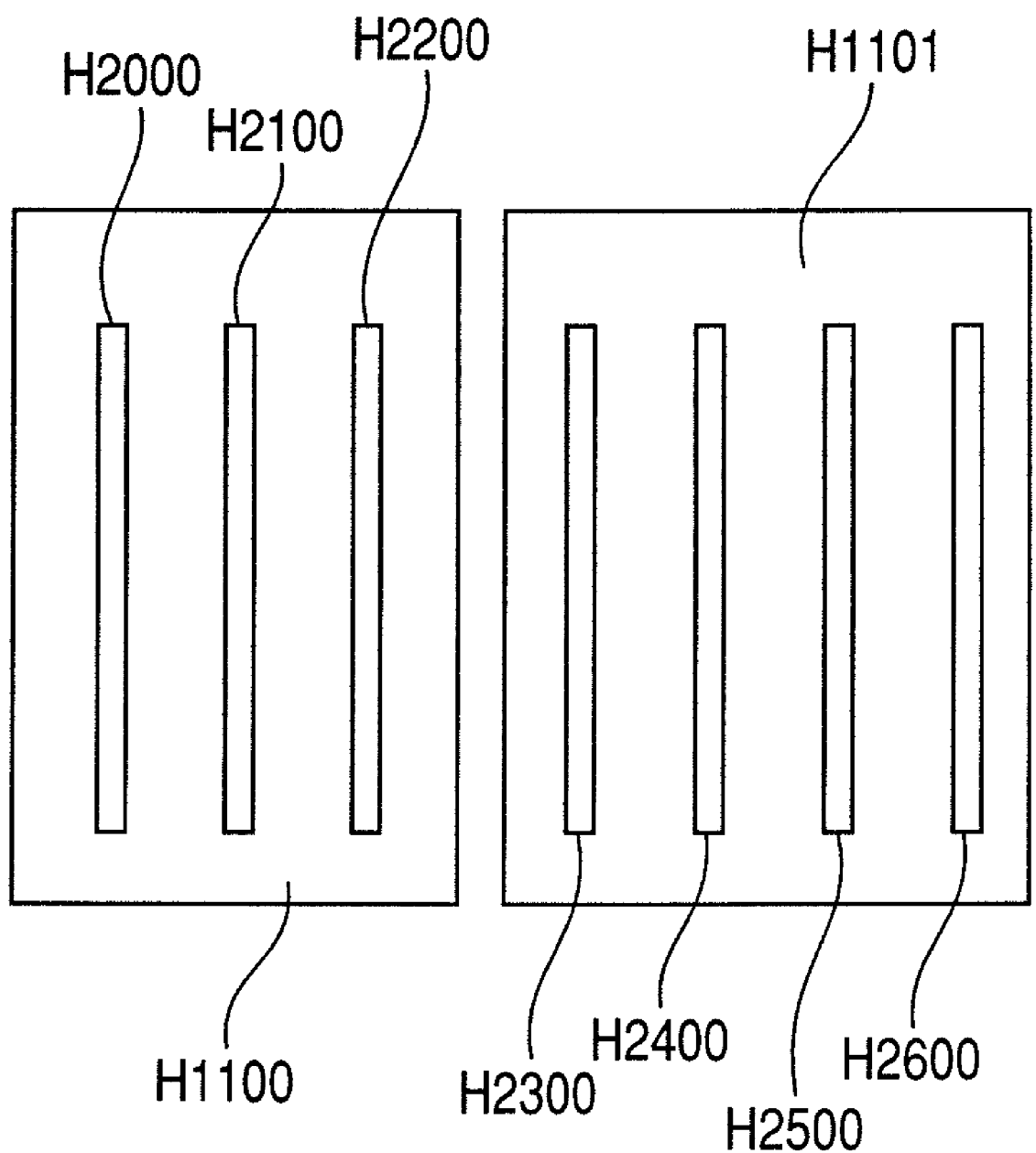
FIG. 6 is an elevational view illustrating recording element substrates in the head cartridge.

FIG. 6 is an enlarged elevational view illustrating the constructions of the first recording element substrate H1100 and the second recording element substrate H1101. Rows H2000 to H2600 (hereinafter also referred to as nozzle rows) of recording elements for respectively supplying different inks are formed in the substrates. In the first recording element substrate H1100, are formed nozzle rows for 3 colors of a nozzle row H2000 for the yellow ink, a nozzle row H2100 for the magenta ink and a nozzle row H2200 for the cyan ink. In the second recording element substrate H1101, are formed nozzle rows for 4 colors of a nozzle row H2300 for the light cyan ink, a nozzle row H2400 for the black ink, a nozzle row H2500 for the green ink and a nozzle row H2600 for the light magenta ink.

Each nozzle row is formed by 768 nozzles arranged at intervals of 1,200 dpi (dots/inch; referential value) in the conveying direction (secondary scanning direction) of the recording medium. About 2 picoliters of an ink are ejected from each nozzle. The opening area in each ejection orifice is thus set to about 100 μm².

Description is given with reference to FIGS. 4 and 5. The first recording element substrate H1100 and second recording element substrate H1101 are bonded and fixed to the first plate H1200. In the first plate, are formed ink supply openings H1201 for supplying inks to the first recording element substrate H1100 and second recording element substrate H1101. Further, the second plate H1400 having openings is bonded and fixed to the first plate H1200. This second plate H1400 holds the electric wiring substrate H1300 so as to electrically connect the electric wiring substrate H1300 to the first recording element substrate H1100 and second recording element substrate H1101.

The electric wiring substrate H1300 applies an electric signal for ejecting the ink from each nozzle formed in the first recording element substrate H1100 and second recording element substrate H1101. The electric wiring substrate H1300 has electric wirings corresponding to the first recording element substrate H1100 and second recording element substrate H1101, and an external signal input terminal H1301 located at edges of the electric wirings for receiving electric signals from the ink jet recording apparatus. The external signal input terminal H1301 is positioned and fixed on the back surface side of the cartridge holder H1500.

The flow path forming member H1600 is fixed to the cartridge holder H1500 for holding the ink cartridges H1900 by, for example, ultrasonic welding to form ink flow paths H1501 linking from the ink cartridges H1900 to the first plate H1200. The filters H1700 are provided at ends on the ink cartridge side of the ink flow paths H1501 linking to the ink cartridges H1900 so as to prevent invasion of dust from the outside. Sealing rubbers H1800 are fitted to portions engaged with the ink cartridges H1900 so as to prevent evaporation of the inks from the engaged portions.

A cartridge holder portion is bonded to a recording head portion H1001 by, for example, adhesion as described above, thereby forming the head cartridge H1000. The cartridge holder portion is constructed by the cartridge holder H1500, the flow path forming member H1600, the filters H1700 and the sealing rubber H1800. The recording head portion H1001 is constructed by the first recording element substrate H1100, the second recording element substrate H1101, the first plate H1200, the electric wiring substrate H1300 and the second plate H1400.

The recording head of the thermal ink jet system that recording is conducted using electrothermal converters (recording elements), which generate thermal energy for causing an ink to cause film boiling corresponding to an electric signal, has been described as an embodiment of the recording head herein. The typical construction and principle thereof are those which perform recording by using fundamental principles as disclosed in, for example, U.S. Pat. Nos. 4,723, 129 and 4,740,796. This system is applicable to any of what are called an On-Demand type and a continuous type.

In particular, the thermal ink jet system is effectively applied to the On-Demand type. In the case of the On-Demand type, at least one driving signal, which corresponds to recording information and gives a rapid temperature rise exceeding nuclear boiling, is applied to an electrothermal converter arranged corresponding to a liquid flow path, in which an ink is retained, thereby causing the electrothermal converter to generate thermal energy to cause film boiling in the ink. As a result, a bubble can be formed in the ink in response to the driving signal in relation of one to one. The ink is ejected through an ejection orifice by the growth-contraction of this bubble to form at least one droplet. When the driving signal is applied in the form of a pulse, the growth-contraction of the bubble is suitably conducted in a moment, so that the ejection of the ink excellent in responsiveness in particular can be achieved. It is therefore favorable to use such pulsed signals.

The ink according to the present invention may also be favorably used in an ink jet recording apparatus utilizing mechanical energy as will be described below, not limited to the above-described thermal ink jet system. The ink jet recording apparatus of such a system is equipped with a nozzle-forming substrate having a plurality of nozzles, pressure-generating elements arranged in an opposing relation to the nozzles and each composed of a piezoelectric material and an electrically conductive material, and an ink filled around the pressure-generating elements, in which the pressure-generating elements are displaced by voltage applied to eject the ink from the nozzles.

The ink jet recording apparatus are not limited to the apparatus as described above in which the head and the ink cartridge are separately provided. Therefore, a device in which these members are integrally formed may also be used. The ink cartridge may be separably or unseparably and integrally installed in a recording head and mounted on a carriage, or may be provided at a fixing site of an ink jet recording apparatus to supply an ink to a recording head through an ink supply member such as a tube. When construction for applying a favorable negative pressure to a recording head is provided in the ink cartridge, the following construction may be used. More specifically, examples thereof include a mode in which an absorbing member is arranged in an ink storage portion of the ink cartridge, and a mode having a flexible ink-storing bag and a spring part for applying biasing force to the bag in a direction to expand the internal volume of the bag. The ink jet recording apparatus may use a recording system of such serial type as described above, or a line printer type in which recording elements are arranged over a range corresponding to the overall width of a recording medium.

EXAMPLES

The present invention will hereinafter be described in more detail by the following Examples and Comparative Examples. However, the present invention is not limited to the following examples unless going beyond the gist of the present invention. Incidentally, parts or % in the preparation of the coloring materials or the ink mean "parts or % by mass" unless expressly noted.

<Preparation of Coloring Material>

All compounds of the general formula (I) obtained by syntheses of coloring materials described below are mixtures, and a mixture of the following isomers is described as "a compound" unless expressly noted. More specifically, the compound includes regioisomers of the compound, regioisomers with respect to the nitrogen atom(s) in a nitrogen-containing aromatic heterocyclic ring, isomers with respect to the ratio of the benzene ring/the nitrogen-containing aromatic heterocyclic ring among A, B, C and D in the general formula (I), and α/β-regioisomers with respect to the substituted or unsubstituted sulfamoyl group in the benzene ring. As described above, it is extremely difficult to isolate a specific compound from a mixture of these isomers and determine the structure thereof, and so an example among thinkable isomers is taken as a representative example for the sake of convenience, and the structural formula thereof is described. With respect to compounds obtained upon synthesis of the compound of the general formula (I), mass spectrometric analysis, ICP emission spectrometry and analysis by absorbance measurement were conducted to confirm the syntheses of the respective compounds.

(Mass Spectrometric Analysis)

With respect to the respective compounds, DI-MS (direct mass spectrometry) was conducted. Analytic conditions of DI-MS are as follows.

EI method
Mass spectrometer: SSQ-7000
Ion source temperature: 230° C.
Degree of vacuum: about 8 mT.

(ICP Emission Spectrometry)

With respect to the respective compounds containing copper, the content of copper was analyzed. Specifically, the analysis was conducted in the following manner. After about 1 g of a sample for analysis was precisely weighed, and this sample was dissolved in pure water, the resultant solution was quantified in a 100-mL messflask. After 0.1 mL of this solution was taken and put in a 50-mL messflask by means of a whole pipette, a certain amount of Y (yttrium) was added as an internal standard substance, and the volume was quantified to 50 mL with pure water. Incidentally, the apparatus used at this time is an ICP emission spectral apparatus SPS3100 (manufactured by SII Nano Technology Inc.).

(Absorbance Measurement)

With respect to the respective compounds, the absorbance was measured. Measuring conditions of the absorbance are shown below.

Spectrophotometer: automatic recording spectrophotometer (trade name: U-3300, manufactured by Hitachi Ltd.)
Measuring cell: 1-cm quartz cell
Sampling interval: 0.1 nm
Scanning speed: 30 nm/min.
Number of measurements: 5 measurements to be averaged.

Compounds 1-1 to 1-7 that are the first coloring material used in Examples, and Compound 2 were respectively synthesized in the following manner. Comparative Compound 1 that is a cyan dye used in Comparative Examples was also synthesized.

[Synthesis of Compound 1-1]
(1) Synthesis of Compound (1):

Compound (1)

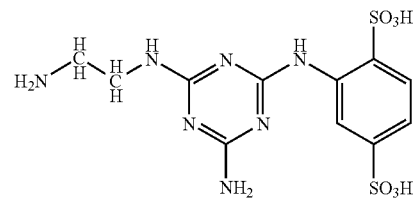

LOTAT OH104-K (product of Lion Corporation; 7.2 parts) and cyanuric chloride (239.9 parts) were added into ice water (2,000 parts), and the mixture was stirred for 30 minutes. Monosodium aniline-2,5-disulfonate (purity: 91.2%, 411.6 parts) was added to this mixture, and the pH of the reaction liquid was kept at 2.7 to 3.0 while adding a 25% aqueous solution of sodium hydroxide, thereby conducting a reaction for 1 hour at 10 to 15° C. and then for 2 hours at 27 to 30° C. After the reaction liquid was then cooled to 10° C. or less, a 25% aqueous solution of sodium hydroxide was added to adjust the pH of the reaction liquid to 7.0 to 7.5. To this reaction liquid was added 28% aqueous ammonia (118.4 parts), and the resultant mixture was held for 3 hours at a temperature of 10 to 15° C. and a pH of 9.5 to 10.0. Thereafter, concentrated hydrochloric acid was added to adjust the pH of the reaction liquid to 6.0 to 7.0. Ice (2,000 parts) was then added to cool the reaction liquid to 0° C., and ethylenediamine (780 parts) was added dropwise while keeping the temperature at 5° C. or less. Thereafter, the temperature of the reaction liquid was controlled to 10 to 15° C. and held for 1 hour. Concentrated hydrochloric acid was then added dropwise to this reaction liquid to adjust the pH of the reaction liquid to 0.9 to 1.0, during which ice was added so as not to raise the temperature, thereby keeping the temperature of the reaction liquid at 10 to 15° C. Ice was additionally added to this reaction liquid to lower the temperature of the reaction liquid to 10° C. or less. The amount of the reaction liquid at this time was 13,000 parts. Sodium chloride (2,600 parts; 20% to the amount of the reaction liquid) was added to the reaction liquid, and the resultant mixture was stirred for 1 hour to deposit crystals. The crystals deposited were taken out by filtration and washed with a 20% aqueous solution (3,000 parts) of sodium chloride to obtain a wet cake (743.0 parts; purity: 59.3%, HPLC purity: 93.3%).

(2) Synthesis of copper tribenzo(2,3-pyrido)porphyrazine [the following Compound (2): a mixture in which one of A, B, C and D in the general formula (A) is a pyridine ring, and the remainder are benzene rings]:

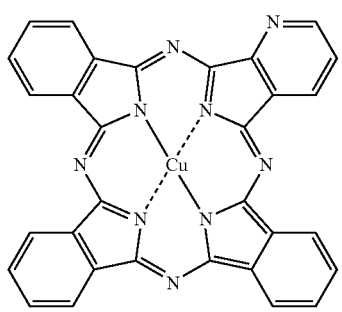

Compound (2)

Sulfolane (250 parts), phthalimide (22.1 parts), quinolinic acid (8.4 parts), urea (72.0 parts), copper(II) chloride dihydrate (purity: 97.0%; 8.8 parts) and ammonium molybdate (1.0 part) were added into a 4-necked flask, and the reaction liquid was heated to 200° C. and held for 5 hours. After completion of the reaction, the reaction liquid was cooled to 75° C., methanol (200 parts) was added, and crystals deposited were separated by filtration. The resultant crystals were washed with methanol (250 parts) and then with warm water (500 parts) to obtain a wet cake (61.9 parts). The resultant wet cake was added to 5% hydrochloric acid (500 parts), and this liquid was heated to 60° C. and held for 1 hour. The resultant crystals were separated by filtration and washed with water (300 parts). The resultant wet cake was then added to 10% aqueous ammonia (500 parts), and the temperature of the liquid was controlled to 25 to 30° C. and held for 1 hour. Thereafter, the resultant crystals were separated by filtration and then washed with water (300 parts) to obtain a wet cake (64.9 parts). The wet cake thus obtained was dried at 80° C. to obtain blue crystals (20.9 parts). The blue crystals were analyzed. As a result, the following measured values were obtained. From these results, the resultant blue crystals were identified as Compound (2) having the above structure.

Maximum absorption wavelength ($\lambda_{max}$): 670.5 nm (in pyridine)

| Result of elemental analysis: $C_{31}H_{15}N_9Cu$ | | | | |
|---|---|---|---|---|
| | C | H | N | Cu |
| Calculated (%) | 64.52 | 2.62 | 21.85 | 11.01 |
| Found (%) | 63.80 | 2.79 | 20.59 | 10.92 |

(3) Synthesis of copper tribenzo(2,3-pyrido)porphyrazine tri(sulfonyl chloride) [the following Compound (3): a mixture in which one of outermost aromatic rings of a main component in the mixture is a pyridine ring, and the remaining 3 rings are benzene rings]:

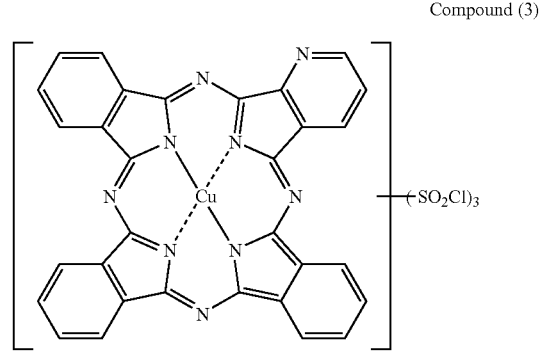

Compound (3)

Copper tribenzo(2,3-pyrido)porphyrazine (5.8 parts) obtained in the step (2) was gradually added to chlorosulfonic acid (46.2 parts) under stirring while keeping the temperature of the liquid at 60° C. or less. Thereafter, a reaction was conducted for 4 hours at 140° C. The reaction liquid was then cooled to 70° C., and thionyl chloride (17.9 parts) was added dropwise over 30 minutes to conduct a reaction for 3 hours at 70° C. The reaction liquid was cooled to 30° C. or less and slowly poured into ice water (500 parts), and crystals deposited were separated by filtration and washed with cold water (200 parts) to obtain a wet cake (71.1 parts) of copper tribenzo (2,3-pyrido)porphyrazine tri(sulfonyl chloride).

(4) Synthesis of the following Compound (4) [a mixture containing Exemplified Compound I-1: a mixture in which one of outermost aromatic rings of a main component in the mixture is a pyridine ring, the remaining 3 rings are benzene rings, b is 2.4, and c is 0.6]:

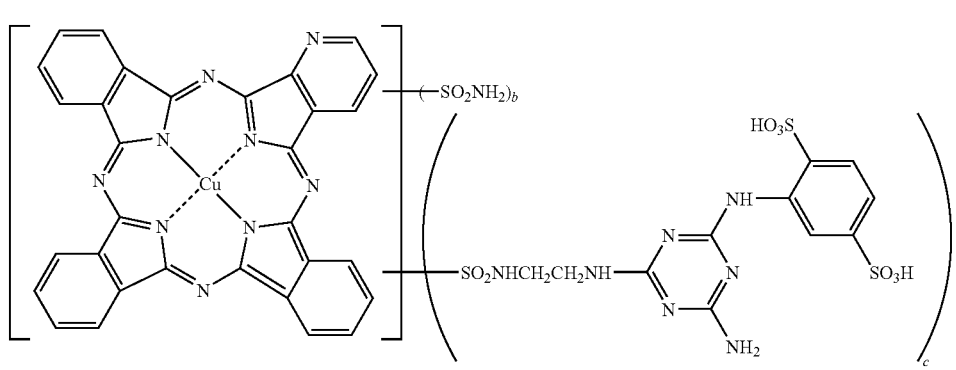

Compound (4)

The wet cake (71.1 parts) of copper tribenzo(2,3-pyrido) porphyrazine tri(sulfonyl chloride) (Compound (3)) obtained in the step (3) was added into ice water (200 parts) and suspended under stirring. A solution of Compound (1) (purity: 59.3%, 20.5 parts) obtained in the step (1) dissolved in aqueous ammonia (3.0 parts) and warm water (100 parts) was then added to the suspension. The pH of the reaction liquid was kept at 9.0 to 9.3 by adding 28% aqueous ammonia thereto, and the temperature of the reaction liquid was controlled to 17 to 20° C. to conduct a reaction for 6 hours. Thereafter, the reaction liquid was heated to 60° C. The amount of the reaction liquid at this time was 500 parts. Sodium chloride (100 parts, 20% to the amount of the reaction liquid) was added to this reaction liquid, and 35% aqueous hydrochloric acid was added to adjust the pH of the reaction liquid to 1.0, thereby depositing crystals. The crystals deposited were separated by filtration and washed with a 20% aqueous solution (100 parts) of sodium chloride to obtain a wet cake (47.7 parts). After the resultant wet cake was dissolved in water again, and the pH of the resultant solution was adjusted to 9.0, the whole amount was controlled to 300 parts, and the temperature of the solution was raised to 60° C. The amount of the solution at this time was 320 parts. Sodium chloride (48 parts, 15% to the amount of the solution) was added to the solution, and 35% aqueous hydrochloric acid was added to adjust the pH of the solution to 1.0, thereby depositing crystals. The crystals deposited were separated by filtration and washed with a 15% aqueous solution (100 parts) of sodium chloride to obtain a wet cake (47.8 parts). After the resultant wet cake (47.8 parts) was added into methanol (250 parts) and the resultant mixture was stirred for 1 hour at 60° C. to suspend the wet cake, filtration, washing with methanol (100 parts) and drying were conducted to obtain blue crystals (Compound (4), 10.7 parts). The blue crystals were analyzed. As a result, the maximum absorption wavelength ($\lambda_{max}$) was 611 nm (in an aqueous solution). The resultant Compound (4) was subjected to ion exchange according to a method known per se in the art to obtain Compound 1-1 of a sodium salt type.

[Synthesis of Compound 1-2]

(1) Synthesis of copper dibenzobis(2,3-pyrido)-porphyrazine [the following Compound (5): a mixture in which two of A, B, C and D in the general formula (A) are pyridine rings, and the remainder are benzene rings]:

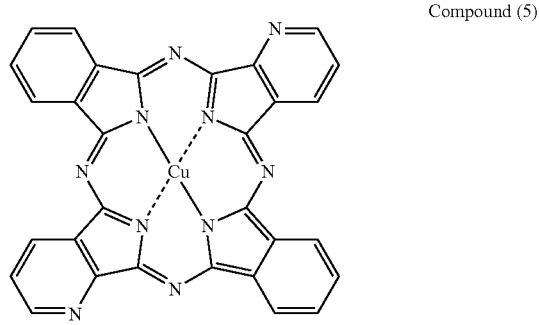

Compound (5)

Sulfolane (250 parts), phthalimide (14.7 parts), quinolinic acid (16.7 parts), urea (72.0 parts), copper(II) chloride dihydrate (purity: 97.0%; 8.8 parts) and ammonium molybdate (1.0 part) were added into a 4-necked flask, and the reaction liquid was heated to 200° C. and held for 5 hours. After completion of the reaction, the reaction liquid was cooled to 85° C., methanol (200 parts) was added, and crystals deposited were separated by filtration. The resultant crystals were washed with methanol (200 parts) and then with warm water (500 parts), and then dried to obtain crude copper dibenzobis (2,3-pyrido)porphyrazine (mixture, 24.1 parts) as blue crystals. The resultant crude copper dibenzobis(2,3-pyrido)porphyrazine (mixture, 24.1 parts) was added into 5% aqueous hydrochloric acid (500 parts), and this liquid was heated to 60° C. and held for 1 hour. Thereafter, the crystals were separated by filtration and then washed with water (100 parts) to obtain a wet cake. The resultant wet cake was added into 10% aqueous ammonia (500 parts), and the temperature of the liquid was controlled to 25 to 30° C. and held for 1 hour. The resultant crystals were separated by filtration and then washed with water (200 parts) to obtain a wet cake (44.4 parts). The resultant wet cake was dried at 80° C. to obtain copper dibenzobis(2,3-pyrido)porphyrazine (mixture, 17.7 parts) as blue crystals. The blue crystals were analyzed. As a result, the following measured values were obtained. From these results, the resultant blue crystals were identified as Compound (5) having the above structure.

Maximum absorption wavelength ($\lambda_{max}$): 662.5 nm (in pyridine)

| Result of elemental analysis: $C_{30}H_{14}N_{10}Cu$ | | | | |
|---|---|---|---|---|
| | C | H | N | Cu |
| Calculated (%) | 62.33 | 2.44 | 24.23 | 10.99 |
| Found (%) | 61.46 | 2.62 | 23.35 | 10.37 |

(2) Synthesis of copper dibenzobis(2,3-pyrido)-porphyrazine di(sulfonyl chloride) [the following Compound (6): a mixture in which two of outermost aromatic rings of a main component in the mixture are pyridine rings, and the remaining 2 rings are benzene rings]:

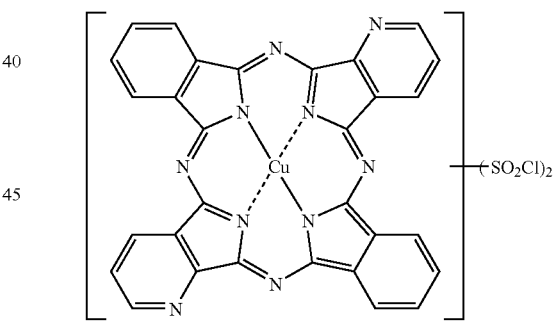

Compound (6)

Copper dibenzobis(2,3-pyrido)porphyrazine (5.8 parts) obtained in the step (1) was gradually added to chlorosulfonic acid (46.2 parts) under stirring while keeping the temperature of the liquid at 60° C. or less. Thereafter, a reaction was conducted for 4 hours at 140° C. The reaction liquid was then cooled to 70° C., and thionyl chloride (17.9 parts) was added dropwise over 30 minutes to conduct a reaction for 3 hours at 70° C. The reaction liquid was cooled to 30° C. or less and slowly poured into ice water (500 parts), and crystals deposited were separated by filtration and washed with cold water (200 parts) to obtain a wet cake (46.0 parts) of copper dibenzobis(2,3-pyrido)porphyrazine di(sulfonyl chloride).

(3) Synthesis of the following Compound (7) [a mixture containing Exemplified Compounds I-2 and I-3: a mixture in which two of outermost aromatic rings of a main component in the mixture are pyridine rings, the remaining 2 rings are benzene rings, b is 1.6, and c is 0.4]:

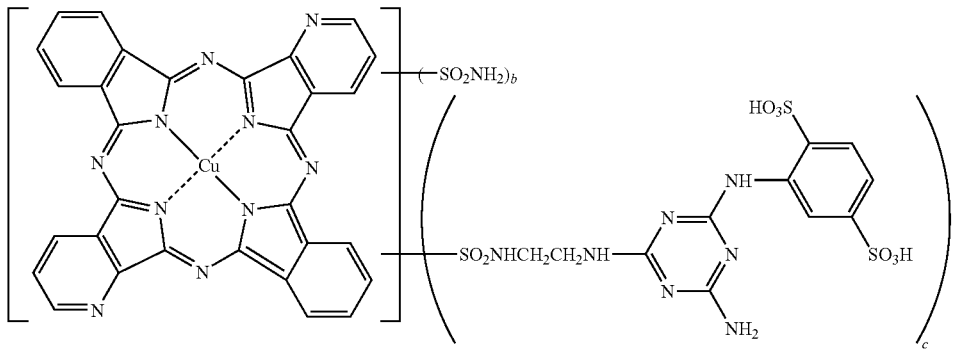

Compound (7)

The wet cake (46.0 parts) of copper dibenzobis(2,3-pyrido) porphyrazine di(sulfonyl chloride) (Compound (6)) obtained in the step (2) was added into ice water (250 parts) and suspended under stirring. A solution of Compound (1) (purity: 59.3%, 20.5 parts) obtained upon the synthesis of Compound 1-1 dissolved in aqueous ammonia (4.0 parts) and warm water (100 parts) was then added to the suspension. The pH of the reaction liquid was kept at 9.0 to 9.3 by adding 28% aqueous ammonia thereto, and the temperature of the reaction liquid was controlled to 17 to 20° C. to conduct a reaction for 4 hours. Thereafter, the reaction liquid was heated to 60° C. The amount of the reaction liquid at this time was 480 parts. Sodium chloride (48 parts, 10% to the amount of the reaction liquid) was added to this reaction liquid, and 35% aqueous hydrochloric acid was added to adjust the pH of the reaction liquid to 1.0, thereby depositing crystals. The crystals deposited were separated by filtration and washed with a 15% aqueous solution (100 parts) of sodium chloride to obtain a wet cake (86.1 parts). After the resultant wet cake was dissolved in water again, and the pH of the resultant solution was adjusted to 9.0, the whole amount was controlled to 400 parts, and the temperature of the solution was raised to 60° C. The amount of the solution at this time was 410 parts. Sodium chloride (41 parts, 10% to the amount of the solution) was added to the solution, and 35% aqueous hydrochloric acid was added to adjust the pH of the solution to 1.0, thereby depositing crystals. The crystals deposited were separated by filtration and washed with a 10% aqueous solution (100 parts) of sodium chloride to obtain a wet cake (65.7 parts). After the resultant wet cake (65.7 parts) was added into methanol (330 parts) and the resultant mixture was stirred for 1 hour at 60° C. to suspend the wet cake, filtration, washing with methanol (100 parts) and drying were conducted to obtain blue crystals (Compound (7), 9.3 parts). The blue crystals were analyzed. As a result, a maximum absorption wavelength ($\lambda_{max}$) was 602 nm (in an aqueous solution). The resultant Compound (7) was subjected to ion exchange according to a method known per se in the art to obtain Compound 1-2 of a sodium salt type.

[Synthesis of Compound 1-3]

(1) Synthesis of copper benzotris(2,3-pyrido)porphyrazine [the following Compound (8): a mixture in which three of A, B, C and D in the general formula (A) are pyridine rings, and the remainder is a benzene ring]:

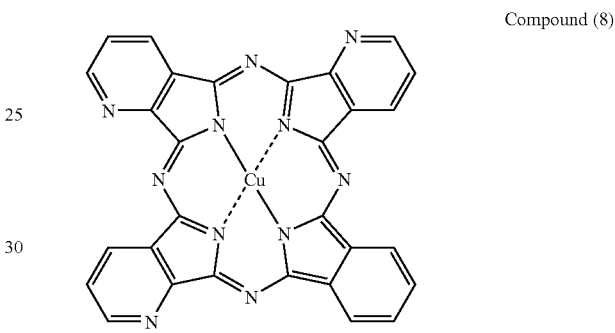

Compound (8)

Sulfolane (250 parts), phthalimide (7.4 parts), quinolinic acid (25.1 parts), urea (72.0 parts), copper(II) chloride dihydrate (purity: 97.0%; 8.8 parts) and ammonium molybdate (1.0 part) were added into a 4-necked flask, and the reaction liquid was heated to 200° C. and held for 5 hours. After completion of the reaction, the reaction liquid was cooled to 70° C., methanol (200 parts) was added, and crystals deposited were separated by filtration. The resultant crystals were washed with methanol (200 parts) and then with warm water (500 parts), and then dried to obtain crude copper benzotris (2,3-pyrido)porphyrazine (mixture, 20.5 parts) as blue crystals. The resultant crude copper benzotris(2,3-pyrido)porphyrazine (mixture, 14.5 parts) was added into 5% hydrochloric acid (500 parts), and this liquid was heated to 60° C. and held for 1 hour. Thereafter, the crystals were separated by filtration and then washed with water (100 parts) to obtain a wet cake. The resultant wet cake was added into 10% aqueous ammonia (500 parts), and the temperature of the liquid was controlled to 25 to 30° C. and held for 1 hour. The resultant crystals were separated by filtration and then washed with water (100 parts) to obtain a wet cake (23.5 parts). The resultant wet cake was dried at 80° C. to obtain copper benzotris(2,3-pyrido)porphyrazine (mixture, 9.7 parts) as blue crystals. The blue crystals were analyzed. As a result, the following measured values were obtained. From these results, the resultant blue crystals were identified as Compound (8) having the above structure.

$\lambda_{max}$: 655 nm (in pyridine)

| Elemental analysis: $C_{29}H_{13}N_{11}Cu$ | | | | |
|---|---|---|---|---|
| | C | H | N | Cu |
| Calculated (%) | 60.15 | 2.26 | 26.60 | 10.97 |
| Found (%) | 58.73 | 2.48 | 25.87 | 10.08 |

(2) Synthesis of copper benzotris(2,3-pyrido)-porphyrazine di(sulfonyl chloride) [the following Compound (9): a mixture in which three of outermost aromatic rings of a main component in the mixture are pyridine rings, and the remainder is a benzene ring]:

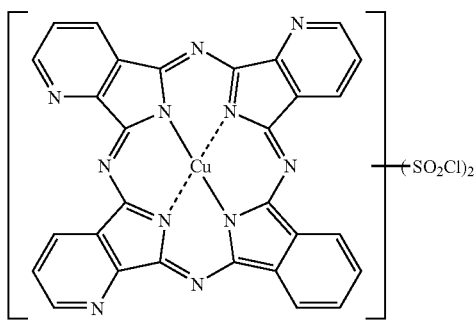

Compound (9)

Copper benzotris(2,3-pyrido)porphyrazine (5.8 parts) obtained in the step (1) was gradually added to chlorosulfonic acid (46.2 parts) under stirring while keeping the temperature of the liquid at 60° C. or less. Thereafter, a reaction was conducted for 4 hours at 140° C. The reaction liquid was then cooled to 70° C., and thionyl chloride (17.9 parts) was added dropwise over 30 minutes to conduct a reaction for 3 hours at 70° C. The reaction liquid was cooled to 30° C. or less and slowly poured into ice water (500 parts), and crystals deposited were separated by filtration and washed with cold water (200 parts) to obtain a wet cake (33.0 parts) of copper benzotris(2,3-pyrido)porphyrazine di(sulfonyl chloride).

(3) Synthesis of the following Compound (10) [a mixture in which three of outermost aromatic rings of a main component in the mixture are pyridine rings, the remainder is a benzene ring, b is 0.9, and c is 0.1]:

The wet cake (33.0 parts) of copper benzotris(2,3-pyrido) porphyrazine di(sulfonyl chloride) (Compound (9)) obtained in the step (2) was added into ice water (250 parts) and suspended under stirring. A solution of Compound (1) (purity: 59.3%, 20.5 parts) obtained upon the synthesis of Compound 1-1 dissolved in aqueous ammonia (4.0 parts) and warm water (90 parts) was then added to the suspension. The pH of the reaction liquid was kept at 9.0 to 9.3 by adding 28% aqueous ammonia thereto, and the temperature of the reaction liquid was controlled to 17 to 20° C. to conduct a reaction for 3 hours. Thereafter, the reaction liquid was heated to 60° C. The amount of the reaction liquid at this time was 450 parts. Sodium chloride (67.5 parts, 15% to the amount of the reaction liquid) was added to this reaction liquid, and 35% aqueous hydrochloric acid was added to adjust the pH of the reaction liquid to 1.0, thereby depositing crystals. The crystals deposited were separated by filtration and washed with a 15% aqueous solution (100 parts) of sodium chloride to obtain a wet cake (42.6 parts). After the resultant wet cake was dissolved in water again, and the pH of the resultant solution was adjusted to 9.0, the whole amount was controlled to 300 parts, and the temperature of the solution was raised to 60° C. The amount of the solution at this time was 310 parts. Sodium chloride (31 parts, 10% to the amount of the solution) was added to the solution, and 35% aqueous hydrochloric acid was added to adjust the pH of the solution to 1.0, thereby depositing crystals. The crystals deposited were separated by filtration and washed with a 10% aqueous solution (100 parts) of sodium chloride to obtain a wet cake (42.8 parts). After the resultant wet cake (42.8 parts) was added into methanol (220 parts) and the resultant mixture was stirred for 1 hour at 60° C. to suspend the wet cake, filtration, washing with methanol (100 parts) and drying were conducted to obtain blue crystals (Compound (10), 5.0 parts). The blue crystals were analyzed. As a result, the maximum absorption wavelength ($\lambda_{max}$) was 584 nm (in an aqueous solution). The resultant Compound (10) was subjected to ion exchange according to a method known per se in the art to obtain Compound 1-3 of a sodium salt type.

[Synthesis of Compound 1-4]

(1) Synthesis of copper tribenzo(2,3-pyrido)porphyrazine tri(sodium sulfate) [the following Compound (11): sodium salt of a mixture in which one of outermost aromatic rings of a main component in the mixture is a pyridine ring, and the remainder are benzene rings]:

Compound (10)

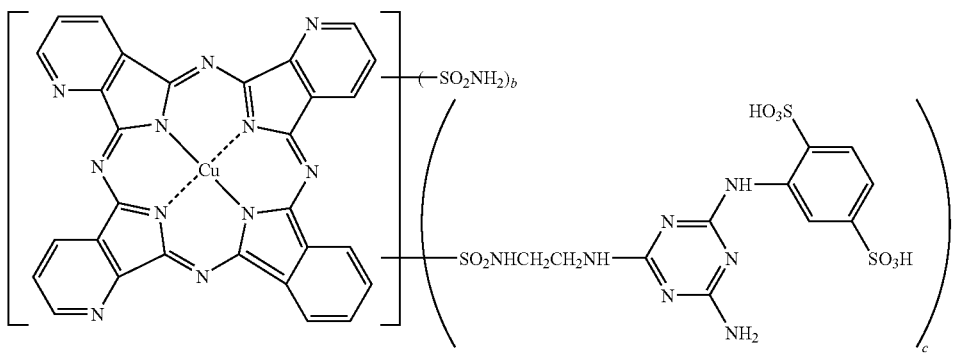

Compound (11)

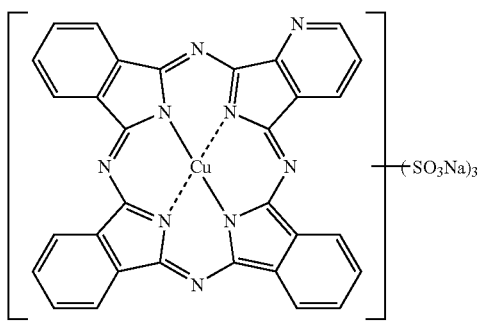

Sulfolane (250 parts), 4-sulfophthalic acid (50% aqueous solution containing 20% of 3-sulfophthalic acid, product of Pilot Chemical; 73.8 parts) and 28% aqueous ammonia (27.3 parts) were added into a 4-necked flask, and the reaction liquid was heated to 160° C. while distilling off water. After completion of the reaction, the reaction liquid was cooled to 100° C., quinolinic acid (8.4 parts), urea (72.0 parts), copper (II) chloride dihydrate (purity: 97.0%; 8.8 parts) and ammonium molybdate (1.0 part) were added, and the resultant mixture was heated to 200° C. and held for 5 hours. After completion of the reaction, the reaction liquid was cooled to 90° C., methanol (200 parts) was added, and crystals deposited were separated by filtration. The resultant crystals were washed with methanol (750 parts) to obtain a wet cake. The resultant wet cake was added into a mixed liquid of 28.6% brine (900 parts) and concentrated hydrochloric acid (100 parts), and the liquid was heated to 60° C. and held for 1 hour. The resultant crystals were separated by filtration and then washed with a mixed liquid of 28.6% brine (225 parts) and concentrated hydrochloric acid (25 parts). The resultant wet cake was then added into methanol (500 parts), 28% aqueous ammonia (50 parts) was further added, the liquid was heated to 60° C. and held for 1 hour, and the resultant crystals were separated by filtration and washed with methanol (200 parts) to obtain a wet cake (78.1 parts). The resultant wet cake was added into methanol (500 parts), a 25% aqueous solution (30 parts) of sodium hydroxide was added, the liquid was heated to 60° C. and held for 1 hour, and the resultant crystals were separated by filtration and washed with methanol (200 parts) to obtain a wet cake (72.6 parts). The resultant wet cake was dried at 80° C. to obtain copper tribenzo(2,3-pyrido)porphyrazine tri(sodium sulfonate) (32.4 parts) as blue crystals. The blue crystals were analyzed. As a result, the maximum absorption wavelength ($\lambda_{max}$) thereof was 625 nm (in an aqueous solution). From this result, the resultant blue crystals were identified as Compound (11) having the above structure.

(2) Synthesis of copper tribenzo(2,3-pyrido)porphyrazine tri(sulfonyl chloride) [the following Compound (12): a mixture that one of outermost aromatic rings of a main component in the mixture is a pyridine ring, and the remainder are benzene rings]:

Compound (12)

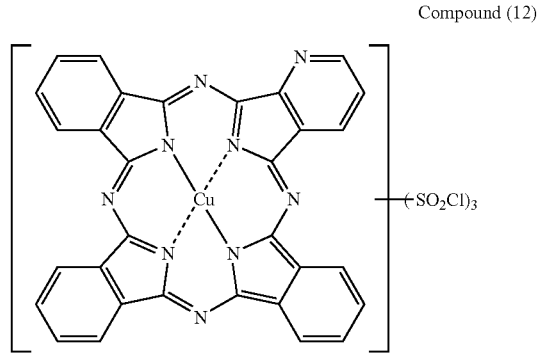

Copper tribenzo(2,3-pyrido)porphyrazine tri-(sodium sulfate) (8.8 parts) obtained in the step (1) was gradually added to chlorosulfonic acid (70.6 parts) under stirring while keeping the temperature of the liquid at 60° C. or less. Thereafter, a reaction was conducted for 4 hours at 120° C. The reaction liquid was then cooled to 70° C., and thionyl chloride (17.9 parts) was added dropwise over 30 minutes to conduct a reaction for 3 hours at 70° C. The reaction liquid was cooled to 30° C. or less and slowly poured into ice water (500 parts), and crystals deposited were separated by filtration and washed with cold water (100 parts) to obtain a wet cake (61.2 parts) of copper tribenzo(2,3-pyrido)porphyrazine tri(sulfonyl chloride) (mixture).

(3) Synthesis of the following Compound (13) [a mixture containing Exemplified Compound I-1: a mixture in which one of outermost aromatic rings of a main component in the mixture is a pyridine ring, the remainder are benzene rings, b is 2, and c is 1]:

Compound (13)

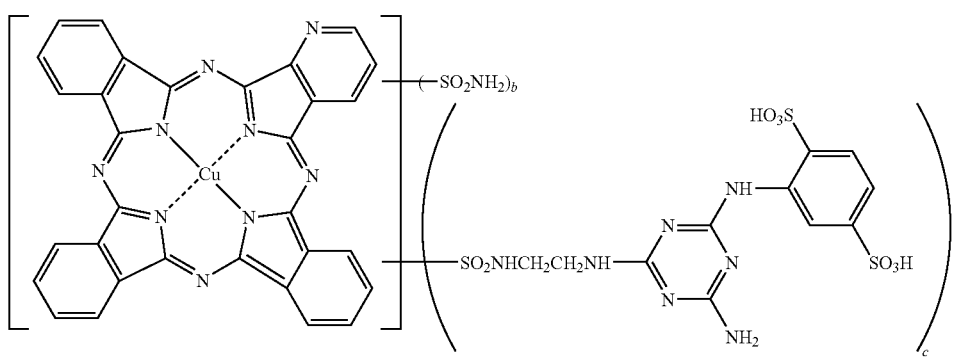

The wet cake (61.2 parts) of copper tribenzo(2,3-pyrido) porphyrazine tri(sulfonyl chloride) (Compound (12)) obtained in the step (2) was added into ice water (250 parts) and suspended under stirring. A solution of Compound (1) (purity: 59.3%, 20.5 parts) obtained upon the synthesis of Compound 1-1 dissolved in aqueous ammonia (3.0 parts) and warm water (90 parts) was then added to the suspension. The pH of the reaction liquid was kept at 9.0 to 9.3 by adding 28% aqueous ammonia thereto, and the temperature of the reaction liquid was controlled to 17 to 20° C. to conduct a reaction for 4 hours. Thereafter, the reaction liquid was heated to 60° C. The amount of the reaction liquid at this time was 500 parts. Sodium chloride (100 parts, 20% to the amount of the reaction liquid) was added to this reaction liquid, and 35% aqueous hydrochloric acid was added to adjust the pH of the reaction liquid to 1.0, thereby depositing crystals. The crystals deposited were separated by filtration and washed with a 20% aqueous solution (100 parts) of sodium chloride to obtain a wet cake (37.0 parts). After the resultant wet cake was dissolved in water again, and the pH of the resultant solution was adjusted to 9.0, the whole amount was controlled to 400 parts, and the temperature of the solution was raised to 60° C. The amount of the solution at this time was 400 parts. Sodium chloride (80 parts, 20% to the amount of the solution) was added to the solution, and 35% hydrochloric acid was added to adjust the pH of the solution to 1.0, thereby depositing crystals. The crystals deposited were separated by filtration and washed with a 20% aqueous solution (100 parts) of sodium chloride to obtain a wet cake (39.2 parts). After the resultant wet cake (39.2 parts) was added into methanol (200 parts) and the resultant mixture was stirred for 1 hour at 60° C. to suspend the wet cake, filtration, washing with methanol (200 parts) and drying were conducted to obtain blue crystals (Compound (13), 9.8 parts). The blue crystals were analyzed. As a result, the maximum absorption wavelength ($\lambda_{max}$) was 614 nm (in an aqueous solution). The resultant Compound (13) was subjected to ion exchange according to a method known per se in the art to obtain Compound 1-4 of a sodium salt type.

[Synthesis of Compound 1-5]

(1) Synthesis of copper dibenzobis(2,3-pyrido)-porphyrazine di(sodium sulfate) [the following Compound (14): sodium salt of a mixture in which two of outermost aromatic rings of a main component in the mixture are pyridine rings, and the remainder are benzene rings]:

Compound (14)

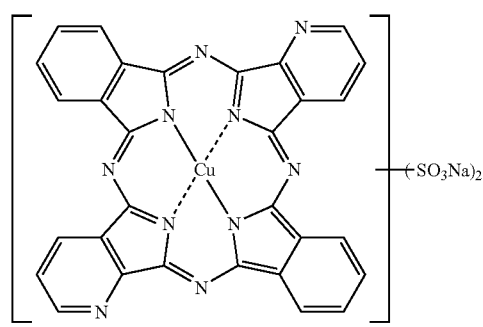

Sulfolane (250 parts), 4-sulfophthalic acid (50% aqueous solution containing 20% of 3-sulfophthalic acid, product of Pilot Chemical; 49.2 parts) and 28% aqueous ammonia (18.2 parts) were added into a 4-necked flask, and the reaction liquid was heated to 160° C. while distilling off water. After completion of the reaction, the reaction liquid was cooled to 110° C., quinolinic acid (16.7 parts), urea (72.0 parts), copper (II) chloride dihydrate (purity: 97.0%; 8.8 parts) and ammonium molybdate (1.0 part) were added, and the resultant mixture was heated to 200° C. and held for 5 hours. After completion of the reaction, the reaction liquid was cooled to 70° C., methanol (100 parts) was added, and crystals deposited were separated by filtration. The resultant crystals were washed with methanol (150 parts) and then dried to obtain blue crystals (36.9 parts). The resultant blue crystals were added into a mixed liquid of 20% brine (1,000 parts) and concentrated hydrochloric acid (10 parts), and the liquid was heated to 60° C. and held for 1 hour. Thereafter, a 25% aqueous solution of sodium hydroxide was added to adjust the pH of the liquid to 7 to 8, and crystals deposited were separated by filtration to obtain a wet cake. The resultant wet cake was added into water (1,000 parts), the temperature of the liquid was controlled to 60° C. and held for 1 hour, and methanol (600 parts) was added to deposit crystals. The resultant crystals were separated by filtration and then washed with methanol (100 parts) to obtain a wet cake (110.7 parts). The resultant wet cake was dried at 80° C. to obtain copper dibenzobis(2,3-pyrido)porphyrazine di(sodium sulfonate) (28.9 parts) as blue crystals. The blue crystals were analyzed. As a result, the maximum absorption wavelength ($\lambda_{max}$) thereof was 607.5 nm (in an aqueous solution). From this result, the resultant blue crystals were identified as Compound (14) having the above structure.

(2) Synthesis of copper dibenzobis(2,3-pyrido)porphyrazine di(sulfonyl chloride) [the following Compound (15): a mixture in which two of outermost aromatic rings of a main component in the mixture are pyridine rings, and the remainder are benzene rings]:

Compound (15)

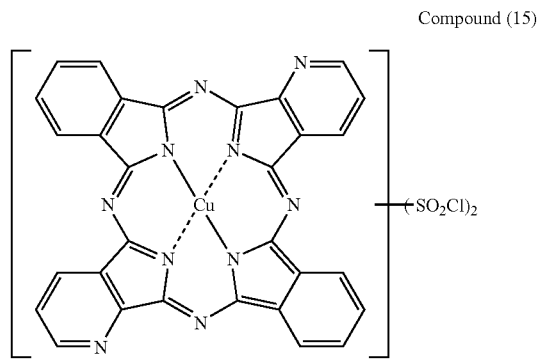

Copper dibenzobis(2,3-pyrido)porphyrazine di-(sodium sulfate) (7.8 parts) obtained in the step (1) was gradually added to chlorosulfonic acid (62.6 parts) under stirring while keeping the temperature of the liquid at 60° C. or less. Thereafter, a reaction was conducted for 4 hours at 120° C. The reaction liquid was then cooled to 70° C., and thionyl chloride (17.9 parts) was added dropwise over 30 minutes to conduct a reaction for 3 hours at 70° C. The reaction liquid was cooled to 30° C. or less and slowly poured into ice water (500 parts), and crystals deposited were separated by filtration and washed with cold water (200 parts) to obtain a wet cake (44.3 parts) of copper dibenzobis(2,3-pyrido)porphyrazine di(sulfonyl chloride).

(3) Synthesis of the following Compound (16) [a mixture containing Exemplified Compounds I-2 and I-3: a mixture in which two of outermost aromatic rings of a main component in the mixture are pyridine rings, the remainder are benzene rings, b is 1.7, and c is 0.3]:

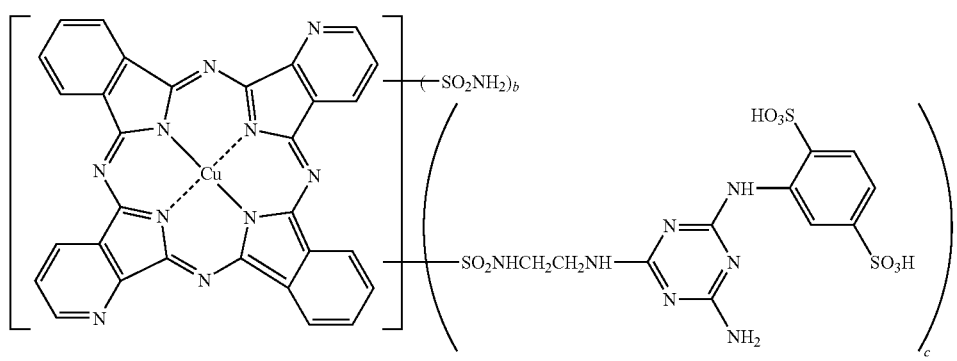

Compound (16)

The wet cake (44.3 parts) of copper dibenzobis(2,3-pyrido) porphyrazine di(sulfonyl chloride) (Compound (15)) obtained in the step (2) was added into ice water (250 parts) and suspended under stirring. A solution of Compound (1) (purity: 59.3%, 25.3 parts) obtained upon the synthesis of Compound 1-1 dissolved in aqueous ammonia (5.0 parts) and warm water (100 parts) was then added to the suspension. The pH of the reaction liquid was kept at 9.0 to 9.3 by adding 28% aqueous ammonia thereto, and the temperature of the reaction liquid was controlled to 17 to 20° C. to conduct a reaction for 3 hours. Thereafter, the reaction liquid was heated to 60° C. The amount of the reaction liquid at this time was 520 parts. Sodium chloride (104 parts, 20% to the amount of the reaction liquid) was added to this reaction liquid, and 35% hydrochloric acid was added to adjust the pH of the reaction liquid to 1.0, thereby depositing crystals. The crystals deposited were separated by filtration and washed with a 20% aqueous solution (100 parts) of sodium chloride to obtain a wet cake (27.6 parts). After the resultant wet cake was dissolved in water again, and the pH of the resultant solution was adjusted to 9.0, the whole amount was controlled to 300 parts, and the temperature of the solution was raised to 60° C. The amount of the solution at this time was 310 parts. Sodium chloride (62 parts, 20% to the amount of the solution) was added to the solution, and 35% aqueous hydrochloric acid was added to adjust the pH of the solution to 1.0, thereby depositing crystals. The crystals deposited were separated by filtration and washed with a 20% aqueous solution (100 parts) of sodium chloride to obtain a wet cake (32.0 parts). After the resultant wet cake (32.0 parts) was added into methanol (160 parts) and the resultant mixture was stirred for 1 hour at 60° C. to suspend the wet cake, filtration, washing with methanol (100 parts) and drying were conducted to obtain blue crystals (Compound (16), 7.6 parts). The blue crystals were analyzed. As a result, the maximum absorption wavelength ($\lambda_{max}$) was 609 nm (in an aqueous solution). The resultant Compound (16) was subjected to ion exchange according to a method known per se in the art to obtain Compound 1-5 of a sodium salt type.

[Synthesis of Compound 1-6]

(1) Synthesis of copper dibenzobis(2,3-pyrazino)-porphyrazine di(sodium sulfate) [the following Compound (17): sodium salt of a mixture in which two of outermost aromatic rings of a main component in the mixture are pyrazine rings, and the remainder are benzene rings]:

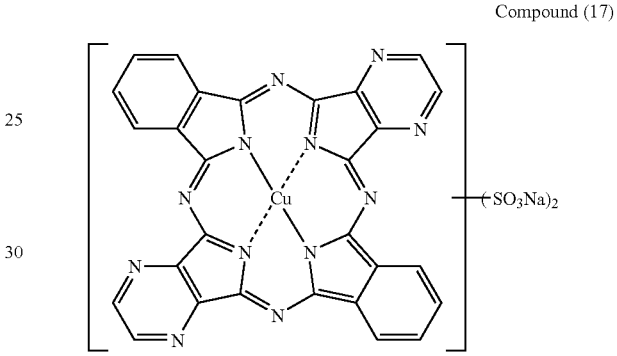

Compound (17)

Sulfolane (250 parts), 4-sulfophthalic acid (50% aqueous solution containing 20% of 3-sulfophthalic acid, product of Pilot Chemical; 49.2 parts) and 28% aqueous ammonia (18.2 parts) were added into a 4-necked flask, and the reaction liquid was heated to 160° C. while distilling off water. After completion of the reaction, the reaction liquid was cooled to 100° C., pyrazinedicarboxylic acid (16.8 parts), urea (72.0 parts), copper(II) chloride dihydrate (purity: 97.0%; 8.8 parts) and ammonium molybdate (1.0 part) were added, and the resultant mixture was heated to 200° C. and held for 5 hours. After completion of the reaction, the reaction liquid was cooled to 70° C., methanol (100 parts) was added, and crystals deposited were separated by filtration. The resultant crystals were washed with methanol (400 parts) to obtain a wet cake (55.0 parts). The resultant wet cake was added into a mixed liquid of 28.6% brine (900 parts) and concentrated hydrochloric acid (100 parts), and the liquid was heated to 60° C. and held for 1 hour. The resultant crystals were separated by filtration and then washed with a mixed liquid of 28.6% brine (225 parts) and concentrated hydrochloric acid (25 parts). The resultant wet cake was then added into methanol (500 parts), 28% aqueous ammonia (50 parts) was further added, the liquid was heated to 6° C. and held for 1 hour, and crystals were separated by filtration and washed with methanol (200 parts) to obtain a wet cake (34.8 parts). The resultant wet cake was added into methanol (500 parts), a 25% aqueous solution (30 parts) of sodium hydroxide was added, the liquid was heated to 60° C. and held for 1 hour, and crystals were separated by filtration and washed with methanol (200 parts) to obtain a wet cake (31.5 parts). The resultant wet cake was dried at 80° C. to obtain copper dibenzobis(2,3-pyrazino) porphyrazine di(sodium sulfonate) (mixture, 22.2 parts) as blue crystals. The blue crystals were analyzed. As a result, the maximum absorption wavelength ($\lambda_{max}$) thereof was 610.5 nm (in an aqueous solution). From this result, the resultant blue crystals were identified as Compound (17) having the above structure.

(2) Synthesis of copper dibenzobis(2,3-pyrazino)-porphyrazine di(sulfonyl chloride) [the following Compound (18): a mixture in which two of outermost aromatic rings of a main component in the mixture are pyrazine rings, and the remainder are benzene rings]:

Compound (18)

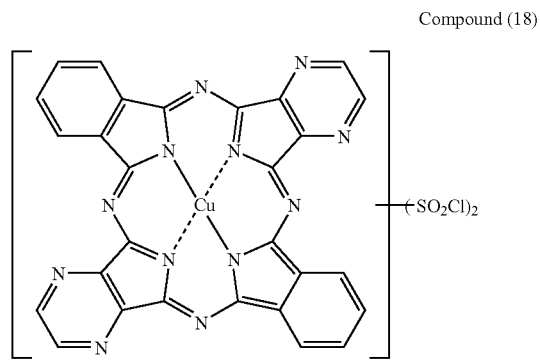

Copper dibenzobis(2,3-pyrazino)porphyrazine di-(sodium sulfate) (7.8 parts) obtained in the step (1) was gradually added to chlorosulfonic acid (62.7 parts) under stirring while keeping the temperature of the liquid at 60° C. or less. Thereafter, a reaction was conducted for 4 hours at 120° C. The reaction liquid was then cooled to 70° C., and thionyl chloride (17.9 parts) was added dropwise over 30 minutes to conduct a reaction for 3 hours at 70° C. The reaction liquid was cooled to 30° C. or less and slowly poured into ice water (500 parts), and crystals deposited were separated by filtration and washed with cold water (200 parts) to obtain a wet cake (44.1 parts) of copper dibenzobis(2,3-pyrazino)-porphyrazine di(sulfonyl chloride) (mixture).

(3) Synthesis of the following Compound (19) [a mixture containing Exemplified Compounds I-11 and I-12: a mixture in which two of outermost aromatic rings of a main component in the mixture are pyrazine rings, the remainder are benzene rings, b is 1.2, and c is 0.8]:

The wet cake (44.1 parts) of copper dibenzobis(2,3-pyrazino)porphyrazine di(sulfonyl chloride) (Compound (18)) obtained in the step (2) was added into ice water (200 parts) and suspended under stirring. A solution of Compound (1) (purity: 59.3%, 20.5 parts) obtained upon the synthesis of Compound 1-1 dissolved in aqueous ammonia (3.0 parts) and warm water (100 parts) was then added to the suspension. The pH of the reaction liquid was kept at 9.0 to 9.3 by adding 28% aqueous ammonia thereto, and the temperature of the reaction liquid was controlled to 17 to 20° C. to conduct a reaction for 2 hours. Thereafter, the reaction liquid was heated to 60° C. The amount of the reaction liquid at this time was 450 parts. Sodium chloride (90 parts, 20% to the amount of the reaction liquid) was added to this reaction liquid, and 35% hydrochloric acid was added to adjust the pH of the reaction liquid to 1.0, thereby depositing crystals. The crystals deposited were separated by filtration and washed with a 20% aqueous solution (100 parts) of sodium chloride to obtain a wet cake (31.7 parts). After the resultant wet cake was dissolved in water again, and the pH of the resultant solution was adjusted to 9.0, the whole amount was controlled to 300 parts, and the temperature of the solution was raised to 60° C. The amount of the solution at this time was 320 parts. Sodium chloride (64 parts, 20% to the amount of the solution) was added to the solution, and 35% hydrochloric acid was added to adjust the pH of the solution to 1.0, thereby depositing crystals. The crystals deposited were separated by filtration and washed with a 20% aqueous solution (100 parts) of sodium chloride to obtain a wet cake (38.1 parts). After the resultant wet cake (38.1 parts) was added into methanol (210 parts) and the resultant mixture was stirred for 1 hour at 60° C. to suspend the wet cake, filtration, washing with methanol (200 parts) and drying were conducted to obtain blue crystals (Compound (19), 8.8 parts). The blue crystals were analyzed. As a result, the maximum absorption wavelength ($\lambda_{max}$) was 614.5 nm (in an aqueous solution). The resultant Compound (19) was subjected to ion exchange according to a method known per se in the art to obtain Compound 1-6 of a sodium salt type.

[Synthesis of Compound 1-7]

(1) Synthesis of a mixture of copper tribenzo(2,3-pyrido) porphyrazine and copper dibenzobis(2,3-pyrido)-porphyrazine [a mixture in which the ratio of the pyridine ring to the benzene ring among A, B, C and D in the general formula (A) is 1.5:2.5 on the average]

Sulfolane (250 parts), phthalimide (18.4 parts), quinolinic acid (12.5 parts), urea (72.0 parts), copper(II) chloride dihydrate (purity: 97.0%; 8.8 parts) and ammonium molybdate (1.0 part) were added into a 4-necked flask, and the reaction liquid was heated to 200° C. and held for 5 hours. After completion of the reaction, the reaction liquid was cooled to Compound (19)

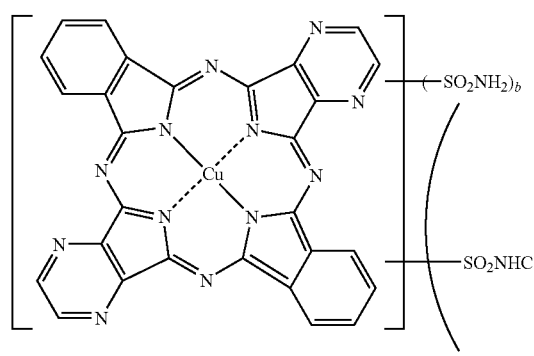 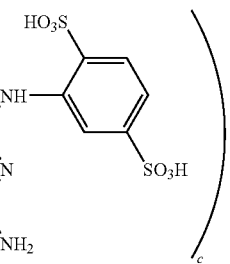

65° C., methanol (200 parts) was added, and crystals deposited were separated by filtration. The resultant crystals were washed with methanol (150 parts) and then with warm water (200 parts) to obtain a wet cake (72.2 parts). The resultant wet cake was added to 5% hydrochloric acid (500 parts), and this liquid was heated to 60° C. and held for 1 hour. The resultant crystals were separated by filtration and washed with water (200 parts). The resultant wet cake was then added into 10% aqueous ammonia (500 parts), and the temperature of the liquid was controlled to 60° C. and held for 1 hour. Thereafter, the resultant crystals were separated by filtration and then washed with water (300 parts) and then with methanol (100 parts) to obtain a wet cake (33.6 parts). The resultant wet cake was dried at 80° C. to obtain a mixture (19.8 parts) of copper tribenzo(2,3-pyrido)porphyrazine and copper dibenzobis-(2,3-pyrido)porphyrazine as blue crystals. The blue crystals were analyzed. As a result, the maximum absorption wavelength ($\lambda_{max}$) thereof was 663.5 nm (in pyridine).

(2) Synthesis of a mixture of copper tribenzo(2,3-pyrido)porphyrazine tri(sulfonyl chloride) and copper dibenzobis(2,3-pyrido)porphyrazine di(sulfonyl chloride) [a mixture containing Compound (3) and Compound (5): a mixture in which the ratio of the pyridine ring to the benzene ring among A, B, C and D in the general formula (B) is 1.5:2.5 on the average, and x is 2.5]:

The mixture (5.8 parts) of copper tribenzo(2,3-pyrido)porphyrazine and copper dibenzobis-(2,3-pyrido)-porphyrazine obtained in the step (1) was gradually added to chlorosulfonic acid (46.2 parts) under stirring while keeping the temperature of the liquid at 60° C. or less. Thereafter, a reaction was conducted for 4 hours at 140° C. The reaction liquid was then cooled to 70° C., and thionyl chloride (17.9 parts) was added dropwise over 30 minutes to conduct a reaction for 3 hours at 70° C. The reaction liquid was cooled to 30° C. or less and slowly poured into ice water (500 parts), and crystals deposited were separated by filtration and washed with cold water (200 parts). In such a manner, a wet cake (59.3 parts) of a mixture of copper tribenzo(2,3-pyrido)porphyrazine tri(sulfonyl chloride) and copper dibenzobis(2,3-pyrido)porphyrazine di(sulfonyl chloride) was obtained.

(3) Synthesis of a mixture of Compound (4) and Compound (16) [a mixture containing Exemplified Compounds I-2, I-3 and I-4: a mixture in which the ratio of the pyridine ring to the benzene ring among A, B, C and D in the general formula (I) is 1.5:2.5 on the average, E is ethylene, X is a 2,5-disulfoanilino group, Y is an amino group, l is 0, m is 1.7, and n is 0.8]:

The wet cake (59.3 parts) of the mixture of copper benzo(2,3-pyrido)porphyrazine sulfonyl chlorides obtained in the step (2) was added into ice water (350 parts) and suspended under stirring. A solution of Compound (1) (purity: 59.3%, 20.5 parts) obtained upon the synthesis of Compound 1-1 dissolved in aqueous ammonia (3.0 parts) and warm water (100 parts) was then added to the suspension. The pH of the reaction liquid was kept at 9.0 to 9.3 by adding 28% aqueous ammonia thereto, and the temperature of the reaction liquid was controlled to 17 to 20° C. to conduct a reaction for 4 hours. Thereafter, the reaction liquid was heated to 60° C. The amount of the reaction liquid at this time was 560 parts. Sodium chloride (112 parts, 20% to the amount of the reaction liquid) was added to this reaction liquid, and 35% hydrochloric acid was added to adjust the pH of the reaction liquid to 1.0, thereby depositing crystals. The crystals deposited were separated by filtration and washed with a 20% aqueous solution (100 parts) of sodium chloride to obtain a wet cake (73.6 parts). After the resultant wet cake was dissolved in water again, and the pH of the resultant solution was adjusted to 9.0, the whole amount was controlled to 360 parts, and the temperature of the solution was raised to 60° C. The amount of the solution at this time was 380 parts. Sodium chloride (76 parts, 20% to the amount of the solution) was added to the solution, and 35% hydrochloric acid was added to adjust the pH of the solution to 1.0, thereby depositing crystals. The crystals deposited were separated by filtration and washed with a 20% aqueous solution (100 parts) of sodium chloride to obtain a wet cake (48.4 parts). After the resultant wet cake (48.4 parts) was added into methanol (250 parts) and the resultant mixture was stirred for 1 hour at 60° C. to suspend the wet cake, filtration, washing with methanol (200 parts) and drying were conducted to obtain blue crystals (10.7 parts). The blue crystals were analyzed. As a result, the maximum absorption wavelength ($\lambda_{max}$) was 606 nm (in an aqueous solution). The resultant blue crystals were subjected to ion exchange according to a method known per se in the art to obtain Compound 1-7 of a sodium salt type.

[Compound 2]

The sodium salt of Exemplified Compound I-25 synthesized referring to Japanese Patent Application Laid-Open No. 2006-45535 was used as Compound 2.

Comparative Example 1

The following cyan dye synthesized referring to Japanese Patent No. 3851569 was used as Comparative Compound 1 that is a comparative compound of the first coloring material.

Comparative compound 1

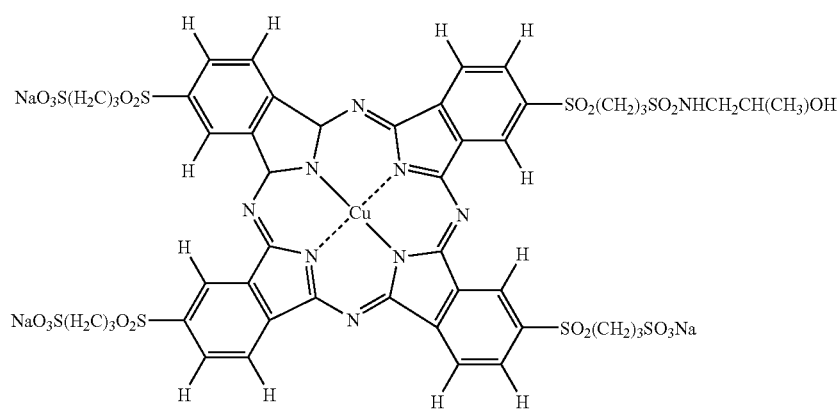

Compound 3 that is the second coloring material used in Examples was synthesized in the following manner.

[Compound 3]

Compound 3 (potassium salt of Exemplified Compound II-5) was synthesized according to the following synthesis flow and procedure. Each flow is described in detail.

resultant mixture was stirred for 1 hour to prepare a solution. The resultant solution was added dropwise to a mixed liquid (8° C.) of hydrazine monohydrate (52.8 mL) and ion-exchanged water (47 mL) in such a manner that the internal temperature does not exceed 10° C. Thereafter, the internal temperature was raised to 50° C., and the mixture was stirred

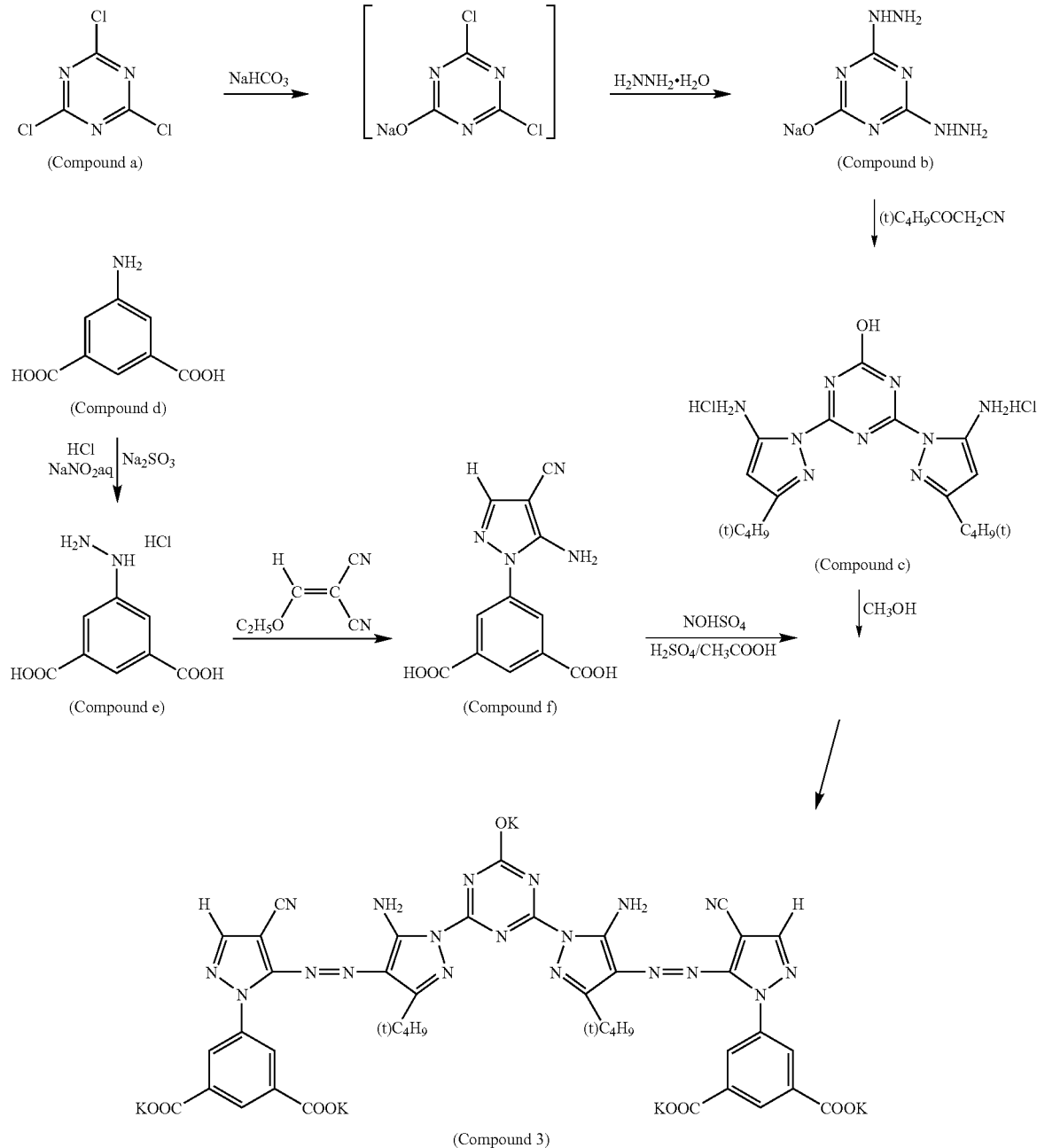

(1) Synthesis of Compound b:

Sodium hydrogencarbonate (25.5 g) and ion-exchanged water (150 mL) were mixed and heated to 40° C., cyanuric chloride (product of Tokyo Kasei; Compound a, 25.0 g) was added to this mixture by successively adding five equally divided portions thereof at intervals of 10 minutes, and the for 30 minutes. Crystals deposited were separated by filtration to obtain Compound b (hydrazine derivative, melting point: >300° C., 23.4 g). The yield was 94.7%.

(2) Synthesis of Compound c:

Compound b (hydrazine derivative, 35.0 g) obtained above was suspended in ethylene glycol (420 mL), the internal temperature was raised to 50° C., and the suspension was stirred. Concentrated hydrochloric acid (59 mL) was added to this suspension, pivaloylacetonitrile (product of Tokyo Kasei, 60.1 g) was then added, and the resultant mixture was stirred for 10 hours at 50° C. Concentrated hydrochloric acid (95 mL) and methanol (145 mL) were added thereto, and the mixture was additionally stirred for 8 hours. After the mixture was cooled to room temperature, crystals deposited were separated by filtration to obtain Compound c (5-aminopyrazole derivative, melting point: 233 to 235° C., 81.6 g). The yield was 94.2%.

(3) Synthesis of Compound e:

Compound d (product of Tokyo Kasei, 90.57 g) was suspended in water (500 mL), concentrated hydrochloric acid (130 mL) was added to this suspension, and the mixture was stirred until the internal temperature after the addition reached 5° C. or less. An aqueous solution (70 mL) containing sodium nitrite (36.23 g) was added dropwise in an internal temperature range of from 4 to 6° C., and the resultant mixture was stirred for 30 minutes at an internal temperature of 5° C. or less. Sodium sulfite (159 g) and water (636 mL) were then added while keeping the internal temperature at 20° C. or less, the internal temperature was raised to 25° C., concentrated hydrochloric acid (250 mL) was added, and the resultant mixture was stirred for 1 hour at an internal temperature of 90° C. After the internal temperature was lowered to room temperature, filtration was conducted, and the resultant residue was washed with water (200 mL) and air-dried to obtain Compound e (80.0 g).

(4) Synthesis of Compound f:

Compound e (23.3 g) obtained above was suspended in ethanol (209 mL), and triethylamine (28 mL) was added dropwise to this suspension. Ethoxymethylene-malononitrile (product of ALDRICH, 12.2 g) was then added to this mixture in several divided portions. After refluxing was conducted for 3 hours, the reaction mixture was cooled to room temperature and filtered, and the product was washed with isopropyl alcohol (400 mL) and then dried to obtain Compound f (23.57 g).

(5) Synthesis of Compound 3:

Acetic acid (145.56 mL) was added to sulfuric acid (32.4 mL) at an internal temperature of 4° C. or less, and 40% by mass nitrosylsulfuric acid (product of ALDRICH, 15.9 mL) was added dropwise at an internal temperature of 7° C. or less under stirring. Compound f (32.4 g) obtained above was added to this mixture in several divided portions, and the resultant mixture was stirred for 60 minutes at an internal temperature of 10° C. Thereafter, a diazonium salt of Compound f was added dropwise into a liquid suspension in which Compound c (18.8 g) to which urea (1.83 g) had been added was suspended in methanol (470 mL) at an internal temperature of 0° C. or less, and the resultant mixture was stirred for 30 minutes at an internal temperature of 0° C. or less. Thereafter, the internal temperature of the reaction liquid was raised to room temperature, the reaction liquid is then filtered and washed with methanol and then with water to obtain crude crystals. After the resultant crude crystals were suspended in methanol (400 mL), and the suspension was stirred for 60 minutes under reflux, the suspension was cooled to room temperature, filtered and washed with methanol, water and methanol in that order, and then dried overnight at 75° C. to obtain free acid type crystals (34.4 g) of Compound 3. The resultant crystals were dissolved in water to prepare a 10% by mass aqueous solution (25° C.; pH: about 8.3, adjusted with KOH), and isopropanol was then added at an internal temperature of 50° C. to conduct crystallization, the reaction mixture was then cooled, and the resultant crystals were separated by filtration, washed with isopropanol and dried. In such a manner, Compound 3 (potassium salt of Exemplified Compound II-5, 35.0 g) was obtained.

[Comparative Compound 2]

Comparative Compound 2 was used as a comparative compound of the second coloring material. Comparative Compound 2 is a commercially available yellow dye (Y104; product of ILFORD IMAGING) having the following structure.

Comparative compound 2

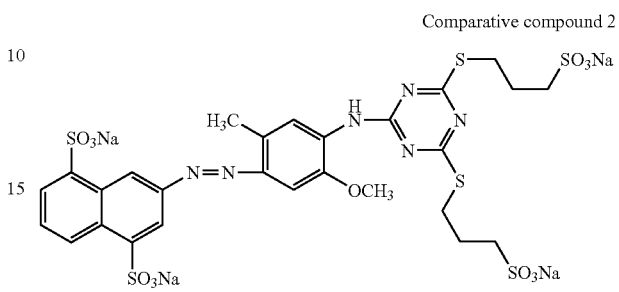

Compound 4 that is the third coloring material used in Examples was synthesized according to the following procedures (A) to (G). Compound 4 was obtained as the sodium salt of Exemplified Compound III-1. Compounds 5 and 6 that are the third coloring material used in Examples were synthesized by methods described below. Compound 5w as synthesized as the sodium salt of Exemplified Compound IV-1 and Compound 6 was synthesized as the lithium salt of Exemplified Compound V-2, respectively. Comparative Compounds 3 and 4 that are magenta dyes used in Comparative Examples were synthesized by methods described below.

[Compound 4]

(A) A compound (94.8 parts) of the following formula (I), sodium carbonate (3.0 parts) and benzoyl ethyl acetate (144.0 parts) were successively added to xylene (360 parts) under stirring, and the temperature of the liquid was raised to 140 to 150° C. to conduct a reaction for 8 hours, during which ethanol and water, which were formed by the reaction, were distilled out of the system while being azeotropically distilled together with xylene, thereby completing the reaction. The reaction liquid was cooled to 30° C., methanol (240 parts) was added, and the resultant mixture was stirred for 30 minutes. Thereafter, solids deposited were separated by filtration. The resultant solids were washed with methanol (360 parts) and the dried to obtain a compound (124.8 parts) of the following formula (2) as light yellow needlelike crystals.

Formula (1)

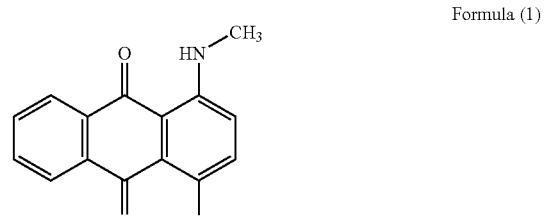

Formula (2)

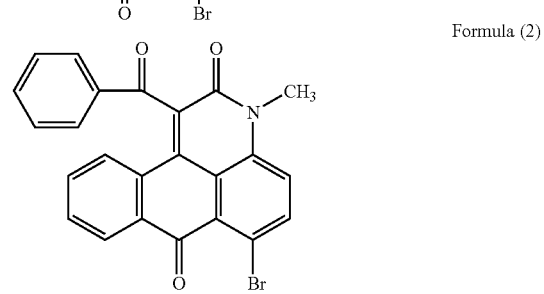

(B) The compound (88.8 parts) of the formula (2) obtained above, metaaminoacetonitride (75.0 parts), copper acetate monohydrate (24.0 parts) and sodium carbonate (12.8 parts) were successively added into N,N-dimethylformamide (300.0 parts). The temperature of the liquid was raised to 120 to 130° C. to conduct a reaction for 3 hours. The reaction liquid was cooled to about 50° C., methanol (120 part) was added, and the resultant mixture was stirred for 30 minutes. Thereafter, solids deposited were separated by filtration. The resultant solids were washed with methanol (500 parts) and then with warm water of 80° C., and then dried to obtain a compound (79.2 parts) of the following formula (3) as bluish red crystals.

Formula (3)

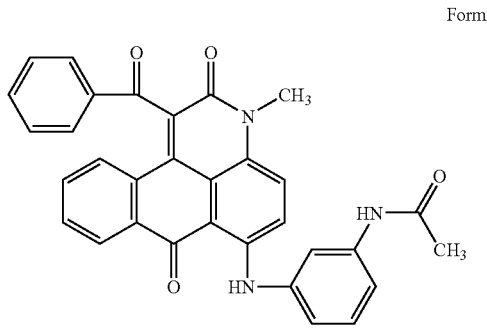

(C) 28% Fumed sulfuric acid (170 parts) was added to 98% sulfuric acid (130 parts) under stirring while cooling with water to prepare 12% fumed sulfuric acid (300 parts). After the compound (51.3 parts) of the formula (3) obtained above was added at a temperature 50° C. or less while cooling with water, the temperature of the liquid was raised to 85 to 90° C. to conduct a reaction for 4 hours. The reaction liquid was added into ice water (600 parts), during which rise of liquid temperature was prevented by adding ice, thereby keeping the liquid temperature at 40° C. or less. Water was additionally added to increase the quantity of the reaction liquid to 1,000 parts, and the insoluble matter was then removed by filtration. Warm water was added to the resultant mother liquor to 1,500 parts, sodium chloride (300 parts) was added while keeping the liquid temperature at 60 to 65° C., the resultant mixture was stirred for 2 hours, and crystals deposited were separated by filtration. The resultant crystals were washed with a 20% aqueous solution (300 parts) of sodium chloride, and water was fully removed to obtain a wet cake (100.3 parts) containing a compound (59.2 parts) as red crystals.

Formula (4)

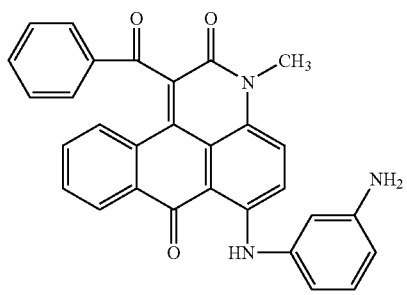

(D) The wet cake (67.7 parts) of the compound of the formula (4) obtained above was added into water (60 parts). A 25% aqueous solution (24 parts) of sodium hydroxide was added to this mixture, and the mixture was stirred to prepare a solution while adjusting the pH of the liquid to 3 to 4 by further adding a 25% aqueous solution of sodium hydroxide. On the other hand, LIPAL OH (trade name, anionic surfactant; product of Lion Corporation, 0.4 parts) was added to ice water (60 parts), to which cyanuric chloride (8.9 parts) was added, and the mixture was stirred for 30 minutes to obtain a suspension. The resultant suspension was added into the solution containing the compound of the formula (4) obtained above. A reaction was conducted for 4 hours at a temperature of 25 to 30° C. while keeping the pH of the liquid at 2.7 to 3.0 with a 10% aqueous solution of sodium hydroxide, thereby obtaining a reaction mixture containing a compound of the following formula (5).

Formula (5)

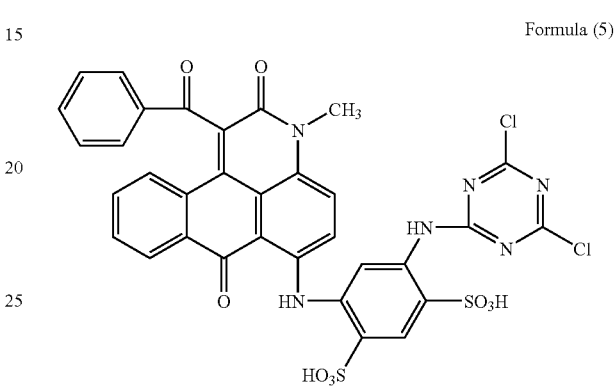

(E) Sodium p-phenolsulfonate dihydrate (9.5 parts) was added into the reaction liquid containing the compound of the formula (5) obtained above. The temperature of the liquid was then raised to 50 to 55° C. while keeping the pH of the liquid at 6.5±0.3 by adding a 25% aqueous solution of sodium hydroxide to this liquid, and a reaction was conducted for 1 hour at the same temperature, thereby obtaining a reaction mixture containing a compound of the following formula (6).

Formula (6)

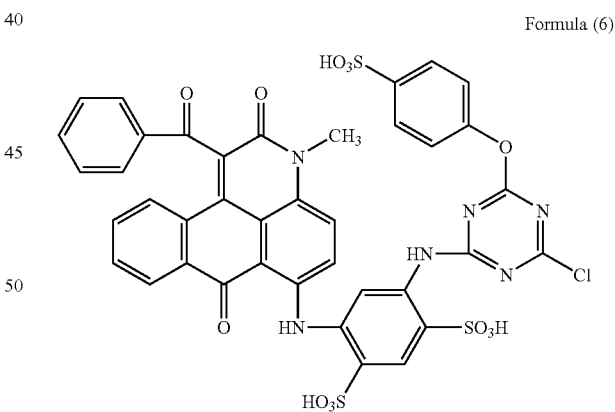

(F) Ethylenediamine (1.2 parts) was added into the reaction mixture containing the compound of the formula (6) obtained above. The temperature of the liquid was then raised to 78 to 82° C. while keeping the pH of the liquid at 7.8 to 8.2 by adding a 25% aqueous solution of sodium hydroxide to this liquid, and a reaction was conducted for 1 hour at the same temperature. After water was then added to increase the quantity of the liquid to about 360 parts, filtration was conducted to remove the insoluble matter. After water was added to the resultant mother liquor, and the quantity of the liquid was increased to 400 parts, concentrated hydrochloric acid was added while keeping the temperature of the liquid at 55±2° C., thereby adjusting the pH of the liquid to 3. Sodium chloride (40 parts) was added to this liquid over 15 minutes, the resultant mixture was stirred, and concentrated hydrochloric acid was additionally added to adjust the pH of the liquid to 2. The resultant acidic aqueous solution was stirred for 1 hour, crystals deposited were separated by filtration, and the resultant crystals were washed with a 20% aqueous solution (100 parts) of sodium chloride, thereby obtaining a red wet cake.

(G) The wet cake obtained above was added into methanol (500 parts), the temperature of the liquid was raised to 60 to 65° C., and the liquid was stirred for 1 hour. Crystals deposited were separated by filtration, washed with methanol and then dried, thereby obtaining Compound 4 of a free acid type. The Compound 4 of the free acid type was subjected to ion exchange according to a method known per se in the art to obtain Compound 4 (sodium salt of Exemplified Compound III-1).

[Compound 5]

The sodium salt of Exemplified Compound IV-1 synthesized referring to the description of Example 4 in International Publication No. 2004/104108 Pamphlet was used as Compound 5.

[Compound 6]

The lithium salt of Exemplified Compound V-2 synthesized referring to the description of Compound d-5 in Japanese Patent Application Laid-Open No. 2006-143989 was used as Compound 6.

[Comparative Compound 3]

The following magenta dye synthesized referring to Japanese Patent Application Laid-Open No. 2002-080765 was used as Comparative Compound 3 that is a comparative compound of the third coloring material.

Comparative compound 3

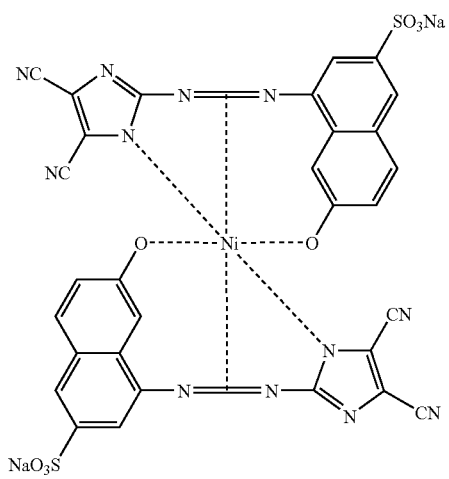

[Comparative Compound 4]

The following magenta dye synthesized referring to Japanese Patent Application Laid-Open No. H8-073791 was used as Comparative Compound 4 that is a comparative compound of the third coloring material.

Comparative compound 4

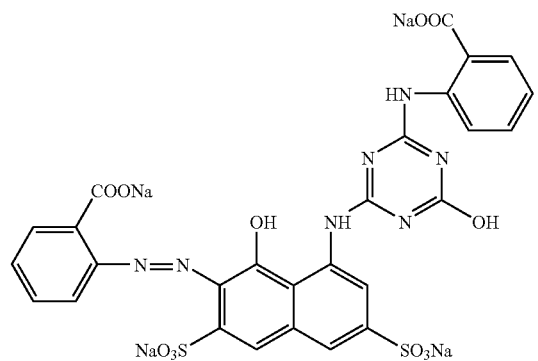

Compound 7 and Compound 8 that are the fourth coloring material used in Examples were synthesized by methods described below. Compound 7 is the sodium salt of Exemplified Compound VI-1, and Compound 8 is the sodium salt of Exemplified Compound VII-5. Comparative Compound 5 that is a black dye used in Comparative Example was synthesized by a method described below.

[Compound 7]

The sodium salt of Exemplified Compound VI-1 synthesized referring to the description of Example 1 in International Publication No. 2006/001274 Pamphlet was used as Compound 7.

[Compound 8]

The lithium salt of Exemplified Compound VII-5 synthesized referring to Japanese Patent Application Laid-Open No. 2005-139427 was used as Compound 8.

[Comparative Compound 5]

The following black dye synthesized referring to U.S. Pat. No. 6,302,949 was used as Comparative Compound 5 that is a comparative compound of the fourth coloring material.

Comparative compound 5

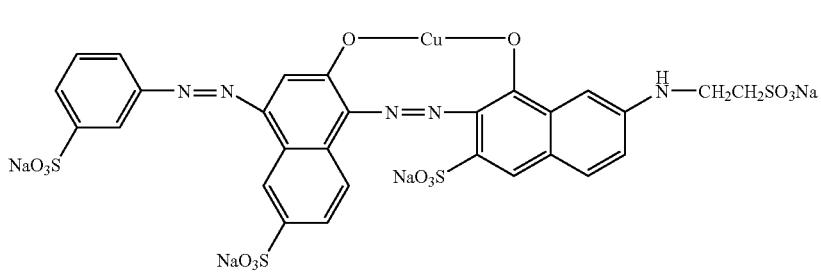

<Evaluation of Combination of Cyan Dye and Yellow Dye>

The combination of coloring materials was variously changed to prepare inks of Examples 1 to 15 and Comparative Examples 1 to 5 in the following manner. Compounds 1-1 to 1-7 and Compound 2 synthesized above were used as the first coloring material for Examples, and Comparative Compound 1 synthesized above and C.I. Direct Blue 199 were used for comparison thereof. Compound 3 synthesized above, and C.I. Direct Yellow 132 and C.I. Direct Yellow 86 were used as the second coloring material for Examples and Comparative Examples, respectively. First, the components shown in the following Table 5 were mixed and sufficiently stirred. The resultant respective mixtures were then filtered under pressure through a filter having a pore size of 0.2 μm to prepare inks of Examples and Comparative Examples. The cyan dyes of each Compound 1-1 to 1-7 and Compound 2 correspond to the first coloring material, and the yellow dye of Compound 3 corresponds to the second coloring material.

TABLE 5

Compositions of Inks (Unit: % by mass)

| | | Example | | | | | | |
|---|---|---|---|---|---|---|---|---|
| | | 1 | 2 | 3 | 4 | 5 | 6 | 7 |
| Cyan dye | Compound 1-1 | | 1.20 | 1.79 | 1.80 | 2.20 | | |
| | Compound 1-2 | | | | | | 2.20 | |
| | Compound 1-3 | | | | | | | 2.20 |
| | Compound 1-4 | | | | | | | |
| | Compound 1-5 | | | | | | | |
| | Compound 1-6 | | | | | | | |
| | Compound 1-7 | | | | | | | |
| | Compound 2 | 1.20 | | | | | | |
| | Comparative Compound 1 | | | | | | | |
| | C.I. Direct Blue 199 | | | | | | | |
| Yellow dye | Compound 3 | 2.40 | 2.40 | 1.81 | 1.80 | 1.40 | 1.40 | 1.40 |
| | C.I. Direct Yellow 132 | | | | | | | |
| | C.I. Direct Yellow 86 | | | | | | | |
| Ethylene glycol | | 9.00 | 9.00 | 9.00 | 9.00 | 9.00 | 9.00 | 9.00 |
| Diethylene glycol | | 9.00 | 9.00 | 9.00 | 9.00 | 9.00 | 9.00 | 9.00 |
| Acetylenol E100 (*1) | | 1.00 | 1.00 | 1.00 | 1.00 | 1.00 | 1.00 | 1.00 |
| Ion-exchanged water | | 77.40 | 77.40 | 77.40 | 77.40 | 77.40 | 77.40 | 77.40 |
| First coloring material/second coloring material (*2) | | 0.50 | 0.50 | 0.99 | 1.00 | 1.57 | 1.57 | 1.57 |

| | | Example | | | | | | | |
|---|---|---|---|---|---|---|---|---|---|
| | | 8 | 9 | 10 | 11 | 12 | 13 | 14 | 15 |
| Cyan dye | Compound 1-1 | | | | | 3.00 | 3.20 | 3.21 | 3.30 |
| | Compound 1-2 | | | | | | | | |
| | Compound 1-3 | | | | | | | | |
| | Compound 1-4 | 2.20 | | | | | | | |
| | Compound 1-5 | | 2.20 | | | | | | |
| | Compound 1-6 | | | 2.20 | | | | | |
| | Compound 1-7 | | | | 2.20 | | | | |
| | Compound 2 | | | | | | | | |
| | Comparative Compound 1 | | | | | | | | |
| | C.I. Direct Blue 199 | | | | | | | | |
| Yellow dye | Compound 3 | 1.40 | 1.40 | 1.40 | 1.40 | 0.60 | 0.40 | 0.39 | 0.30 |
| | C.I. Direct Yellow 132 | | | | | | | | |
| | C.I. Direct Yellow 86 | | | | | | | | |
| Ethylene glycol | | 9.00 | 9.00 | 9.00 | 9.00 | 9.00 | 9.00 | 9.00 | 9.00 |
| Diethylene glycol | | 9.00 | 9.00 | 9.00 | 9.00 | 9.00 | 9.00 | 9.00 | 9.00 |
| Acetylenol E100 (*1) | | 1.00 | 1.00 | 1.00 | 1.00 | 1.00 | 1.00 | 1.00 | 1.00 |
| Ion-exchanged water | | 77.40 | 77.40 | 77.40 | 77.40 | 77.40 | 77.40 | 77.40 | 77.40 |
| First coloring material/second coloring material (*2) | | 1.57 | 1.57 | 1.57 | 1.57 | 5.00 | 8.00 | 8.23 | 11.00 |

TABLE 5-continued

Compositions of Inks (Unit: % by mass)

| | | Comparative Example | | | | |
|---|---|---|---|---|---|---|
| | | 1 | 2 | 3 | 4 | 5 |
| Cyan dye | Compound 1-1 | 1.20 | 1.20 | | | |
| | Compound 1-2 | | | | | |
| | Compound 1-3 | | | | | |
| | Compound 1-4 | | | | | |
| | Compound 1-5 | | | | | |
| | Compound 1-6 | | | | | |
| | Compound 1-7 | | | | | |
| | Compound 2 | | | | | |
| | Comparative Compound 1 | | | | 1.20 | 1.20 |
| | C.I. Direct Blue 199 | | | 1.20 | | |
| Yellow dye | Compound 3 | | | 2.40 | 2.40 | |
| | C.I. Direct Yellow 132 | 2.40 | | | | |
| | C.I. Direct Yellow 86 | | 2.40 | | | 2.40 |
| Ethylene glycol | | 9.00 | 9.00 | 9.00 | 9.00 | 9.00 |
| Diethylene glycol | | 9.00 | 9.00 | 9.00 | 9.00 | 9.00 |
| Acetylenol E100 (*1) | | 1.00 | 1.00 | 1.00 | 1.00 | 1.00 |
| Ion-exchanged water | | 77.40 | 77.40 | 77.40 | 77.40 | 77.40 |
| First coloring material/second coloring material (*2) | | — | — | 0.00 | 0.00 | — |

(*1) Acetylene glycol ethylene oxide adduct (surfactant; Product of Kawaken Fine Chemicals Co., Ltd.)
(*2) Content of first coloring material/content of second coloring material.

[Evaluation]

Each of the inks obtained above was charged into an ink jet recording apparatus (trade name: PIXUS iP8600; manufactured by Canon Inc.) utilizing thermal energy. Recording conditions were set to 23° C. in temperature, 55% in relative humidity, 2,400 dpi×1,200 dpi in recording density and 2.5 µL in ejection quantity. Images were respectively formed on a recording medium (Professional Photo Paper PR-101; product of Canon Inc.) with the recording duty changed at intervals of 10% from 0% to 100%.

With respect to an image portion in which the recording duty was 50% in the recorded article obtained above, lightness (L) and color tone (a and b) in the L*a*b* color space prescribed by CIE (International Commission on Illumination) were measured (referred to as "Lab value before ozone fastness test"). This recorded article was exposed to ozone for 2 cycles (1 cycle: exposure for 16 hours) under conditions of 2.5 ppm in ozone gas concentration, 50% in relative humidity and 23° C. in vessel temperature by means of an ozone exposure tester (trade name: OMS-H; manufactured by SUGA TEST INSTRUMENTS CO., LTD.). Thereafter, with respect to the image portion in which the recording duty was 50% in the recorded article, lightness (L) and color tone (a and b) were measured in the same manner as described above (referred to as "Lab value after ozone fastness test"). Incidentally, the lightness (L) and color tone (a and b) were measured by means of a spectrophotometer (trade name: Spectrolino; manufactured by Gretag Macbeth) under conditions of a light source: D50 and an angle of field: 2°. A color difference (ΔE) was calculated out from the Lab values before the ozone fastness test and the Lab values after the ozone fastness test according to the following equation (A) to make evaluation as to ozone fastness. The evaluation standard of the ozone fastness is as follows. The evaluation results are shown in Table 6.

Incidentally, the ratio between the contents of the first coloring material and the second coloring material is shown collectively in Table 6.

In the following evaluation standard, AA, A and B are levels of causing no problem as ozone fastness, A is an excellent level, AA is a particularly excellent level, and C is a level unallowable as ozone fastness.

$$\Delta E = \sqrt{(L_1-L_2)^2+(a_1-a_2)^2+(b_1-b_2)^2} \quad \text{Formula (A)}$$

$L_1$, $a_1$, $b_1$: Lab value before ozone fastness test
$L_2$, $a_2$, $b_2$: Lab value after ozone fastness test
AA: ΔE is less than 5;
A: ΔE is from 5 or more to less than 7;
B: ΔE is from 7 or more to less than 10;
C: ΔE is 10 or more.

TABLE 6

| | Evaluation results | |
|---|---|---|
| | Ozone fastness | First coloring material/ second coloring material |
| Example 1 | B | 0.50 |
| Example 2 | A | 0.50 |
| Example 3 | A | 0.99 |
| Example 4 | AA | 1.00 |
| Example 5 | AA | 1.57 |
| Example 6 | AA | 1.57 |
| Example 7 | AA | 1.57 |
| Example 8 | AA | 1.57 |
| Example 9 | AA | 1.57 |
| Example 10 | AA | 1.57 |
| Example 11 | AA | 1.57 |
| Example 12 | AA | 5.00 |
| Example 13 | AA | 8.00 |
| Example 14 | A | 8.23 |
| Example 15 | A | 11.00 |

TABLE 6-continued

| | Evaluation results | |
|---|---|---|
| | Ozone fastness | First coloring material/ second coloring material |
| Comparative Example 1 | C | — |
| Comparative Example 2 | C | — |
| Comparative Example 3 | C | 0.00 |
| Comparative Example 4 | C | 0.00 |
| Comparative Example 5 | C | — |

[d Value]

With respect to the respective inks of Examples 1 and 2, and Comparative Example 4 obtained above, and Compound 1-1, Compound 2 and Comparative Compound 1, scattering angle profiles were measured by a small angle X-ray scattering method. Incidentally, the measurement as to each ink was conducted by preparing a model ink with the water-soluble organic solvent and surfactant in each ink composition replaced by water, and hence the measurement was conducted as to an aqueous dye solution containing a combination of a cyan dye and a yellow dye in an actual ink composition. The measurement as to each dye was conducted by preparing an aqueous dye solution so as to give a dye concentration of 3.5% by mass.

Measuring conditions of the scattering angle profile are as follows:

Apparatus: Nano Viewer (manufactured by Rigaku Co.)
X-ray source: Cu-Kα
Output: 45 kV-60 mA
Effective focal point: 0.3 mm φ+Confocal Max-Flux Mirror
First slit: 0.5 mm, second slit: 0.4 mm, third slit: 0.8 mm
Irradiation time: 240 minutes
Beam stopper: 3.0 mm φ
Measuring method: transmission method
Detector: Blue Imaging Plate.

From the resultant scattering angle profile, a d value (nm) was calculated out from a 2θ value of a scattering angle peak top using an X-ray diffraction processing software JADE (product of Material Data Inc.). Incidentally, the d value is an index of the aggregation property or dispersion property of a coloring material.

$$d = \frac{\lambda}{2\sin\theta} \quad \text{Formula (A)}$$

wherein λ is a wavelength of an X-ray, d is an interparticle distance, and θ is a scattering angle.

The d value thus obtained is as follows:

| | |
|---|---|
| Ink of Example 1: | 5.89 nm |
| Ink of Example 2: | 5.68 nm |
| Ink of Comparative Example 4: | 6.09 nm |
| Compound 1-1: | 6.77 nm |
| Compound 2: | 6.98 nm |
| Comparative Compound 1: | 6.84 nm. |

<Evaluation of Gray Ink>

(Preparation of inks of Examples 16 to 46 and Comparative Examples 6 to 12)

Compounds 1-1 to 1-17, Compounds 2 to 8 and Comparative Compounds 1 to 5 obtained by the above-described respective syntheses, and C.I. Direct Yellow 86 were used to prepare respective inks of Examples and Comparative Examples in the following manner. First, the components shown in Table 7 were mixed and sufficiently stirred. The resultant respective mixtures were then filtered under pressure through a filter having a pore size of 0.2 μm to prepare the respective inks.

In the following Table 7-1 to 7-6, (*1) to (*4) indicates "note", and the details thereof are as follows. Incidentally, "Bal" in Table 7-1 to 7-6 means that adjustment was conducted with ion-exchanged water in such a manner that the whole composition of each ink amounts to 100%. Specifically, the remainder obtained by subtracting the values of respective ink components from 100 becomes the amount of water.

(*1) Acetylene glycol ethylene oxide adduct (surfactant; Product of Kawaken Fine Chemicals Co., Ltd.)
(*2) Content of first coloring material/content of second coloring material
(*3) (Content of first coloring material+content of second coloring material)/content of third coloring material
(*4) (Content of first coloring material+content of second coloring material+content of third coloring material added as needed)/content of fourth coloring material.

Incidentally, when the respective coloring materials defined in the present invention were used in Comparative Examples, the contents of the corresponding coloring materials were calculated and indicated. The cyan dyes of each Compound 1-1 to 1-7 and compound 2 correspond to the first coloring material, the yellow dye of compound 3 corresponds to the second coloring material, the magenta dye of the Compound 4 to 6 correspond to the third coloring material, and the black dye of the Compound 7 and 8 correspond to the fourth coloring material.

TABLE 7-1

Compositions of Inks (Unit: % by mass)

| | Example | | | | | | | |
|---|---|---|---|---|---|---|---|---|
| | 16 | 17 | 18 | 19 | 20 | 21 | 22 | 23 |
| Cyan | | | | | | | | |
| Compound 1-1 | 1.40 | 1.40 | 1.40 | 1.40 | 1.40 | 1.40 | 1.40 | |
| Compound 1-2 | | | | | | | | |
| Compound 1-3 | | | | | | | | |
| Compound 1-4 | | | | | | | | |
| Compound 1-5 | | | | | | | | |
| Compound 1-6 | | | | | | | | |
| Compound 1-7 | | | | | | | | |
| Compound 2 | | | | | | | | 1.40 |
| Comparative Compound 1 | | | | | | | | |
| Yellow | | | | | | | | |
| Compound 3 | 0.85 | 0.85 | 0.85 | 0.85 | 0.85 | 0.85 | 0.85 | 0.85 |
| Comparative Compound 2 | | | | | | | | |
| C.I. Direct Yellow 86 | | | | | | | | |
| Magenta | | | | | | | | |
| Compound 4 | | 1.00 | 2.25 | 0.75 | 2.50 | 0.73 | | |
| Compound 5 | | | | | | | 1.00 | 1.00 |
| Compound 6 | 1.00 | | | | | | | |

TABLE 7-1-continued

Compositions of Inks (Unit: % by mass)

| | Example | | | | | | | |
|---|---|---|---|---|---|---|---|---|
| | 16 | 17 | 18 | 19 | 20 | 21 | 22 | 23 |
| Comparative Compound 3 | | | | | | | | |
| Comparative Compound 4 | | | | | | | | |
| Black | | | | | | | | |
| Compound 7 | | | | | | | | |
| Compound 8 | | | | | | | | |
| Comparative Compound 5 | | | | | | | | |
| Ethylene glycol | 9.00 | 9.00 | 9.00 | 9.00 | 9.00 | 9.00 | 9.00 | 9.00 |
| Diethylene glycol | 9.00 | 9.00 | 9.00 | 9.00 | 9.00 | 9.00 | 9.00 | 9.00 |
| Acetylenol E100 (*1) | 1.00 | 1.00 | 1.00 | 1.00 | 1.00 | 1.00 | 1.00 | 1.00 |
| Ion-exchanged water | Bal | Bal | Bal | Bal | Bal | Bal | Bal | Bal |
| First/second (*2) | 1.65 | 1.65 | 1.65 | 1.65 | 1.65 | 1.65 | 1.65 | 1.65 |
| (First + second)/third (*3) | 2.25 | 2.25 | 1.00 | 3.00 | 0.90 | 3.08 | 2.25 | 2.25 |
| (First + second + third)/fourth (*4) | — | — | — | — | — | — | — | — |

TABLE 7-2

Compositions of Inks (Unit: % by mass)

| | Example | | | | | | |
|---|---|---|---|---|---|---|---|
| | 24 | 25 | 26 | 27 | 28 | 29 | 30 |
| Cyan | | | | | | | |
| Compound 1-1 | 1.40 | 1.40 | 1.40 | 1.40 | 1.40 | 1.40 | |
| Compound 1-2 | | | | | | | |
| Compound 1-3 | | | | | | | |
| Compound 1-4 | | | | | | | |
| Compound 1-5 | | | | | | | |
| Compound 1-6 | | | | | | | |
| Compound 1-7 | | | | | | | |
| Compound 2 | | | | | | | 1.40 |
| Comparative Compound 1 | | | | | | | |
| Yellow | | | | | | | |
| Compound 3 | 0.85 | 0.85 | 0.85 | 0.85 | 0.85 | 0.85 | 0.85 |
| Comparative Compound 2 | | | | | | | |
| C.I. Direct Yellow 86 | | | | | | | |
| Magenta | | | | | | | |
| Compound 4 | | | | | | | |
| Compound 5 | | | | | | | |
| Compound 6 | | 1.00 | 1.00 | 1.00 | 1.00 | 1.00 | 1.00 |
| Comparative Compound 3 | | | | | | | |
| Comparative Compound 4 | 1.00 | | | | | | |
| Black | | | | | | | |
| Compound 7 | | 0.10 | 0.65 | 0.073 | 0.66 | 0.072 | 0.10 |
| Compound 8 | | | | | | | |
| Comparative Compound 5 | | | | | | | |
| Ethylene glycol | 9.00 | 9.00 | 9.00 | 9.00 | 9.00 | 9.00 | 9.00 |

TABLE 7-2-continued

Compositions of Inks (Unit: % by mass)

| | Example | | | | | | |
|---|---|---|---|---|---|---|---|
| | 24 | 25 | 26 | 27 | 28 | 29 | 30 |
| Diethylene glycol | 9.00 | 9.00 | 9.00 | 9.00 | 9.00 | 9.00 | 9.00 |
| Acetylenol E100 (*1) | 1.00 | 1.00 | 1.00 | 1.00 | 1.00 | 1.00 | 1.00 |
| Ion-exchanged water | Bal | Bal | Bal | Bal | Bal | Bal | Bal |
| First/second (*2) | 1.65 | 1.65 | 1.65 | 1.65 | 1.65 | 1.65 | 1.65 |
| (First + second)/third (*3) | — | 2.25 | 2.25 | 2.25 | 2.25 | 2.25 | 2.25 |
| (First + second + third)/fourth (*4) | — | 32.50 | 5.00 | 44.52 | 4.92 | 45.14 | 32.50 |

TABLE 7-3

Compositions of Inks (Unit: % by mass)

| | Example | | | | | |
|---|---|---|---|---|---|---|
| | 31 | 32 | 33 | 34 | 35 | 36 |
| Cyan | | | | | | |
| Compound 1-1 | 1.40 | 1.40 | 1.40 | 1.40 | 1.40 | |
| Compound 1-2 | | | | | | |
| Compound 1-3 | | | | | | |
| Compound 1-4 | | | | | | |
| Compound 1-5 | | | | | | |
| Compound 1-6 | | | | | | |
| Compound 1-7 | | | | | | |
| Compound 2 | | | | | | 1.40 |
| Comparative Compound 1 | | | | | | |
| Yellow | | | | | | |
| Compound 3 | 0.85 | 0.85 | 0.85 | 0.85 | 0.85 | 0.85 |
| Comparative Compound 2 | | | | | | |
| C.I. Direct Yellow 86 | | | | | | |
| Magenta | | | | | | |
| Compound 4 | | | | | | |
| Compound 5 | | | | | | |
| Compound 6 | 1.00 | 1.00 | 1.00 | 1.00 | 1.00 | 1.00 |
| Comparative Compound 3 | | | | | | |
| Comparative Compound 4 | | | | | | |
| Black | | | | | | |
| Compound 7 | 0.10 | 0.65 | 0.073 | 0.66 | 0.072 | 0.10 |
| Compound 8 | | | | | | |
| Comparative Compound 5 | | | | | | |
| Ethylene glycol | 9.00 | 9.00 | 9.00 | 9.00 | 9.00 | 9.00 |
| Diethylene glycol | 9.00 | 9.00 | 9.00 | 9.00 | 9.00 | 9.00 |
| Acetylenol E100 (*1) | 1.00 | 1.00 | 1.00 | 1.00 | 1.00 | 1.00 |
| Ion-exchanged water | Bal | Bal | Bal | Bal | Bal | Bal |
| First/second (*2) | 1.65 | 1.65 | 1.65 | 1.65 | 1.65 | 1.65 |
| (First + second)/third (*3) | 2.25 | 2.25 | 2.25 | 2.25 | 2.25 | 2.25 |
| (First + second + third)/fourth (*4) | 32.50 | 5.00 | 44.52 | 4.92 | 45.14 | 32.50 |

TABLE 7-4

Compositions of Inks (Unit: % by mass)

| | Example 37 | 38 | 39 | 40 | 41 | 42 | 43 |
|---|---|---|---|---|---|---|---|
| Cyan | | | | | | | |
| Compound 1-1 | | | | | | | |
| Compound 1-2 | 1.40 | | | | | | |
| Compound 1-3 | | 1.40 | | | | | |
| Compound 1-4 | | | 1.40 | | | | |
| Compound 1-5 | | | | 1.40 | | | |
| Compound 1-6 | | | | | 1.40 | | |
| Compound 1-7 | | | | | | 1.40 | 1.40 |
| Compound 2 | | | | | | | |
| Comparative Compound 1 | | | | | | | |
| Yellow | | | | | | | |
| Compound 3 | 0.85 | 0.85 | 0.85 | 0.85 | 0.85 | 0.85 | 0.85 |
| Comparative Compound 2 | | | | | | | |
| C.I. Direct Yellow 86 | | | | | | | |
| Magenta | | | | | | | |
| Compound 4 | | | | | | | |
| Compound 5 | | | | | | | |
| Compound 6 | 1.00 | 1.00 | 1.00 | 1.00 | 1.00 | 1.00 | 1.00 |
| Comparative Compound 3 | | | | | | | |
| Comparative Compound 4 | | | | | | | |
| Black | | | | | | | |
| Compound 7 | | | | | | | 0.10 |
| Compound 8 | 0.10 | 0.10 | 0.10 | 0.10 | 0.10 | 0.10 | 0.10 |
| Comparative Compound 5 | | | | | | | |
| Ethylene glycol | 9.00 | 9.00 | 9.00 | 9.00 | 9.00 | 9.00 | 9.00 |
| Diethylene glycol | 9.00 | 9.00 | 9.00 | 9.00 | 9.00 | 9.00 | 9.00 |
| Acetylenol E100 (*1) | 1.00 | 1.00 | 1.00 | 1.00 | 1.00 | 1.00 | 1.00 |
| Ion exchanged water | Bal | Bal | Bal | Bal | Bal | Bal | Bal |
| First/second (*2) | 1.65 | 1.65 | 1.65 | 1.65 | 1.65 | 1.65 | 1.65 |
| (First + second)/third (*3) | 2.25 | 2.25 | 2.25 | 2.25 | 2.25 | 2.25 | 2.25 |
| (First + second + third)/fourth (*4) | 32.50 | 32.50 | 32.50 | 32.50 | 32.50 | 32.50 | 16.25 |

TABLE 7-5

Compositions of Inks (Unit: % by mass)

| | | Example 44 | 45 | 46 |
|---|---|---|---|---|
| Cyan | Compound 1-1 | 1.40 | 1.40 | 1.40 |
| | Compound 1-2 | | | |
| | Compound 1-3 | | | |
| | Compound 1-4 | | | |
| | Compound 1-5 | | | |
| | Compound 1-6 | | | |
| | Compound 1-7 | | | |
| | Compound 2 | | | |
| | Comparative Compound 1 | | | |
| Yellow | Compound 3 | 0.85 | 0.85 | 0.85 |
| | Comparative Compound 2 | | | |
| | C.I. Direct Yellow 86 | | | |
| Magenta | Compound 4 | | | |
| | Compound 5 | | | |
| | Compound 6 | | | 1.00 |
| | Comparative Compound 3 | 1.00 | 1.00 | |
| | Comparative Compound 4 | | | |
| Black | Compound 7 | 0.10 | | |
| | Compound 8 | | 0.10 | |
| | Comparative Compound 5 | | | 0.10 |
| Ethylene glycol | | 9.00 | 9.00 | 9.00 |
| Diethylene glycol | | 9.00 | 9.00 | 9.00 |
| Acetylenol E100 (*1) | | 1.00 | 1.00 | 1.00 |
| Ion-exchanged water | | Bal | Bal | Bal |
| First/second (*2) | | 1.65 | 1.65 | 1.65 |
| (First + second)/third (*3) | | — | — | 2.25 |
| (First + second + third)/fourth (*4) | | 22.5 | 22.5 | — |

TABLE 7-6

Compositions of Inks (Unit: % by mass)

| | | Comparative Example 6 | 7 | 8 | 9 | 10 | 11 | 12 |
|---|---|---|---|---|---|---|---|---|
| Cyan | Compound 1-1 | | 1.40 | | | 1.40 | 1.40 | |
| | Compound 1-2 | | | | | | | |
| | Compound 1-3 | | | | | | | |
| | Compound 1-4 | | | | | | | |
| | Compound 1-5 | | | | | | | |
| | Compound 1-6 | | | | | | | |
| | Compound 1-7 | | | | | | | |
| | Compound 2 | | | | | | | |
| | Comparative Compound 1 | 1.40 | | 1.40 | 1.40 | | | |

TABLE 7-6-continued

Compositions of Inks
(Unit: % by mass)

| | | Comparative Example | | | | | | |
|---|---|---|---|---|---|---|---|---|
| | | 6 | 7 | 8 | 9 | 10 | 11 | 12 |
| Yellow | Compound 3 | 0.85 | | 0.85 | 0.85 | | | |
| | Comparative Compound 2 | | | | | | | 1.80 |
| | C.I. Direct Yellow 86 | | 0.85 | | | 0.85 | 0.85 | |
| Magenta | Compound 4 | | | | | | | |
| | Compound 5 | | | | | | | |
| | Compound 6 | 1.00 | 1.00 | 1.00 | 1.00 | 1.00 | 1.00 | |
| | Comparative Compound 3 | | | | | | | 0.40 |
| | Comparative Compound 4 | | | | | | | |
| Black | Compound 7 | | | 0.10 | | 0.10 | | |
| | Compound 8 | | | | 0.10 | | 0.10 | |
| | Comparative Compound 5 | | | | | | | 4.50 |
| Ethylene glycol | | 9.00 | 9.00 | 9.00 | 9.00 | 9.00 | 9.00 | 9.00 |
| Diethylene glycol | | 9.00 | 9.00 | 9.00 | 9.00 | 9.00 | 9.00 | 9.00 |
| Acetylenol E100 (*1) | | 1.00 | 1.00 | 1.00 | 1.00 | 1.00 | 1.00 | 1.00 |
| Ion-exchanged water | | Bal | Bal | Bal | Bal | Bal | Bal | Bal |
| First/second (*2) | | 0.00 | — | 0.00 | 0.00 | — | — | — |
| (First + second)/third (*3) | | 0.85 | 1.40 | 0.85 | 0.85 | 1.40 | 1.40 | — |
| (First + second + third)/fourth (*4) | | — | — | 18.50 | 18.50 | 24.00 | 24.00 | — |

(Evaluation)

Each of the inks obtained above was charged into an ink jet recording apparatus (trade name: PIXUS iP8600); manufactured by Canon Inc.) utilizing thermal energy. Recording conditions were set to 23° C. in temperature, 55% in relative humidity, 2,400 dpi×1,200 dpi in recording density and 2.5 pL in ejection quantity. Images were respectively formed on a recording medium (Professional Photo Paper PR-101; product of Canon Inc.) with the recording duty changed at intervals of 10% from 0% to 100%.

[Ozone Fastness]

With respect to an image portion in which the recording duty was 50% in the recorded article obtained above, lightness (L) and color tone (a and b) in the L*a*b* color space prescribed by CIE (International Commission on Illumination) were measured (referred to as "Lab value before ozone fastness test"). This recorded article was exposed to ozone for 2 cycles (1 cycle: exposure for 16 hours) under conditions of 2.5 ppm in ozone gas concentration, 50% in relative humidity and 23° C. in vessel temperature by means of an ozone exposure tester (trade name: OMS-H; manufactured by SUGA TEST INSTRUMENTS CO., LTD.). Thereafter, with respect to the image portion in which the recording duty was 50% in the recorded article, lightness (L) and color tone (a and b) were measured in the same manner as described above (referred to as "Lab value after ozone fastness test"). Incidentally, the lightness (L) and color tone (a and b) were measured by means of a spectrophotometer (trade name: Spectrolino; manufactured by Gretag Macbeth) under conditions of a light source: D50 and an angle of field: 2°. A color difference (ΔE) was calculated out from the Lab values before the ozone fastness test and the Lab values after the ozone fastness test according to the following equation (A) to make evaluation as to ozone fastness.

The evaluation standard of the ozone fastness is as follows. The evaluation results are shown in Table 8. Incidentally, content ratios among the respective combinations of the first to fourth coloring materials are shown collectively in Table 8. In the following evaluation standard, A and B are levels of causing no problem as ozone fastness, A is an excellent level and C is a level unallowable as ozone fastness.

$$\Delta E = \sqrt{(L_1-L_2)^2+(a_1-a_2)^2+(b_1-b_2)^2} \quad \text{Formula (A)}$$

$L_1$, $a_1$, $b_1$: Lab value before ozone fastness test
$L_2$, $a_2$, $b_2$: Lab value after ozone fastness test
A: ΔE is less than 8.5;
B: ΔE is from 8.5 or more to less than 10;
C: ΔE is 10 or more.

[Light Fastness]

With respect to an image portion in which the recording duty was 50% in the recorded article obtained above, lightness (L) and color tone (a and b) in the L*a*b* color space prescribed by CIE (International Commission on Illumination) were measured (referred to as "Lab value before light fastness test"). This recorded article was exposed to light by means of a low-temperature xenon tester (trade name: SL-75; manufactured by SUGA TEST INSTRUMENTS CO., LTD.) for 220 hours under conditions of 50 klx in irradiation intensity, 50% in relative humidity and 23° C. in vessel temperature. Thereafter, with respect to the image portion in which the recording duty was 50% in the recorded article, lightness (L) and color tone (a and b) were measured in the same manner as described above (referred to as "Lab value after light fastness test"). Incidentally, the lightness (L) and color tone (a and b) were measured by means of a spectrophotometer (trade name: Spectrolino; manufactured by Gretag Macbeth) under conditions of a light source: D50 and an angle of field: 2°. A color difference (ΔE) was calculated out from the Lab values before the light fastness test and the Lab values after the light fastness test according to the following equation (B) to make evaluation as to light fastness.

The evaluation standard of the light fastness is as follows. The evaluation results are shown in Table 8. In the following evaluation standard, AA, A and B are levels of causing no problem as light fastness, A is an excellent level, AA is a particularly excellent level, and C is a level unallowable as light fastness.

$$\Delta E = \sqrt{(L_1-L_2)^2+(a_1-a_2)^2+(b_1-b_2)^2} \quad \text{Formula (B)}$$

$L_1, a_1, b_1$: Lab value before light fastness test
$L_2, a_2, b_2$: Lab value after light fastness test
AA: $\Delta E$ is less than 5;
  A: $\Delta E$ is from 5 or more to less than 7;
  B: $\Delta E$ is from 7 or more to less than 10;
  C: $\Delta E$ is 10 or more.

[Color Tone]

With respect to an image portion in which the recording duty was 100% in the recorded article obtained above, a* and b* in the L*a*b* color space prescribed by CIE (International Commission on Illumination) were measured to make evaluation as to color tone. Incidentally, a* and b* were measured by means of a spectrophotometer (trade name: Spectrolino; manufactured by Gretag Macbeth) under conditions of a light source: D50 and an angle of field: 2°.

The evaluation standard of the color tone is as follows. The evaluation results are shown in Table 8. In the following evaluation standard, A and B are levels of causing no problem as color tone, A is an excellent level, and C is a level unallowable as color tone.
A: Satisfying $-0.5 \leq a^* \leq 5$ and $-6.5 \leq b^* \leq 0$;
B: Satisfying $-5 \leq a^* \leq 10$ and $-10 \leq b^* \leq 1$, but not satisfying $-0.5 \leq a^* \leq 5$ and $-6.5 \leq b^* \leq 0$;
C: Not satisfying $-5 < a^* < 10$ and $-10 < b^* < 1$.

[Metamerism]

With respect to an image portion in which the recording duty was 100% in the recorded article obtained above, L*, a* and b* in the L*a*b* color space prescribed by CIE (International Commission on Illumination) were measured. Incidentally, the measurement of L*, a* and b* was conducted by measuring a reflection absorption spectrum by means of a spectrophotometer (trade name: Spectrolino; manufactured by Gretag Macbeth) under conditions of light sources: D50, D65, A, C and F1 to F12, and an angle of field: 2°. At this time, the L*, a* and b* values when the light source was D50 were referred to as "L*, a* and b* values in the light source of D50", and the L*, a* and b* values when the light sources were D65, A, C and F1 to F12 (15 types in total) were referred to as "L*, a* and b* values in the respective light sources". Based on the L*, a* and b* values when the light source was D50, a deviation of the L*, a* and b* values in each of the light sources of the 15 types was calculated out as a color difference ($\Delta E$) according to the following equation (C). Metamerism was evaluated from an average value (average value of $\Delta E$) of the color differences obtained by the respective light sources of the 15 types.

The evaluation standard of the metamerism is as follows. The evaluation results are shown in Table 8. In the following evaluation standard, A and B are levels causing no problem as metamerism, A is an excellent level, and C is a level unallowable as metamerism.

$$\Delta E = \sqrt{(L_1-L_2)^2+(a_1-a_2)^2+(b_1-b_2)^2} \quad \text{Formula (C)}$$

$L_1, a_1, b_1$: Lab value in the light source of D50
$L_2, a_2, b_2$: Lab value in the respective light sources
A: $0.0 \leq$ average value of $\Delta E \leq 4.0$;
B: $4.0 <$ average value of $\Delta E \leq 5.0$;
C: $5.0 <$ average value of $\Delta E$.

TABLE 8-1

Evaluation results of Examples

| | | Color tone | Ozone fastness | Light fastness | Metamerism | $1^{st}/2^{nd}$ | $(1^{st}+2^{nd})/3^{rd}$ | $(1^{st}+2^{nd}+3^{rd})/4^{th}$ |
|---|---|---|---|---|---|---|---|---|
| Example | 16 | A | A | A | B | 1.65 | 2.25 | — |
| | 17 | B | A | A | B | 1.65 | 2.25 | — |
| | 18 | B | A | A | B | 1.65 | 1.00 | — |
| | 19 | B | A | A | B | 1.65 | 3.00 | — |
| | 20 | B | A | B | B | 1.65 | 0.90 | — |
| | 21 | B | A | B | B | 1.65 | 3.08 | — |
| | 22 | B | A | A | B | 1.65 | 2.25 | — |
| | 23 | A | B | A | B | 1.65 | 2.25 | — |
| | 24 | B | B | B | B | 1.65 | — | — |
| | 25 | A | A | AA | B | 1.65 | 2.25 | 32.50 |
| | 26 | A | A | AA | B | 1.65 | 2.25 | 5.00 |
| | 27 | A | A | AA | B | 1.65 | 2.25 | 44.52 |
| | 28 | B | A | AA | B | 1.65 | 2.25 | 4.92 |
| | 29 | B | A | AA | B | 1.65 | 2.25 | 45.14 |
| | 30 | A | B | AA | B | 1.65 | 2.25 | 32.50 |
| | 31 | A | A | AA | A | 1.65 | 2.25 | 32.50 |
| | 32 | A | A | AA | A | 1.65 | 2.25 | 5.00 |
| | 33 | A | A | AA | A | 1.65 | 2.25 | 44.52 |
| | 34 | A | A | A | A | 1.65 | 2.25 | 4.92 |
| | 35 | A | A | A | A | 1.65 | 2.25 | 45.14 |
| | 36 | A | B | AA | A | 1.65 | 2.25 | 32.50 |
| | 37 | A | A | AA | A | 1.65 | 2.25 | 32.50 |
| | 38 | A | A | AA | A | 1.65 | 2.25 | 32.50 |
| | 39 | A | A | AA | A | 1.65 | 2.25 | 32.50 |
| | 40 | A | A | AA | A | 1.65 | 2.25 | 32.50 |
| | 41 | A | A | AA | A | 1.65 | 2.25 | 32.50 |
| | 42 | A | A | AA | A | 1.65 | 2.25 | 32.50 |

TABLE 8-1-continued

Evaluation results of Examples

| | Color tone | Ozone fastness | Light fastness | Metamerism | $1^{st}/2^{nd}$ | $(1^{st}+2^{nd})/3^{rd}$ | $(1^{st}+2^{nd}+3^{rd})/4^{th}$ |
|---|---|---|---|---|---|---|---|
| 43 | A | A | AA | A | 1.65 | 2.25 | 16.25 |
| 44 | B | B | B | B | 1.65 | — | 22.50 |
| 45 | B | B | B | A | 1.65 | — | 22.50 |
| 46 | B | B | B | B | 1.65 | 2.25 | — |

ΔE values of Examples 24 and 44 to 46 were lower than that of the Examples that had the evaluation results of the ozone fastness of B. ΔE value of Example 24 was lower than that of the Examples that had the evaluation results of the light fastness of B.

TABLE 8-2

Evaluation results of Comparative Examples

| | Color tone | Ozone fastness | Light fastness | Metamerism | Note |
|---|---|---|---|---|---|
| Comp. Ex. 6 | A | B | B | C | Containing none of $1^{st}$ to $4^{th}$ coloring materials |
| Comp. Ex. 7 | A | C | C | A | Containing none of $2^{nd}$ to $4^{th}$ coloring materials |
| Comp. Ex. 8 | A | B | B | C | Containing no $1^{st}$ coloring material |
| Comp. Ex. 9 | A | B | B | B | Containing no $1^{st}$ coloring material |
| Comp. Ex. 10 | B | C | C | C | Containing no $2^{nd}$ coloring material |
| Comp. Ex. 11 | B | C | C | B | Containing no $2^{nd}$ coloring material |
| Comp. Ex. 12 | C | C | B | B | Containing none of $1^{st}$ to $4^{th}$ coloring materials |

Incidentally, specific examples of other respective substituents and structures embraced in the above-described compounds than the above-described embodiments are not mentioned herein, but the effects achieved by the above embodiments could be achieved likewise.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2007-210095, filed Aug. 10, 2007, and No. 2008-175247, filed Jul. 4, 2008, which are hereby incorporated by reference herein in their entirety.

What is claimed is:

1. An ink comprising at least two coloring materials of a first coloring material and a second coloring material, wherein the first coloring material is a compound represented by the following general formula (I), and the second coloring material is a compound represented by the following general formula (II):

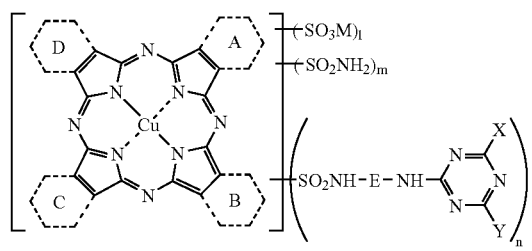

General formula (I)

wherein A, B, C and D are, independently of one another, an aromatic six-membered ring, M is a hydrogen atom, alkali metal, ammonium or organic ammonium, E is an alkylene group, X is a sulfo-substituted anilino group, carboxyl-substituted anilino group or phosphono-substituted anilino group, with the proviso that such a substituted anilino group may further have 1 to 4 substituents selected from the group consisting of sulfonic, carboxyl, phosphono, sulfamoyl, carbamoyl, hydroxyl, alkoxy, amino, alkylamino, dialkylamino, arylamino, diarylamino, acetylamino, ureido, alkyl, nitro, cyano, alkylsulfonyl and alkylthio groups and halogen atoms, Y is a hydroxyl group or amino group, and l, m and n have the following relationship: $0 \leq l \leq 2$, $0 \leq m \leq 3$, $0.1 \leq n \leq 3$ and l+m+n=1 to 4; and

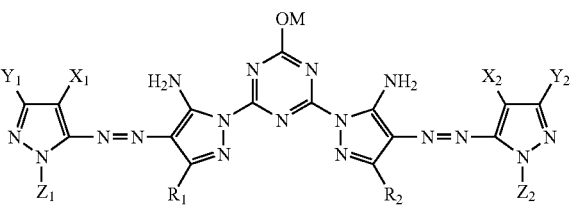

General formula (II)

wherein $R_1$, $R_2$, $Y_1$ and $Y_2$ are, independently of one another, a monovalent group, $X_1$ and $X_2$ are, independently of each other, an electron attractive group having a Hammett's σp value of 0.20 or more, $Z_1$ and $Z_2$ are, independently of each other, a hydrogen atom, substituted or unsubstituted alkyl group, substituted or unsubstituted alkenyl group, substituted or unsubstituted alkynyl group, substituted or unsubstituted aralkyl group, substituted or unsubstituted aryl group, or substituted or unsubstituted heterocyclic group, and M is a hydrogen atom, alkali metal, ammonium or organic ammonium.

2. The ink according to claim 1, wherein at least one of A, B, C and D in the general formula (I) is a pyridine ring or a pyrazine ring.

3. The ink according to claim 1, wherein the content (% by mass) of the first coloring material in the ink is from 0.1 times or more to 15.0 times or less in terms of mass ratio to the content (% by mass) of the second coloring material in the ink.

4. The ink according to claim 1, which further comprises, as a third coloring material, at least one compound selected from the group consisting of a compound represented by the following general formula (III), a compound represented by the following general formula (IV) and a compound represented by the following general formula (V):

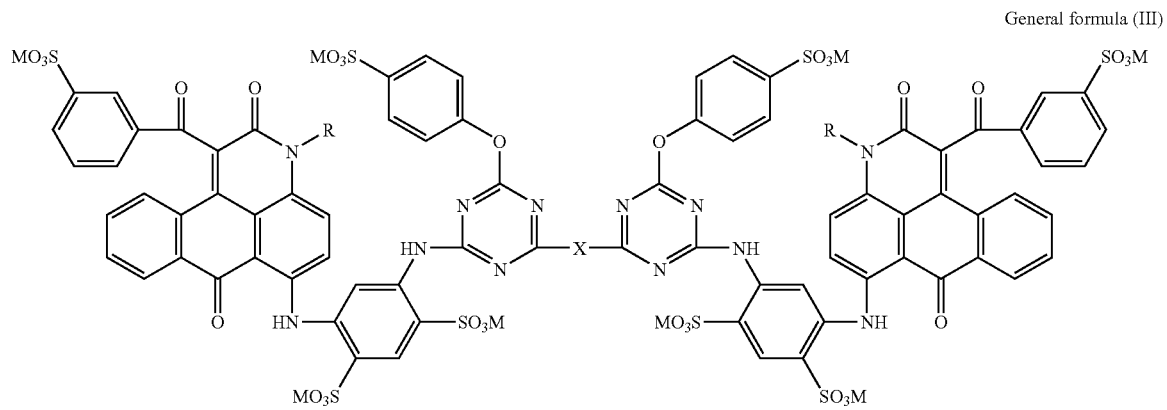

General formula (III)

wherein R are, independently of each other, a hydrogen atom, alkyl group, hydroxyalkyl group, cyclohexyl group monoalkylaminoalkyl group or dialkylaminoalkyl group, M's are, independently of one another, a hydrogen atom, alkali metal, ammonium or organic ammonium, and X is a linking group;

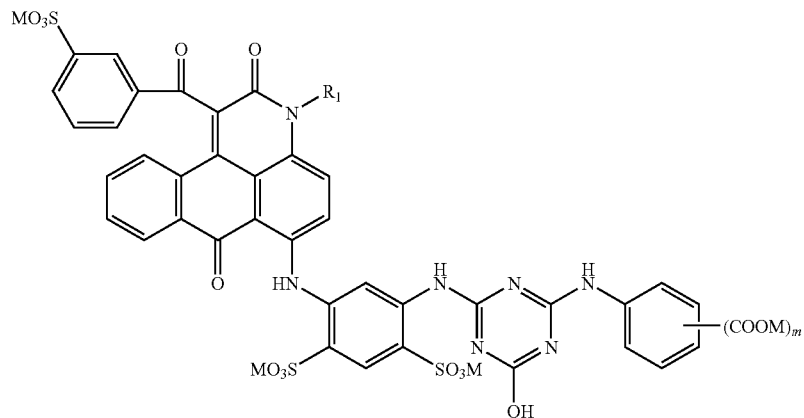

Gerneral formula (IV)

wherein $R_1$ is a hydrogen atom or alkyl group, m is an integer of 1 to 3, and M's are, independently of one another, a hydrogen atom, alkali metal, ammonium or organic ammonium; and General formula (V)

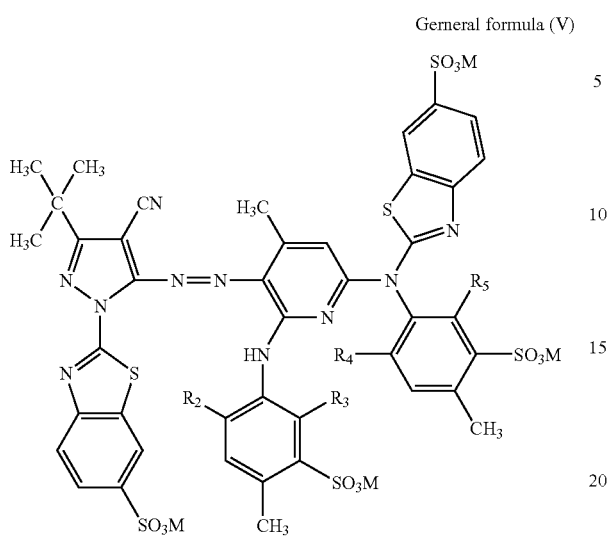

wherein $R_2$, $R_3$, $R_4$ and $R_5$ are, independently of one another, an alkyl group, and M's are, independently of one another, a hydrogen atom, alkali metal, ammonium or organic ammonium.

5. The ink according to claim 1, wherein the content (% by mass) of the third coloring material in the ink is from 0.5 times or more to 5.0 times or less in terms of mass ratio to the total of the content (% by mass) of the first coloring material and the content (% by mass) of the second coloring material in the ink.

6. The ink according to claim 4, wherein the third coloring material is the compound represented by the general formula (V).

7. The ink according to claim 1, which further comprises, as a fourth coloring material, at least one compound selected from the group consisting of a compound represented by the following general formula (VI) and a compound represented by the following general formula (VII):

General formula (VI)

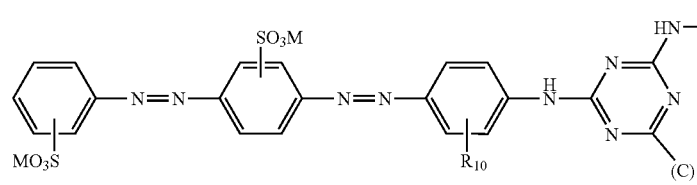

wherein $R_{10}$ are, independently of each other, a hydrogen atom, hydroxyl group, carboxyl group, an alkyl group having 1 to 4 carbon atoms, which may be substituted by a hydroxyl group or an alkoxy group having 1 to 4 carbon atoms, an alkoxy group having 1 to 4 carbon atoms, which may be substituted by a hydroxyl group or an alkoxy group having 1 to 4 carbon atoms, an alkylamino group having 1 to 4 carbon atoms, which may be substituted by a hydroxyl group or an alkoxy group having 1 to 4 carbon atoms, a carboxy-(C1-C5) alkylamino group, a bis[carboxy-(C1-C5)alkyl]amino group, an alkanoylamino group having 1 to 4 carbon atoms, which may be substituted by a hydroxyl group or an alkoxy group having 1 to 4 carbon atoms, a phenylamino group, which may be substituted by a carboxyl, sulfonic or amino group, a sulfonic group, a halogen atom, or a ureido group, [C] is an aliphatic amine residue having a carboxyl or sulfonic group, and M's are, independently of one another, a hydrogen atom, alkali metal, ammonium or organic ammonium; and General formula (VII)

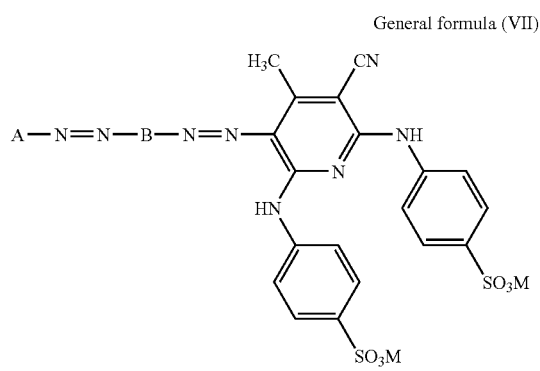

wherein A is an aromatic or heterocyclic group which may be substituted, B is any one of groups represented by the following general formulae (1) to (5), and M's are, independently of each other, a hydrogen atom, alkali metal, ammonium or organic ammonium, General formula (1)

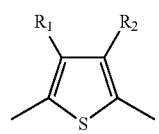

General formula (2)

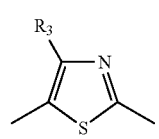

-continued

General formula (3)

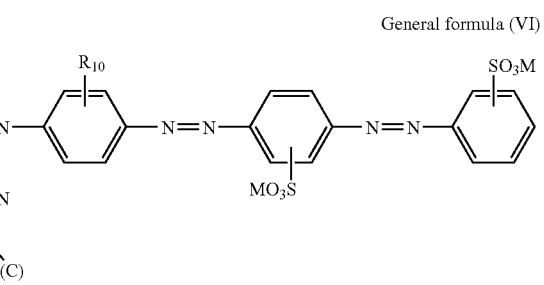

-continued

General formula (4)

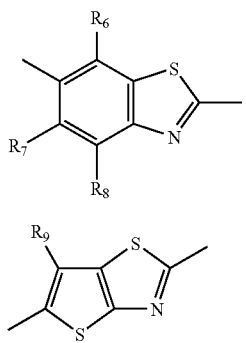

General formula (5)

wherein R₁ to R₉ are, independently of one another, a hydrogen atom, halogen atom, aliphatic group, aromatic group, heterocyclic group, carboxyl group, carbamoyl group, alkoxycarbonyl group, aryloxycarbonyl group, heterocyclic oxycarbonyl group, acyl group, hydroxyl group, alkoxy group, aryloxy group, heterocyclic oxy group, silyloxy group, acyloxy group, carbamoyloxy group, alkoxycarbonyloxy group, aryloxycarbonyloxy group, amino group, acylamino group, ureido group, sulfamoylamino group, alkoxycarbonylamino group, aryloxycarbonylamino group, alkyl- or arylsulfonylamino group, heterocyclic sulfonylamino group, cyano group, nitro group, alkyl- or arylthio group, heterocyclic thio group, alkyl- or arylsulfonyl group, heterocyclic sulfonyl group, alkyl- or arylsulfinyl group, heterocyclic sulfinyl group, sulfamoyl group, or sulfonic group, with the proviso that each group may be further substituted.

8. The ink according to claim 7, wherein the content (% by mass) of the fourth coloring material in the ink is from 1.0 time or more to 70.0 times or less in terms of mass ratio to the total of the content (% by mass) of the first coloring material, the content (% by mass) of the second coloring material and the content (% by mass) of the third coloring material in the ink.

9. The ink according to claim 7, wherein the fourth coloring material is the compound represented by the general formula (VII).

10. An ink jet recording method comprising ejecting an ink by an ink jet system to conduct recording on a recording medium, wherein the ink is the ink according to claim 1.

11. An ink cartridge comprising an ink storage portion for storing an ink, wherein the ink is the ink according to claim 1.

12. A recording unit comprising an ink storage portion for storing an ink and a recording head for ejecting the ink, wherein the ink is the ink according to claim 1.

13. An ink jet recording apparatus comprising an ink storage portion for storing an ink and a recording head for ejecting the ink, wherein the ink is the ink according to claim 1.

* * * * *